(12) United States Patent
Labrecque et al.

(10) Patent No.: US 12,490,983 B2
(45) Date of Patent: Dec. 9, 2025

(54) ENDOVASCULAR FIXATION DEVICE

(71) Applicant: ATRIUM MEDICAL CORPORATION, Merrimack, NH (US)

(72) Inventors: Roger Labrecque, Londonderry, NH (US); David Heim, Portsmouth, NH (US)

(73) Assignee: ATRIUM MEDICAL CORPORATION, Merrimack, NH (US)

( * ) Notice: Subject to any disclaimer, the term of this patent is extended or adjusted under 35 U.S.C. 154(b) by 538 days.

(21) Appl. No.: 17/078,491

(22) Filed: Oct. 23, 2020

(65) Prior Publication Data
US 2021/0121180 A1 Apr. 29, 2021

Related U.S. Application Data

(60) Provisional application No. 62/925,671, filed on Oct. 24, 2019.

(51) Int. Cl.
*A61B 17/11* (2006.01)
*A61F 2/89* (2013.01)
(Continued)

(52) U.S. Cl.
CPC ....... *A61B 17/11* (2013.01); *A61B 2017/0084* (2013.01); *A61B 2017/00867* (2013.01);
(Continued)

(58) Field of Classification Search
CPC ............ A61B 17/11; A61B 2017/0084; A61B 2017/00867; A61B 2017/1107;
(Continued)

(56) References Cited

U.S. PATENT DOCUMENTS 6,210,429 B1  4/2001  Vardi et al.
6,616,675 B1*  9/2003  Evard ................ A61B 18/1445
                                            606/155

(Continued)

FOREIGN PATENT DOCUMENTS

CN   109688942 A   4/2019
WO   03037397 A2   5/2003
(Continued)

OTHER PUBLICATIONS

Saegusa et al., Sutureless microvascular anastomosis assisted by an expandable shape-memory alloy stent, PLOS One, Jul. 24, 2017, pp. 1-15.
(Continued)

*Primary Examiner* — Jing Rui Ou
(74) *Attorney, Agent, or Firm* — Fay Kaplun & Marcin, LLP

(57) ABSTRACT

An endovascular fixation device includes a first portion and a second portion connected to the first portion to define a central lumen extending longitudinally through the portions. The first portion includes a first radially expandable ring and at least one first connector, connected to the first ring, configured to cause at least one first flarable crown of the first ring to flare radially outwardly relative to other portions of the first ring when the first ring is expanded from a retracted position to an expanded position. The second portion includes a second radially expandable ring and at least one second connector, connected to the second ring, configured to cause at least one second flarable crown of the second ring to flare radially outwardly relative to other portions of the second ring when the second ring is expanded from a retracted position to an expanded position.

22 Claims, 44 Drawing Sheets

(51) Int. Cl.
*A61F 2/915* (2013.01)
*A61B 17/00* (2006.01)
*A61F 2/91* (2013.01)

(52) U.S. Cl.
CPC ............... *A61B 2017/1107* (2013.01); *A61B 2017/1139* (2013.01); *A61F 2/89* (2013.01); *A61F 2/91* (2013.01); *A61F 2/915* (2013.01); *A61F 2002/91583* (2013.01)

(58) Field of Classification Search
CPC ...... A61B 2017/1139; A61F 2/89; A61F 2/91; A61F 2002/91583; A61F 2/915
See application file for complete search history.

(56) References Cited

U.S. PATENT DOCUMENTS

| | | | |
|---|---|---|---|
| 7,147,661 | B2 | 12/2006 | Chobotov et al. |
| 8,034,099 | B2 | 10/2011 | Pellegrini |
| 9,220,620 | B2 | 12/2015 | Hadley et al. |
| 9,254,209 | B2 | 2/2016 | Shalev |
| 9,532,868 | B2 | 1/2017 | Braido |
| 10,271,975 | B2 | 4/2019 | Sirhan et al. |
| D884,174 | S | 5/2020 | Orion et al. |
| D884,177 | S | 5/2020 | Orion et al. |
| D889,656 | S | 7/2020 | Orion et al. |
| 2002/0055772 | A1 | 5/2002 | McGuckin, Jr. et al. |
| 2002/0169466 | A1* | 11/2002 | Peterson ............... A61B 17/11 606/153 |
| 2003/0032967 | A1* | 2/2003 | Park ....................... A61B 17/11 606/153 |
| 2003/0120338 | A1 | 6/2003 | Chobotov et al. |
| 2003/0176914 | A1 | 9/2003 | Rabkin et al. |
| 2005/0049675 | A1* | 3/2005 | Wallace ................. A61B 17/11 623/1.13 |
| 2005/0056292 | A1* | 3/2005 | Cooper .................. A61B 17/22 623/23.65 |
| 2005/0085845 | A1 | 4/2005 | Hilaire et al. |
| 2005/0222669 | A1 | 10/2005 | Purdy |
| 2006/0047337 | A1* | 3/2006 | Brenneman ............ A61B 17/11 623/1.36 |
| 2006/0155359 | A1 | 7/2006 | Watson |
| 2007/0055358 | A1 | 3/2007 | Krolik et al. |
| 2007/0173921 | A1 | 7/2007 | Wholey et al. |
| 2009/0248139 | A1* | 10/2009 | Pellegrini ................ A61F 2/91 623/1.15 |
| 2010/0057186 | A1 | 3/2010 | West et al. |
| 2013/0131775 | A1 | 5/2013 | Hadley et al. |
| 2014/0155997 | A1 | 6/2014 | Braido |
| 2014/0277378 | A1 | 9/2014 | Lane et al. |
| 2015/0230915 | A1 | 8/2015 | Farag |
| 2015/0313598 | A1* | 11/2015 | Todd ........................ A61F 2/06 606/153 |
| 2016/0022413 | A1 | 1/2016 | Farag |
| 2019/0143011 | A1* | 5/2019 | Brenneman ............ A61M 1/88 604/8 |
| 2019/0388213 | A1 | 12/2019 | Torrance et al. |
| 2020/0121321 | A1 | 4/2020 | Orion et al. |

FOREIGN PATENT DOCUMENTS

| | | |
|---|---|---|
| WO | 2016/114719 A1 | 7/2016 |
| WO | 2018203237 A1 | 11/2018 |

OTHER PUBLICATIONS

Stedman, Stedman's Medical dictionary, 1982, pp. 62-64 and 534-536, Williams & Wilkins, Waverly Press, Inc., Baltimore, MD.
PCT Written Opinion and Search Report issued in PCT Appln. Serial No. PCT/US2020/038981 on Sep. 21, 2020, 14 sheets.
The extended EP Search Report issued in EP Patent Appln. Serial No. 20833427.6 on Jun. 6, 2023, 8 sheets.

* cited by examiner

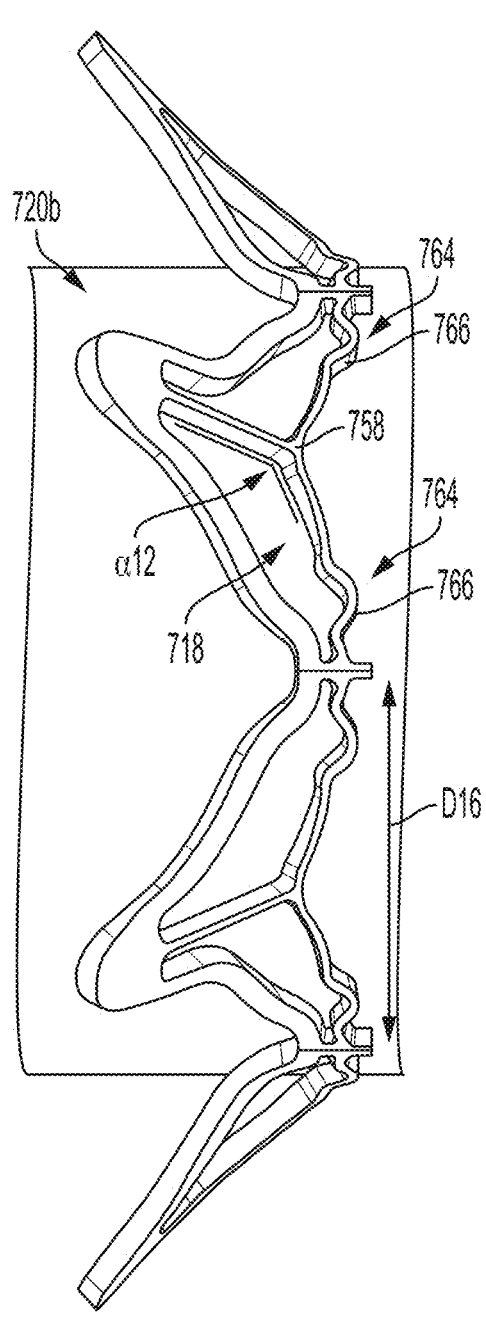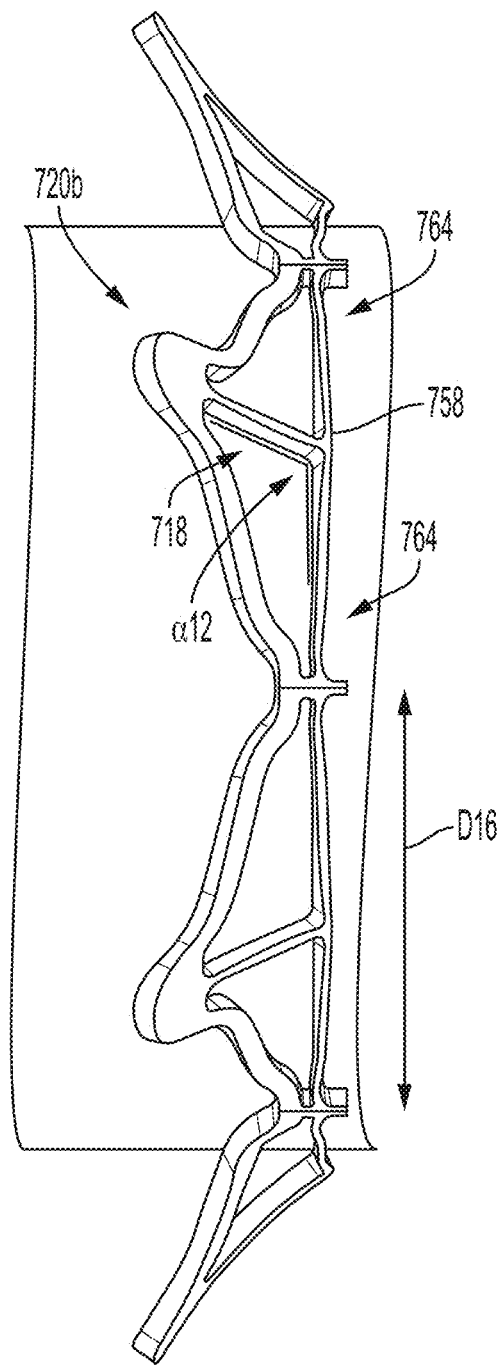
FIG. 17C
FIG. 17D

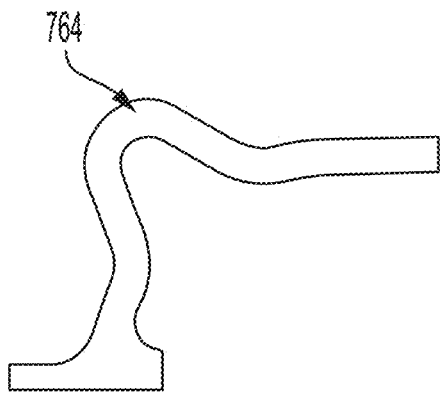 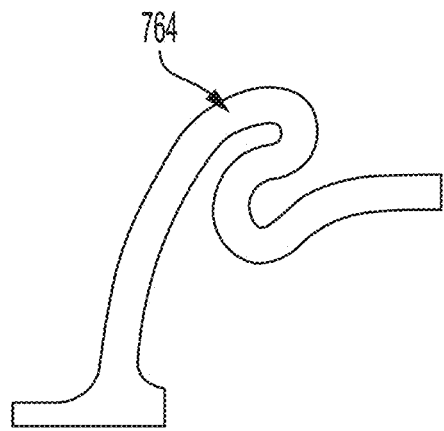
FIG. 18A     FIG. 18B
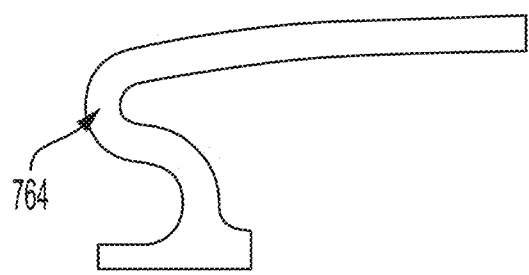
FIG. 18C

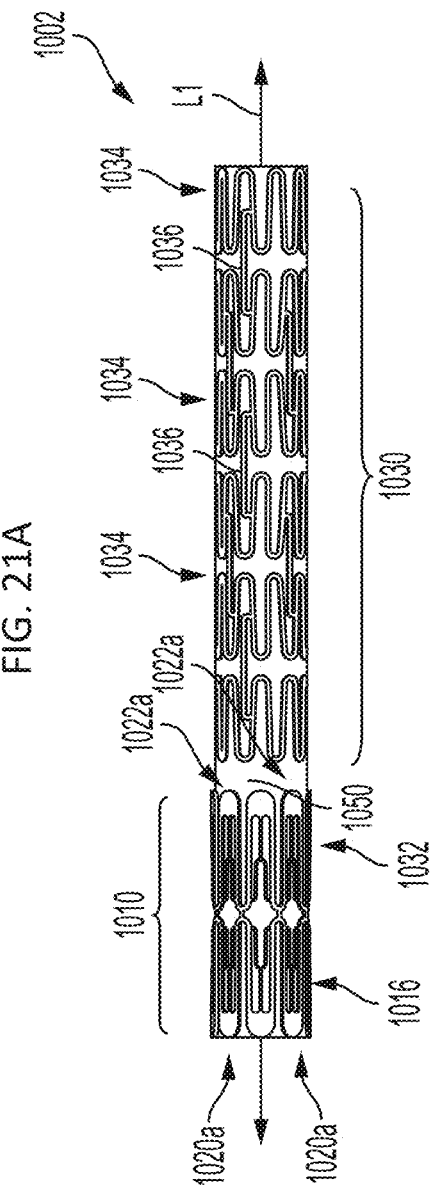
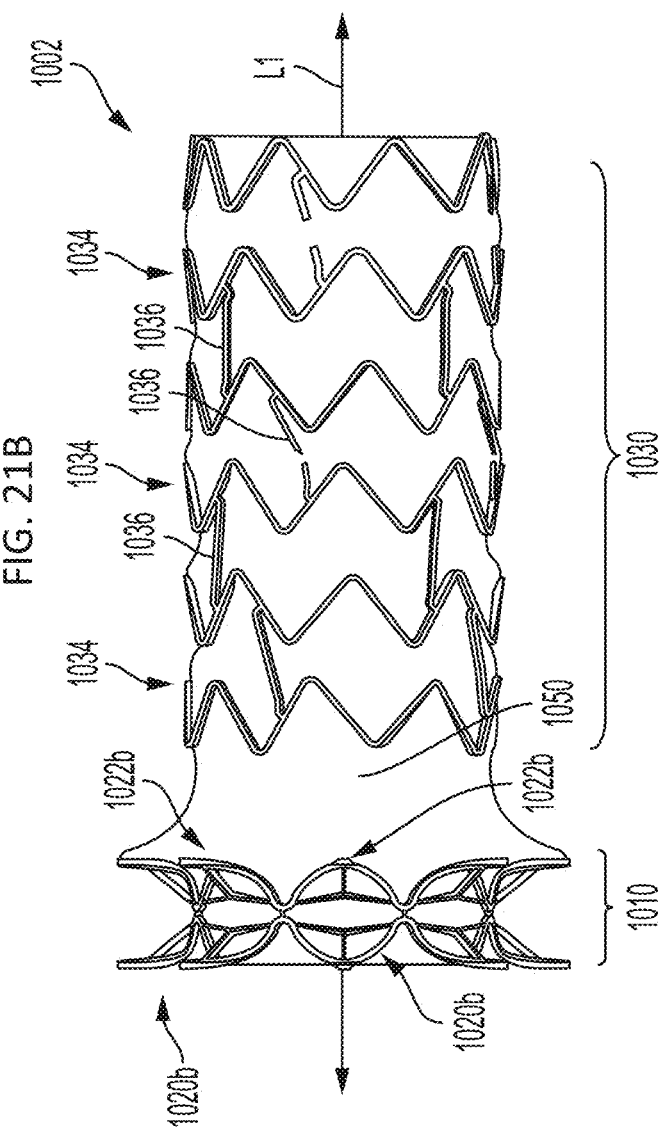
FIG. 21A
FIG. 21B

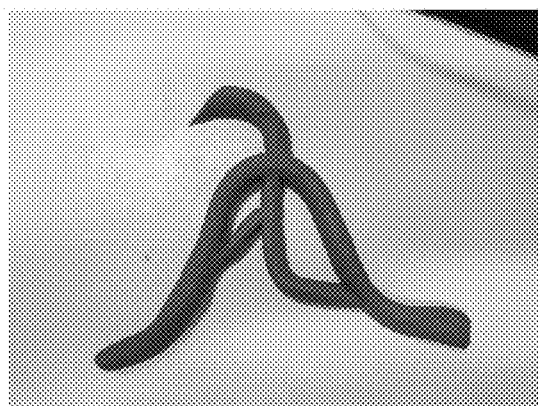
FIG. 29A
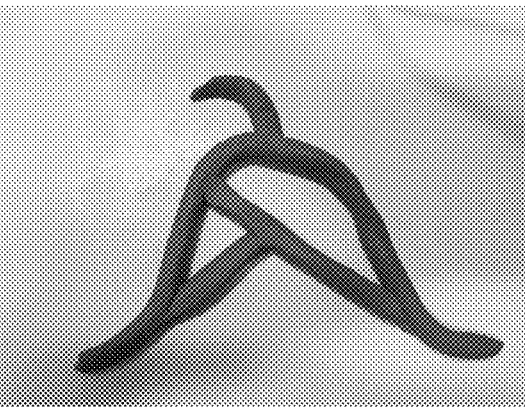
FIG. 29B
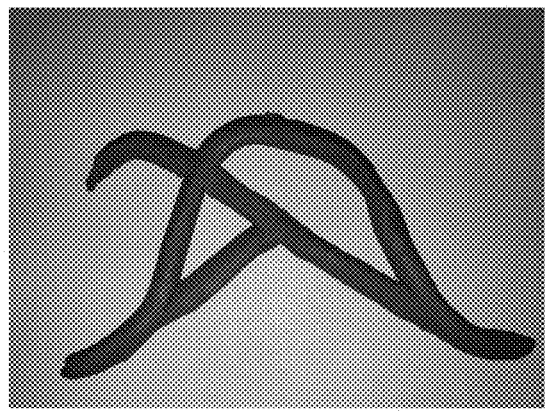
FIG. 29C
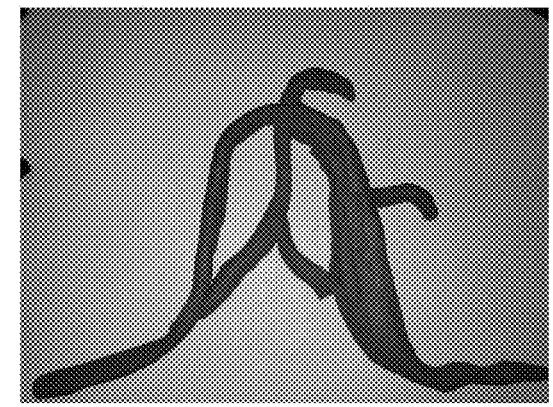
FIG. 29D
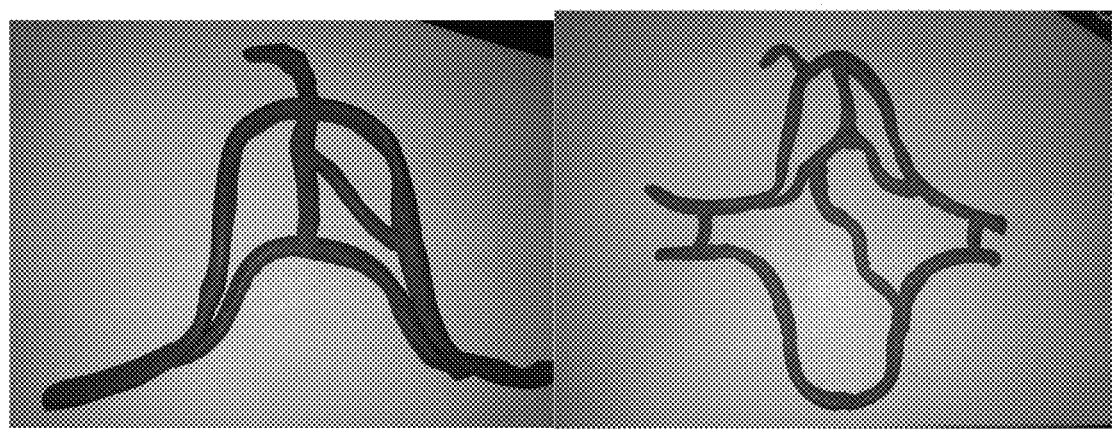
FIG. 29E
FIG. 29F

ENDOVASCULAR FIXATION DEVICE

CROSS REFERENCE TO RELATED APPLICATION

This application claims priority to U.S. Provisional Patent Application No. 62/925,671, filed Oct. 24, 2019, the disclosure of which is hereby incorporated by reference in its entirety.

BACKGROUND OF THE DISCLOSURE

Field of the Disclosure

The present disclosure relates to an expandable endovascular fixation device for use within a body passageway or duct and, more particularly, to an endovascular fixation device including portions configured to flare radially outwardly relative to other portions of the device for positioning and/or anchoring the fixation device within the body passageway or duct. An expandable endovascular fixation device, in accordance with this disclosure, may be employed to anchor implantable devices to prevent migration and ensure wall apposition. The fixation device can be used to create an anastomosis, which is defined as a connection made surgically between adjacent blood vessels, parts of the intestine, or other channels of the body. An anastomosis can also refer to the operation in which the anastomosis is constructed. The fixation device can also be used to create a fistula, which is defined as a surgically made passage between a hollow or tubular organ and the body surface or between two hollow or tubular organs. An anastomosis can be performed to create a fistula, and can also be used to connect tubular bodies in other arrangements that do not create a fistula.

Description of Related Art

Surgical procedures for creating a fistula or anastomosis in adjacent veins and arteries are widely known. A fistula may refer to an opening or channel extending between two lumens of different organs, such as a channel formed by connecting openings extending through a wall of an artery and a wall of a vein for establishing a fluid connection between the artery and vein. For example, a fistula is often created between an artery and vein in an arm of a dialysis patient for providing hemodialysis access for dialysis procedures. In other words, a fistula constitutes an opening or channel extending between lumens of different organs, which enables an abnormal flow of material between different organs. For example, an arteriovenous fistula formed by the connection of an artery directly to a vein enables an abnormal flow of arterial blood directly into a vein.

An anastomosis, on the other hand, refers to a connection between walls of two adjacent vessels formed by attaching the two vessels together to establish fluid communication between the vessels. An anastomosis can include an end-to-end anastomosis, in which an end of one vessel is attached to the end of the other vessel, an end-to-side anastomosis, in which an end of one vessel is attached to an opening in a sidewall of the other vessel at any selected angle, or a side-to-side anastomosis, in which openings in sidewalls of the adjacent vessels are connected together. Generally, an anastomosis provides a path for material to flow in a physiologic manner, such as when blood flows from one artery to another artery connected together by anastomosis, when blood flows from one vein to another vein connected together by anastomosis, or when intestinal contents flow from one segment of intestine to another segment of intestine that are connected together by anastomosis.

Surgical procedures for creating a fistula or anastomosis are often open surgical procedures, in which an incision is formed in the target vessels by a surgeon. The target vessels are then connected together by a convenient surgical technique, such as cauterization, hand sewing, or stapling, for example. Endovascular procedures for creating fistulas, however, are in use as well, in which an artery and vein are connected together through an endovascular procedure. However, in some circumstances, such endovascular procedures may employ cauterization and can leave the attachment site forming the fistula vulnerable to leaking and detachment.

Mechanical fixation devices for anchoring medical devices, such as synthetic grafts, stents, filters, and similar devices, within vessels are also known. See, e.g., Noriko Saegusa et al., *Sutureless Microvascular Anastomosis Assisted by an Expandable Shape-Memory Alloy Stent*, PLOS ONE 12(7): e0181520. A fixation device can be an expandable structure configured to be deployed in the vessel or passageway in an expanded state to anchor the medical device in place and, in some instances, to maintain patency of the vessel or passageway. Fixation devices can be formed from a framework of interconnecting members or tines. Many designs are known and can include combinations of different types of framing structures, such as helical coils, meshes, lattices, or interconnected rings. Fixation devices can be bare, coated, or covered. The cover can be constructed from a biocompatible material, such as polytetrafluoroethylene (PTFE) or expanded polytetrafluoroethylene (ePFTE).

In many surgical procedures, a fixation device is configured to be delivered to a target site, expanded, and affixed in place. Once deployed and affixed in place in a vessel, the fixation device creates an enlarged lumen space for passage of blood and also provides increased reinforcement of the vessel wall. In order to provide suitable fixation and anchoring, fixation devices can include protruding structures or regions configured to flare radially outwardly to contact the vessel wall to anchor the device at a desired or target location within the vessel.

For fixation devices formed from shape memory materials, such as nickel-titanium alloy (e.g., NITINOL), the device body may be biased to adopt or conform to an outwardly flared orientation either upon deployment of the stent or fixation device in the body lumen or after the device body increases in temperature above a preselected temperature, such as body temperature. In some instances, the outwardly flaring portions of the device can also include projecting, pointed, or sharpened structures for enhancing engagement between the fixation device and the vessel wall. For example, conventional protruding structures can include deployable hooks, fasteners, or barbs configured to protrude from a body of the device when the device is deployed. As the device flares radially outwardly, due to an internal bias of the shape memory material, the protruding structures can be brought into contact with the vessel wall to anchor the stent device in place.

SUMMARY OF THE DISCLOSURE

There is a need for new fixation device designs, which facilitate easy insertion, deployment, and/or removal of the device from a body lumen. For example, the fixation devices disclosed herein can be configured to transition to an expanded or deployed state with fixation features deployed without requiring additional manipulation of the device following deployment. Device designs that reduce manufacturing cost and complexity would also be useful. There is also a need to simplify surgical procedures for creating a fistula or anastomosis. In particular, endovascular procedures for creating a fistula or anastomosis quickly, while reducing a risk of leaking or detachment, would be helpful for improving patient outcomes. Faster surgical and/or endovascular procedures for creating a fistula or anastomosis would also be especially useful in situations in which time is of increased importance, such as during organ transplants and in trauma or emergency situations.

According to an example of the disclosure, an endovascular fixation device comprises a first portion comprising a first radially expandable ring and at least one first connector, connected to the first ring, configured to cause at least one first flarable crown of the first ring to flare radially outwardly relative to other portions of the first ring when the first ring is expanded from a retracted position to an expanded position and a second portion connected to the first portion to define a central lumen extending longitudinally through the first portion and the second portion. The second portion comprises a second radially expandable ring and at least one second connector, connected to the second ring, configured to cause at least one second flarable crown of the second ring to flare radially outwardly relative to other portions of the second ring when the second ring is expanded from a retracted position to an expanded position. Upon radial expansion of at least one of the first ring or the second ring from the retracted position to the expanded position, the at least one first connector and the at least one second connector cause the at least one first flarable crown of the first ring and the at least one second flarable crown of the second ring to flare radially outwardly relative to other portions of the first ring and the second ring so as to form a first flared crown and a second flared crown.

According to another example of the disclosure, a method of deploying an endovascular fixation device comprises a step of preparing an endovascular fixation device for a surgical procedure. The endovascular fixation device comprises a first portion comprising a first radially expandable ring and at least one first connector, connected to the first ring, configured to cause at least one first flarable crown of the first ring to flare radially outwardly relative to other portions of the first ring when the first ring is expanded from a retracted position to an expanded position and a second portion connected to the first portion to define a central lumen extending longitudinally through the first portion and the second portion. The second portion comprises a second ring and at least one second connector, connected to the second ring, configured to cause at least one second flarable crown of the second ring to flare radially outwardly relative to other portions of the second ring when the second ring is expanded from a retracted position to an expanded position. Upon radial expansion of at least one of the first ring or the second ring from the retracted position to the expanded position, the at least one first connector and the at least one second connector cause the at least one first flarable crown of the first ring and the at least one second flarable crown of the second ring to flare radially outwardly relative to other portions of the first ring and the second ring. The method further comprises steps of: advancing the endovascular fixation device, with the first ring and the second ring in the retracted position, through a body lumen to a deployment location; and once at the deployment location, deploying the endovascular fixation device, thereby allowing at least one of the first ring or the second ring to expand radially outwardly so as to cause the at least one first flarable crown and the at least one second flarable crown to flare radially and form the first flared crown and the second flared crown.

According to another example of the disclosure, an endovascular fixation device comprises: a radially expandable middle portion comprising a plurality of struts; a plurality of first flarable crowns forming a first radially expandable ring; and a plurality of second flarable crowns forming a second radially expandable ring. The first flarable crowns are configured to flare radially outwardly relative to the middle portion when the fixation device is expanded from a retracted position to an expanded position. The second flarable crowns are configured to flare radially outwardly relative to the middle portion when the fixation device is expanded from the retracted position to the expanded position. Upon expansion of the fixation device from the retracted position to the expanded position, the first flarable crowns flare radially outwardly relative to the middle portion so as to form a plurality of first flared crowns, and the second flarable crowns flare radially outwardly relative to the middle portion so as to form a plurality of second flared crowns.

According to another example of the disclosure, an endovascular fixation device comprises: a radially expandable middle portion; a first fixation portion connected to a first end of the middle portion configured to flare radially outwardly relative to the middle portion; and a second fixation portion connected to a second end of the middle portion configured to flare radially outwardly relative to the middle portion. The first fixation portion comprises: a plurality of outer first flarable crowns forming an outer first radially expandable ring, wherein the outer first flarable crowns are configured to flare radially outwardly relative to the middle portion bending towards the middle portion when the fixation device is expanded from a retracted position to an expanded position; and a plurality of inner first flarable crowns forming an inner first radially expandable ring positioned between the outer first radially expandable ring and the middle portion. The inner first flarable crowns are configured to flare radially outwardly relative to the middle portion bending away from the middle portion when the fixation device is expanded from the retracted position to the expanded position. The second fixation portion comprises: a plurality of outer second flarable crowns forming an outer second radially expandable ring, wherein the outer second flarable crowns are configured to flare radially outwardly relative to the middle portion bending towards the middle portion when the fixation device is expanded from a retracted position to an expanded position; and a plurality of inner second flarable crowns forming an inner second radially expandable ring positioned between the outer second radially expandable ring and the middle portion. The inner second flarable crowns are configured to flare radially outwardly relative to the middle portion bending away from the middle portion when the fixation device is expanded from the retracted position to the expanded position. Upon expansion of the fixation device from the retracted position to the expanded position, the flarable crowns of the first fixation portion and the flarable crowns of the second fixation portion flare radially outwardly relative to the middle portion so as to form flared crowns.

According to another example of the disclosure, an endovascular fixation assembly comprises: an endovascular fixation device; a radially expandable stent spaced apart from the fixation device; and a cover covering or enclosing at least a portion of the fixation device and at least a portion of the stent and connecting the fixation device to the stent. The endovascular fixation device comprises a radially expandable middle portion; a plurality of first flarable crowns forming a first radially expandable ring connected to the middle portion; and a plurality of second flarable crowns forming a second radially expandable ring connected to the middle portion. The first flarable crowns are configured to flare radially outwardly relative to the middle portion when the fixation device is expanded from a retracted position to an expanded position. The second flarable crowns are configured to flare radially outwardly relative to the middle portion when the fixation device is expanded from the retracted position to the expanded position. Upon expansion of the fixation device from the retracted position to the expanded position, the first flarable crowns flare radially outwardly relative to the middle portion so as to form a plurality of first flared crowns and the second flarable crowns flare radially outwardly relative to the middle portion so as to form a plurality of second flared crowns.

Non-limiting illustrative examples of embodiments of the present disclosure will now be described in the following numbered clauses:

Clause 1: An endovascular fixation device comprising: a first portion comprising a first radially expandable ring and at least one first connector, connected to the first ring, configured to cause at least one first flarable crown of the first ring to flare radially outwardly relative to other portions of the first ring when the first ring is expanded from a retracted position to an expanded position; and a second portion connected to the first portion to define a central lumen extending longitudinally through the first portion and the second portion, the second portion comprising a second radially expandable ring and at least one second connector, connected to the second ring, configured to cause at least one second flarable crown of the second ring to flare radially outwardly relative to other portions of the second ring when the second ring is expanded from a retracted position to an expanded position, wherein, upon radial expansion of at least one of the first ring or the second ring from the retracted position to the expanded position, the at least one first connector and the at least one second connector cause the at least one first flarable crown of the first ring and the at least one second flarable crown of the second ring to flare radially outwardly relative to other portions of the first ring and the second ring so as to form a first flared crown and a second flared crown.

Clause 2: The endovascular fixation device of clause 1, wherein the fixation device is configured to form a fistula between a first blood vessel and a second blood vessel when deployed.

Clause 3: The endovascular fixation device of clause 1 or clause 2, wherein the fixation device is configured to form an anastomosis between a first blood vessel and a second blood vessel that is within or adjacent to the first blood vessel.

Clause 4: The endovascular fixation device of any of clauses 1-3, wherein the fixation device is configured to secure a previously deployed device within a blood vessel.

Clause 5: The endovascular fixation device of any of clauses 1-4, wherein the at least one first connector and the at least one second connector are not biased to the expanded position.

Clause 6: The endovascular fixation device of any of clauses 1-5, wherein, when the at least one first connector and the at least one second connector are in the retracted position, the at least one first flarable crown of the first ring, the at least one second flarable crown of the second ring and other portions of the first ring and the second ring are substantially equidistant from a central longitudinal axis of the endovascular fixation device.

Clause 7: The endovascular fixation device of any of clauses 1-6, further comprising at least one strut connecting the first ring to the second ring.

Clause 8: The endovascular fixation device of any of clauses 1-7, further comprising a radially expandable body portion defining a portion of the central lumen of the endovascular fixation device, wherein the body portion is disposed between the first portion and the second portion of the endovascular fixation device, and wherein the body portion comprises at least one expandable ring.

Clause 9: The endovascular fixation device of any of clauses 1-8, further comprising a radially expandable body portion defining a portion of the central lumen of the endovascular fixation device, wherein the body portion is disposed between the first portion and the second portion of the endovascular fixation device, and wherein the body portion comprises a plurality of expandable rings and at least one interconnecting member connecting at least two of the plurality of rings.

Clause 10: The endovascular fixation device of any of clauses 1-9, wherein, when the at least one first connector and the at least one second connector are in the expanded position, the at least one first flarable crown is flared towards a first end of the endovascular fixation device and the at least one second flarable crown is flared towards the first end or the second end of the endovascular fixation device to form the first flared crown and the second flared crown.

Clause 11: The endovascular fixation device of any of clauses 1-10, wherein, when the at least one first connector and the at least one second connector are in the expanded position, the at least one second flarable crown is flared towards a first end of the endovascular fixation device and the at least one first flarable crown is flared towards a second end of the endovascular fixation device to form the first flared crown and the second flared crown.

Clause 12: The endovascular fixation device of any of clauses 1-11, wherein, when the at least one first connector and the at least one second connector are in the expanded position, the at least one first flarable crown and the at least one second flarable crown are flared in a direction perpendicular to a longitudinal axis of the endovascular fixation device to form the first flared crown and the second flared crown.

Clause 13: The endovascular fixation device of any of clauses 1-12, wherein, when at least one of the first radially expandable ring or the second radially expandable ring is in the expanded position, the at least one first flared crown or the at least one second flared crown are flared beyond perpendicular relative to a longitudinal axis of the endovascular fixation device.

Clause 14: The endovascular fixation device of any of clauses 1-13, further comprising a cover formed from a low-friction material covering at least a portion of the first portion, the second portion, or both the first portion and the second portion.

Clause 15: The endovascular fixation device of any of clauses 1-14, wherein the at least one first connector and the at least one second connector each comprise a first leg, a second leg, and a third leg fixedly connected together at a common point.

Clause 16: The endovascular fixation device of clause 15, wherein the first leg of the at least one first connector comprises a first end opposite the common point, the second leg of the at least one first connector comprises a second end opposite the common point, and the third leg of the at least one first connector comprises a third end opposite the common point, and wherein, upon radially outward expansion of the first radially expandable ring, a distance between the first end and the second end increases, and the third leg is rotated about the common point causing the first crown of the first ring to automatically flare radially outwardly so as to form the first flared crown.

Clause 17: The endovascular fixation device of clause 15, further comprising a plurality of struts connecting the first ring to the second ring, and wherein the first leg of the at least one first connector comprises a first end connected to one of the struts at a first position, the second leg of the at least one first connector comprises a second end connected to another one of the struts at a second position, and the third leg of the at least one first connector comprises a third end connected to the first ring at a third position, and wherein, upon radially outward expansion of the first ring, a distance between the first position and the second position increases, thereby causing the third leg of the at least one first connector to rotate about the common point causing the at least one first flarable crown of the first ring to flare radially outwards to form the first flared crown.

Clause 18: The endovascular fixation device of any of clauses 1-17, wherein the at least one first connector and the at least one second connector each comprise a plurality of legs, at least some of which are fixedly connected together at one or more common points.

Clause 19: The endovascular fixation device of any of clauses 1-18, wherein the at least one first connector and the at least one second connector each comprise a plurality of legs fixedly connected together at one or more common points.

Clause 20: The endovascular fixation device of clause 15, wherein the first leg, the second leg, and the third leg are configured together so the at least one first connector and the at least one second connector twist when moving from the retracted position to the extended position.

Clause 21: The endovascular fixation device of any of clauses 1-20, wherein the flarable crowns of the first ring or the second ring comprise at least one barb configured to anchor the endovascular fixation device at a deployed position when the flaring connectors are in the expanded position.

Clause 22: The endovascular fixation device of any of clauses 1-21, wherein the first portion and the second portion are formed from one or more materials selected from the group consisting of stainless steel, cobalt chromium, nickel-titanium alloy, and biocompatible plastics.

Clause 23: The endovascular fixation device of any of clauses 1-22, wherein the fixation device comprises a shape-memory alloy that has been heat set so the at least one first connector and the at least one second connector are biased to the expanded position so the fixation device is self-expanding.

Clause 24: The endovascular fixation device of any of clauses 1-23, wherein the at least one first connector and/or the at least one second connector comprise a first leg connected to the flarable crown of the radially expandable ring and pairs of second legs extending from the first leg to other portions of the ring, and wherein each pair of second legs connects to the first leg at unique common points on the first leg.

Clause 25: The endovascular fixation device of clause 24, wherein at least a portion of the first flared crown or the second flared crown is automatically bent radially inwardly and towards a middle portion of the endovascular fixation device.

Clause 26: The endovascular fixation device of clause 25, wherein at least a portion of the flared crown is automatically bent radially inwardly and towards the middle portion of the endovascular fixation device at an angle of greater than 90° relative to a longitudinal axis of the endovascular fixation device.

Clause 27: The endovascular fixation device of any of clauses 1-26, wherein the at least one first connector or the at least one second connector comprise a first leg connected to the flarable crown of the expandable ring and at least two pairs of second legs extending from the first leg to other portions of the expandable ring, and wherein each pair of second legs connects to the first leg at a unique common point of the first leg.

Clause 28: The endovascular fixation device of clause 27, wherein, upon the radial expansion of at least one of the first ring or the second ring from the retracted position to the expanded position, a distance between ends of the second legs of each pair of second legs connected to the expandable ring increases causing the first leg to rotate about the unique common points causing the flarable crowns to automatically flare radially outwardly so as to form the flared crowns.

Clause 29: The endovascular fixation device of clause 28, wherein the at least one first flaring connector or the at least one second flaring connector comprises three or more pairs of second legs and three or more common points.

Clause 30: The endovascular fixation device of any of clauses 1-29, wherein the at least one first connector or the at least one second connector comprises a first leg connected to the flarable crown of the expandable ring and at least one pair of second legs extending from a common point of the first leg to other portions of the expandable ring, and wherein at least one of the second legs of the pair comprises an expandable portion Clause 31: The endovascular fixation device of clause 30, wherein the expandable portion allows for further extension of the second leg when the at least one flaring connector is in a nominally deployed configuration.

Clause 32: The endovascular fixation device of clause 31, wherein the first portion or the second portion of the fixation device is configured to adopt a nominally deployed configuration, in which an angle formed between the first leg and each second leg of the pair is less than about 120°, and wherein, in the nominally deployed configuration, the expandable portion of the second leg is capable of further extension.

Clause 33: The endovascular fixation device of clause 32, wherein the first portion or the second portion of the fixation device is configured to transition from the nominally deployed configuration to a post-dilated configuration, and wherein the transition from the nominally deployed configuration to the post-dilated configuration causes extension of the expandable portion of the second leg.

Clause 34: The endovascular fixation device of clause 30, wherein the expandable portion of the second leg comprises at least one of a u-bend, a w-bend, an s-bend, and a j-bend.

Clause 35: The stent device of clause 30, wherein the expandable portion comprises at least one curved segment of the at least one second leg having a curvature of greater than 90° and less than or equal to 180°.

Clause 36: The endovascular fixation device of any of clauses 1-34, wherein the first portion comprises a plurality of first flaring connectors and the second portion comprises a plurality of second flaring connectors, and wherein the pluralities of the flaring connectors each comprise at least one short flaring connector and at least one long flaring connector with an axial length longer than the short flaring connector.

Clause 37: The endovascular fixation device of clause 36, wherein the pluralities of the flaring connectors each comprise multiple short flaring connectors and multiple long flaring connectors connected to the respective expandable rings at alternating positions around the rings.

Clause 38: The endovascular fixation device of clause 37, wherein a short flaring connector of the plurality of first flaring connectors is axially aligned with a long flaring connector of the plurality of second flaring connectors and/or wherein a long flaring connector of the plurality of first flaring connectors is axially aligned with a short flaring connector of the plurality of second flaring connectors.

Clause 39: A method of deploying an endovascular fixation device, comprising the steps of: preparing an endovascular fixation device for a surgical procedure, wherein the endovascular fixation device comprises a first portion comprising a first radially expandable ring and at least one first connector, connected to the first ring, configured to cause at least one first flarable crown of the first ring to flare radially outwardly relative to other portions of the first ring when the first ring is expanded from a retracted position to an expanded position; and a second portion connected to the first portion to define a central lumen extending longitudinally through the first portion and the second portion, the second portion comprising a second ring and at least one second connector, connected to the second ring, configured to cause at least one second flarable crown of the second ring to flare radially outwardly relative to other portions of the second ring when the second ring is expanded from a retracted position to an expanded position, wherein, upon radial expansion of at least one of the first ring or the second ring from the retracted position to the expanded position, the at least one first connector and the at least one second connector cause the at least one first flarable crown of the first ring and the at least one second flarable crown of the second ring to flare radially outwardly relative to other portions of the first ring and the second ring; advancing the endovascular fixation device, with the first ring and the second ring in the retracted position, through a body lumen to a deployment location; and once at the deployment location, deploying the endovascular fixation device, thereby allowing at least one of the first ring or the second ring to expand radially outwardly so as to cause the at least one first flarable crown and the at least one second flarable crown to flare radially and form the first flared crown and the second flared crown.

Clause 40: The method of clause 39, wherein the endovascular fixation device is deployed by an endovascular technique or through a sidewall of the body lumen.

Clause 41: The method of clause 39 or clause 40, wherein deploying the endovascular fixation device comprises expanding an expandable balloon positioned at least partially within the central lumen of the endovascular fixation device, thereby causing at least one of the first ring or the second ring to expand radially outwardly.

Clause 42: The method of any of clauses 39-41, wherein deploying the endovascular fixation device forms an anastomosis between a first blood vessel and a second blood vessel.

Clause 43: The method of clause 42, wherein when the endovascular fixation device is deployed, tissues of walls of the first blood vessel and the second blood vessel are captured by the first portion and the second portion of the fixation device.

Clause 44: The method of any of clauses 39-43, wherein deploying the endovascular fixation device forms a fistula between a first blood vessel and a second synthetic vessel.

Clause 45: The method of clause 44, wherein when the endovascular fixation device is deployed, tissue of the first blood vessel and material of the second synthetic vessel are captured by the first portion and the second portion of the fixation device.

Clause 46: The method of any of clauses 39-45, wherein deploying the endovascular fixation device comprises deploying the endovascular fixation device within a lumen of, or adjacent to, an implanted stent or graft to anchor the stent or graft at a selected location within the body lumen to prevent migration of the stent or graft from the selected location.

Clause 47: The method of any of clauses 39-46, wherein deploying the endovascular fixation device comprises deploying the endovascular fixation device in the body lumen of a first blood vessel that is within or adjacent to a second blood vessel, and wherein, upon deployment, the first flared crown and the second flared crown engage portions of the first blood vessel and the second blood vessel to create an anastomosis between the first blood vessel and the second blood vessel.

Clause 48: An endovascular fixation device comprising: a radially expandable middle portion comprising a plurality of struts; a plurality of first flarable crowns forming a first radially expandable ring, wherein the first flarable crowns are configured to flare radially outwardly relative to the middle portion when the fixation device is expanded from a retracted position to an expanded position; and a plurality of second flarable crowns forming a second radially expandable ring, wherein the second flarable crowns are configured to flare radially outwardly relative to the middle portion when the fixation device is expanded from the retracted position to the expanded position, wherein, upon expansion of the fixation device from the retracted position to the expanded position, the first flarable crowns flare radially outwardly relative to the middle portion so as to form a plurality of first flared crowns and the second flarable crowns flare radially outwardly relative to the middle portion so as to form a plurality of second flared crowns.

Clause 49: The endovascular fixation device of clause 48, wherein the fixation device is configured to form a fistula between a first blood vessel and a second blood vessel when deployed.

Clause 50: The endovascular fixation device of clause 48, wherein the fixation device is configured to form an anastomosis between a first blood vessel and a second blood vessel that is within or adjacent to the first blood vessel.

Clause 51: The endovascular fixation device of clause 48, wherein the fixation device is configured to secure a previously deployed device within a blood vessel.

Clause 52: The endovascular fixation device of any of clauses 48-51, wherein the fixation device is not biased to the expanded position.

Clause 53: The endovascular fixation device of any of clauses 48-51, wherein the fixation device is biased to the expanded position so the device is self-expanding.

Clause 54: The endovascular fixation device of any of clauses 48-53, wherein the middle portion directly connects the first radially expandable ring to the second radially expandable ring.

Clause 55: The endovascular fixation device of any of clauses 48-53, wherein the middle portion further comprises one or more third radially expandable rings connected by the plurality of struts to the first radially expandable ring and the second radially expandable ring.

Clause 56: The endovascular fixation device of clause 55, wherein the middle portion comprises at least two third radially expandable rings and one or more interconnecting members attached to the at least two third radially expandable rings so that, when the at least two third radially expandable rings are expanded from a retracted position to an expanded position, the first expandable ring and the second expandable ring also expand from the retracted position to the expanded position, thereby causing the first flarable crowns to flare radially outwardly to form the plurality of first flared crowns and the second flarable crowns to flare radially outwardly to form the plurality of second flared crowns.

Clause 57: The endovascular fixation device of any of clauses 48-56, further comprising a cover formed from a low-friction material covering at least a portion of the fixation device.

Clause 58: The endovascular fixation device of any of clauses 48-57, further comprising a cover formed from a low-friction material entirely covering the fixation device.

Clause 59: The endovascular fixation device of any of clauses 48-58, wherein each first flarable crown comprises a first connector that includes a first leg, a second leg and a third leg connected together at a first common point, and each second flarable crown comprises a second connector that includes a fourth leg, a fifth leg, and a sixth leg fixedly connected together at a second common point.

Clause 60: The endovascular fixation device of clause 59, wherein the first leg comprises a first end opposite the first common point, the second leg comprises a second end opposite the common point, and the third leg comprises a third end opposite the common point, and wherein, upon radially outward expansion of the first ring, a distance between the first end and the second end increases, and the third leg is rotated about the common point causing a corresponding first crown of the first ring to automatically flare radially outwardly so as to form a corresponding flared first crown.

Clause 61: The endovascular fixation device of any of clauses 48-60, wherein each first flarable crown comprises a first connector that includes a plurality of first legs, and each second flarable crown comprises a second connector that includes a plurality of second legs, wherein at least some of the first legs are fixedly connected together at one or more first common points and at least some of the second legs are connected together at one or more second common points.

Clause 62: The endovascular fixation device of any of clauses 48-61, wherein each first flarable crown comprises a first connector that includes a plurality of first legs fixedly connected together at one or more first common points, and each second flarable crown comprises a second connector that includes a plurality of second legs fixedly connected together at one or more second common points.

Clause 63: The endovascular fixation device of clause 59, wherein the first leg, the second leg and the third leg are configured together so the first connector twists when the fixation device moves from the retracted position to the extended position.

Clause 64: The endovascular fixation device of clause 63, wherein the fourth leg, the fifth leg and the sixth leg are configured together so the second connector twists when the fixation device moves from the retracted position to the extended position.

Clause 65: The endovascular fixation device of any of clauses 48-64, wherein at least some of, or all of, the first flarable crowns and the second flarable crowns comprise at least one barb configured to anchor the endovascular fixation device at a deployed position.

Clause 66: The endovascular fixation device of any of clauses 48-65, wherein the fixation device comprises one or more materials selected from the group consisting of stainless steel, cobalt chromium, nickel-titanium alloy, or biocompatible plastics.

Clause 67: The endovascular fixation device of clause 59, wherein the endovascular fixation device comprises a shape-memory alloy that has been heat set so the first connector and the second connector are biased to the expanded position so the fixation device is self-expanding.

Clause 68: An endovascular fixation device comprising: a radially expandable middle portion; a first fixation portion connected to a first end of the middle portion configured to flare radially outwardly relative to the middle portion, the first fixation portion comprising: a plurality of outer first flarable crowns forming an outer first radially expandable ring, wherein the outer first flarable crowns are configured to flare radially outwardly relative to the middle portion bending towards the middle portion when the fixation device is expanded from a retracted position to an expanded position; and a plurality of inner first flarable crowns forming an inner first radially expandable ring positioned between the outer first radially expandable ring and the middle portion, wherein the inner first flarable crowns are configured to flare radially outwardly relative to the middle portion bending away from the middle portion when the fixation device is expanded from the retracted position to the expanded position; and a second fixation portion connected to a second end of the middle portion configured to flare radially outwardly relative to the middle portion, the second fixation portion comprising: a plurality of outer second flarable crowns forming an outer second radially expandable ring, wherein the outer second flarable crowns are configured to flare radially outwardly relative to the middle portion bending towards the middle portion when the fixation device is expanded from a retracted position to an expanded position; and a plurality of inner second flarable crowns forming an inner second radially expandable ring positioned between the outer second radially expandable ring and the middle portion, wherein the inner second flarable crowns are configured to flare radially outwardly relative to the middle portion bending away from the middle portion when the fixation device is expanded from the retracted position to the expanded position, wherein, upon expansion of the fixation device from the retracted position to the expanded position, the flarable crowns of the first fixation portion and the flarable crowns of the second fixation portion flare radially outwardly relative to the middle portion so as to form flared crowns.

Clause 69: The endovascular fixation device of clause 68, wherein the middle portion comprises a radially expandable body portion comprising a plurality of radially expandable rings arranged in a series along a longitudinal axis of the fixation device and at least one interconnecting member extending between and connecting at least two of the plurality of radially expandable rings.

Clause 70: The endovascular fixation device of clause 69, wherein radially outward expansion of the plurality of radially expandable rings of the body portion causes at least one of the plurality of first flarable crowns or the plurality of second flarable crowns to automatically flare to form the flared crowns.

Clause 71: The fixation device of any of clauses 68-70, wherein the plurality of flarable crowns of the first fixation portion or the flarable crowns of the second fixation portion comprise at least one short flarable crown and at least one long flarable crown with an axial length longer than the at least one short flarable crown.

Clause 72: The fixation device of any of clauses 68-71, wherein the plurality of flarable crowns of the first fixation portion or the flarable crowns of the second fixation portion comprise multiple short flarable crowns and multiple long flarable crowns with an axial length longer than the short flarable crowns.

Clause 73: An endovascular fixation assembly comprising: an endovascular fixation device comprising: a radially expandable middle portion; a plurality of first flarable crowns forming a first radially expandable ring connected to the middle portion, wherein the first flarable crowns are configured to flare radially outwardly relative to the middle portion when the fixation device is expanded from a retracted position to an expanded position; and a plurality of second flarable crowns forming a second radially expandable ring connected to the middle portion, wherein the second flarable crowns are configured to flare radially outwardly relative to the middle portion when the fixation device is expanded from the retracted position to the expanded position, wherein, upon expansion of the fixation device from the retracted position to the expanded position, the first flarable crowns flare radially outwardly relative to the middle portion so as to form a plurality of first flared crowns and the second flarable crowns flare radially outwardly relative to the middle portion so as to form a plurality of second flared crowns; a radially expandable stent spaced apart from the fixation device; and a cover covering or enclosing at least a portion of the fixation device and at least a portion of the stent and connecting the fixation device to the stent.

Clause 74: The fixation assembly of clause 73, wherein a longitudinal axis of the fixation device and a longitudinal axis of the stent are each co-extensive with a longitudinal axis of the cover.

Clause 75: The fixation assembly of clause 73 or clause 74, wherein the cover comprises a low-friction material.

Clause 76: The fixation assembly of clause 75, wherein the low-friction material comprises ePTFE.

Clause 77: The fixation assembly of any of clauses 73-76, wherein the stent comprises a plurality of radially expandable rings arranged in a series along a longitudinal axis of the stent and at least one interconnecting member extending between and connecting the plurality of radially expandable rings.

Clause 78: The fixation assembly of clause 77, wherein the at least one radially expandable ring of the stent comprises a plurality of substantially repeating bent segments comprising a peak, a valley, and a transition region disposed between the peak and the valley.

Clause 79: The fixation assembly of any of clauses 73-78, wherein the at least one of the stent or the fixation device is formed from a material without shape memory properties.

Clause 80: The fixation assembly of any of clauses 73-79, wherein at least one of the stent or the fixation device is formed from a material with shape memory properties.

These and other features and characteristics of the invention, as well as the methods of operation and functions of the related elements of structures and the combination of parts and economies of manufacture, will become more apparent upon consideration of the following description and appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 17C is a front perspective view of an outwardly flarable portion of the endovascular fixation device of FIG. 17A in a nominally deployed configuration;

FIG. 17D is a front perspective view of the outwardly flarable portion of the endovascular fixation device of FIG. 17A in a post-dilated configuration;

FIGS. 18A-18C show examples of expandable portions of a leg of a flaring connector, according to an aspect of the disclosure;

FIG. 21A is a front perspective view of an endovascular fixation assembly comprising an endovascular fixation device and stent in a retracted position, according to an aspect of the disclosure;

FIG. 21B is a front perspective view of the fixation assembly of FIG. 21A in an expanded position, according to an aspect of the disclosure;

FIGS. 29A-29F show stent strut designs that will impart a twist in the flaring crown as it is expanded, according to an aspect of the disclosure;

DESCRIPTION OF THE INVENTION

Figure 1A:
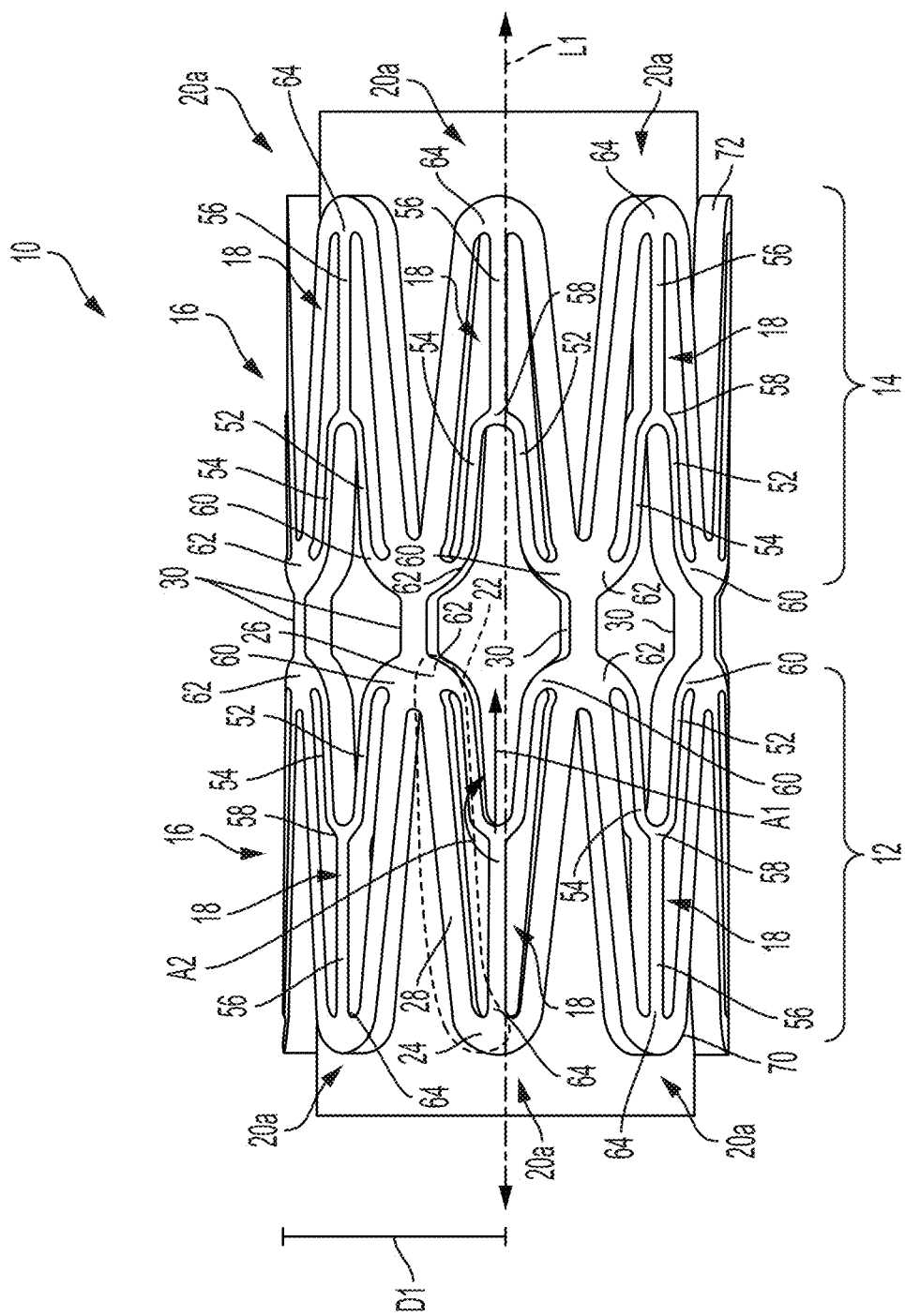
FIG. 1A is a perspective view of an endovascular fixation device in a retracted position, according to an aspect of the disclosure.
Figure 1B:
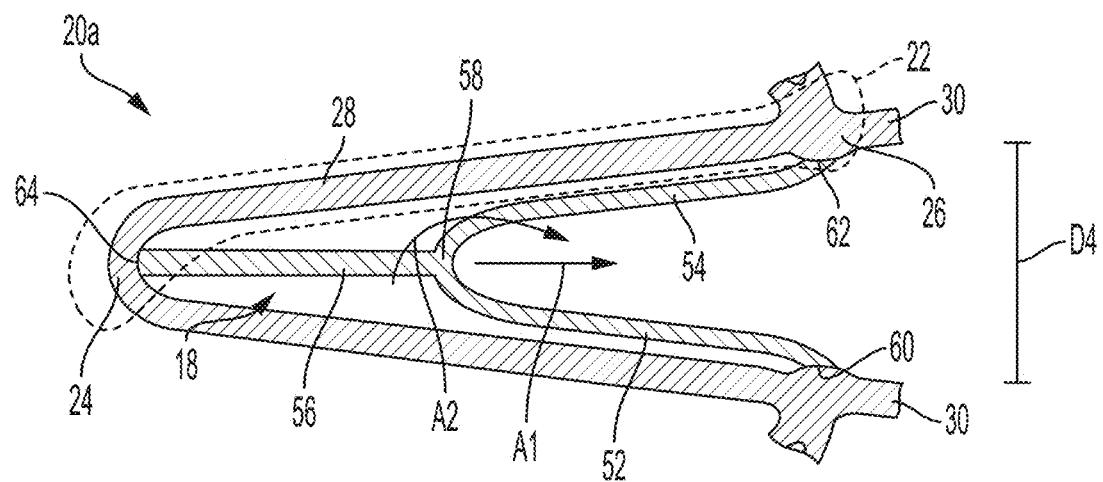
FIG. 1B is an enlarged view of a flarable crown of the endovascular fixation device of FIG. 1A in the retracted position.
Figure 1C:
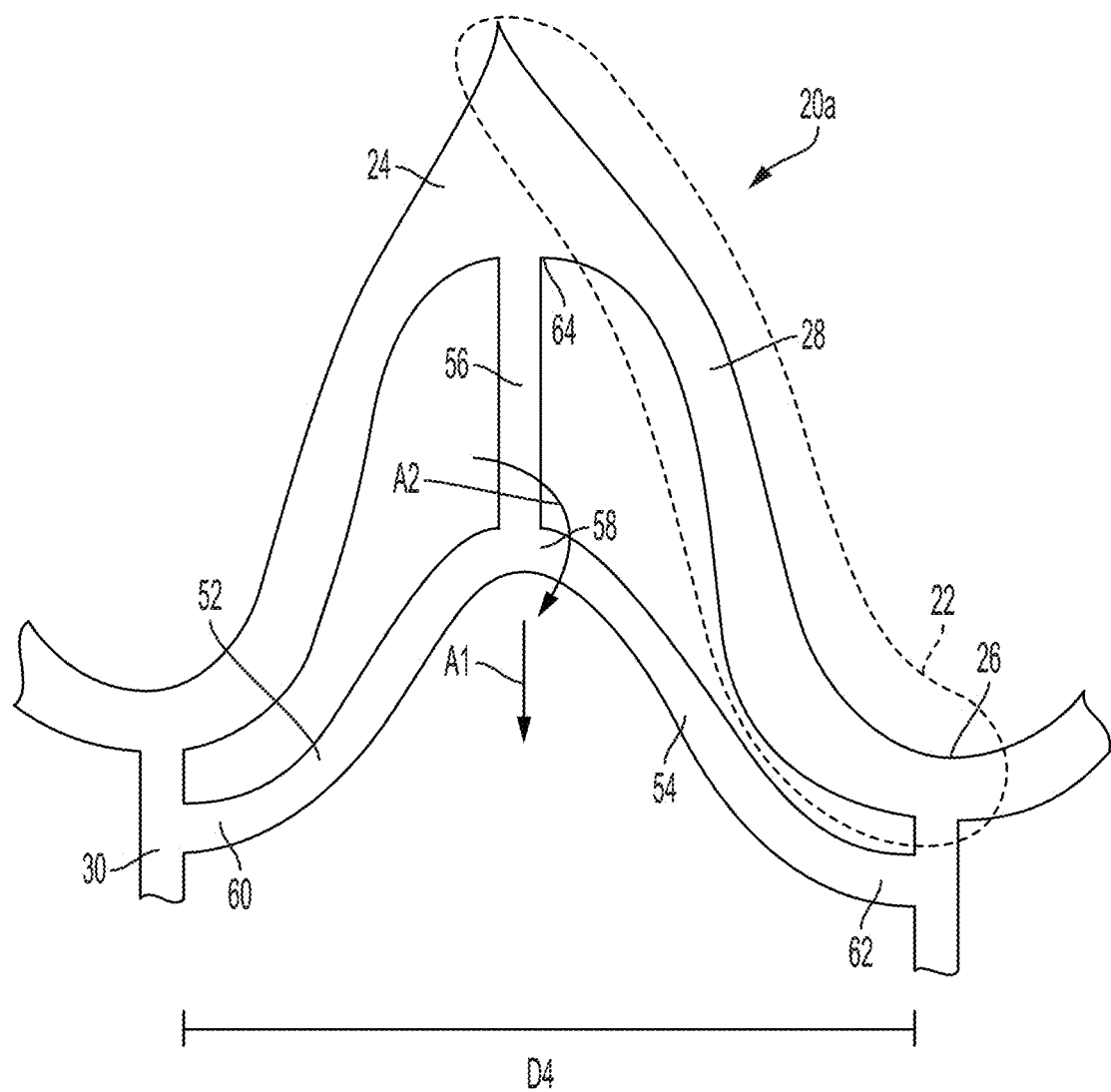
FIG. 1C is an enlarged view of a flarable crown of another embodiment of an endovascular fixation device in a retracted position, according to an aspect of the disclosure.

The illustrations generally show illustrative and non-limiting aspects of the devices, assemblies, and methods of the present disclosure. While the descriptions present various aspects of the devices and assemblies, it should not be interpreted in any way as limiting the disclosure. Furthermore, modifications, concepts, and applications of the disclosure's aspects are to be interpreted by those skilled in the art as being encompassed by, but not limited to, the illustrations and descriptions herein.

Further, for purposes of the description hereinafter, the terms "end", "upper", "lower", "right", "left", "vertical", "horizontal", "top", "bottom", "lateral", "longitudinal", "radial", and derivatives thereof shall relate to the disclosure as it is oriented in the drawing figures. The term "proximal" refers to the direction toward the center or central region of the device. The term "distal" refers to the outward direction extending away from the central region of the device. However, it is to be understood that the disclosure may assume various alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting. For the purpose of facilitating understanding of the disclosure, the accompanying drawings and description illustrate preferred aspects thereof, from which the disclosure, various aspects of its structures, construction and method of operation, and many advantages may be understood and appreciated.

With reference to the figures, the present disclosure is directed to an endovascular device, such as an endovascular fixation device 10, configured to be implanted in a body passageway or duct, referred to herein more generally as a body lumen, of a patient, and to methods of deploying such an endovascular fixation device 10 in the body lumen. In some examples, the fixation device 10 is deployed within an opening between adjacent lumens of blood vessels to create a fistula or anastomosis. The fixation device 10 can also be configured to anchor another device or tissue in place within or adjacent to the body lumen or to another previously deployed device. In order to provide or enhance such fixation, the device 10 may include anchoring structures, such as crowns, edges, ridges, protrusions, barbs, hooks, spikes, spurs, or similar anchoring structures, for engaging tissues surrounding the body lumen to maintain positioning of the fixation device 10 at a desired deployment location within the body lumen. For example, the fixation device 10 can be configured to provide fixation inside the body lumen of a vessel from anchoring structures arranged around a circumference of the device 10. This fixation provided by the fixation device 10 may be circumferential and/or axial in nature.

In some examples, the device 10 is deployed by expanding the device 10 from a retracted position to an expanded position. For example, the device 10 can be expanded by expanding a dilating or balloon catheter positioned within a central lumen of the device 10. In some examples, the endovascular fixation device 10 is "self-flaring," meaning that the anchoring structures are configured to flare radially outwardly relative to other portions of the endovascular fixation device 10 when the device 10 is expanded and without needing to perform a second action (e.g., without needing to expand a second dilating or balloon catheter) to cause portions of the device 10 to flare. For example, various arrangements of struts, tines, connectors, or segments of the device 10 can be positioned to twist, rotate, or bend relative to other portions of the device 10 in response to expansion of the device 10, which causes the anchoring structures to flare. It is also understood that the arrangements of fixation devices 10 disclosed herein are not limited to use with endovascular procedures, such as anchoring or creating fistulas and anastomosis. For example, the fixation device designs disclosed herein can be used in any number of medical applications and procedures in which a self-flaring structure could be used for maintaining positioning of a medical device within a body lumen. For example, medical devices including implantable grafts, drug delivery devices, filters, shunts, and similar medical devices could all be modified to include the self-flaring designs of the present disclosure. Furthermore, fixation device designs of this disclosure may be used to create fistulas and anastomosis in other structures besides blood vessels, such as the small intestine, large intestine, or biliary ducts.

Generally, the fixation device 10 is a substantially tubular structure formed from interconnected members, tines, rings, and/or struts. The members, tines, rings, and/or struts of the fixation device 10 can be formed from suitable metal materials, such as stainless steel or cobalt chromium, as well as from a nickel-titanium alloy (such as NITINOL), biocompatible polymers, absorbable polymers, and other biomaterials. The fixation device 10 can be coated, covered, partially covered, fully encapsulated, partially encapsulated, or uncovered. In some examples, the members, tines, rings, and/or struts of the fixation device 10 can be cut from a continuous tube by an automated cutting process, such as laser cutting. In some instances, portions of the fixation device 10 can also be formed by connecting separate elongate members together to form the tubular structure. For example, elongate members can be connected together by ultrasonic welding, laser welding, or another suitable connecting process. Also, a plurality of tines or elongate members could be woven together to form portions of the fixation device 10.

In some examples, the fixation device 10 is an elongated structure including opposing outwardly flaring portions, referred to herein as a first outwardly flaring portion 12 and a second outwardly flaring portion 14, directly or indirectly connected together to form an elongated device defining a central lumen. The outwardly flaring portions 12, 14 include a number of flared anchoring structures or crowns for maintaining positioning of the fixation device 10 in the body lumen. The anchoring structures or crowns are referred to herein as flarable crowns 20a when the device 10 is in a retracted state (as shown in FIG. 1A). When the device 10 is expanded, such that the crowns flare radially outwardly (as in FIGS. 2A and 2B), the crowns are referred to herein as flared crowns 20b. The flarable crowns 20a can include different types of rounded peaks (FIG. 1A), pointed or sharpened peaks (FIG. 8), protrusions, hooks, barbs, spikes, pins, spurs, or similar anchoring structures configured to flare radially outwardly upon radial expansion of the outwardly flaring portions 12, 14. The arrangement, size, and shape of these flarable crowns 20a can be selected based on the intended deployment location of the fixation device 10 and/or a size and shape of the device 10.

In some examples, the fixation device 10 is a symmetrical structure. For example, the first outwardly flaring portion 12 can be a mirror image of the second outwardly flaring portion 14. As used herein, "mirror image" means that the first flaring portion 12 is identical in form to the second outwardly flaring portion 14, but with the structure reversed about, for example, a central vertical axis of the device 10. The device 10 can also be symmetrical about a horizontal or longitudinal axis of the device 10. However, the device 10 need not be symmetrical, and the first outwardly flaring portion 12 could include a different arrangement of flarable crowns 20a than the second outwardly flaring portion 14. For example, the first outwardly flaring portion 12 could include a different number of flarable crowns 20a or flarable crowns 20a having a different shape, size, flare angle, or position on a circumference of the device 10, than the flarable crowns 20a of the second outwardly flaring portion 14. In some examples, the flarable crowns 20a of the first portion 12 may have a substantially different configuration of rounded peaks, pointed or sharpened peaks, protrusions, hooks, barbs, spikes, pins, spurs, or similar anchoring structures than the flarable crowns 20a of the second outwardly flaring portion 14.

An exemplary, non-limiting fixation device 10, including the first outwardly flaring portion 12 and the second outwardly flaring portion 14, is shown in FIGS. 1A-2B. In the fixation device 10, the flarable crowns 20a of the first outwardly flaring portion 12 are pointed or flared towards a first end 70 of the device 10. The flarable crowns 20a of the second outwardly flaring portion 14 are pointed or flared towards a second end 72 of the device 10. The flarable crowns 20a include substantially rounded edges or peaks, which are not sharpened and do not penetrate tissue of a blood vessel or another anatomical structure. Instead, as described herein, it is expected that tissue of vessel walls will be pressed or captured between the flarable crowns 20a of the outwardly flared portions 12, 14 when the device 10 is expanded. The first outwardly flaring portion 12 is connected to the second outwardly flaring portion 14 by longitudinally extending struts 30. As shown in FIGS. 1A-2B, the first outwardly flaring portion 12 is a mirror image of the second outwardly flaring portion 14 and includes the same features as the second outwardly flaring portion 14. However, as described previously, non-symmetrical fixation devices could also be made within the scope of the present disclosure.

In some examples, the outwardly flaring portions 12, 14 can include a radially expandable ring 16 and flaring connectors 18 connected to the ring 16 at positions around a circumference on the ring 16. As shown in FIGS. 1A-2B, the device 10 includes two rings 16. The ring 16 of the first outwardly flaring portion 12 is connected to the ring 16 of the second outwardly flaring portion 14 by the struts 30. In other examples, the device 10 may have additional rings, which form a body portion of the device 10. In some examples, the additional rings can also include flarable crowns 20a extending radially outwardly from a middle of the device 10. In other examples, the additional rings can be expandable, but remain ring-shaped, following expansion, as these additional middle rings have no flarable crowns.

As shown in FIGS. 1A-2B, the outwardly flaring portions 12, 14 each include eight flaring connectors 18. However, this number of flaring connectors 18 is not meant to limit the scope of the present disclosure. For example, some fixation devices 10 may include fewer than eight flaring connectors 18. Some fixation devices 10 may include more than eight flaring connectors 18. The number of flaring connectors may be even or odd depending upon the embodiment desired. Also, the flaring connectors 18 do not need to be equidistantly spaced around a circumference of the device 10. Some fixation devices 10 could include only a single flaring connector 18. Some fixation devices 10 could include some flaring connectors 18 and some crowns of the ring 16 that do not flare. Some fixation devices 10 could include some flaring connectors 18 and some crowns of the ring 16 that do not flare arranged in an alternating, selected or random pattern. The flaring connector(s) 18 are configured to cause portions or segments of the ring 16, referred to herein as the flarable crowns 20a, to flare radially outwardly relative to other portions of the ring 16 as the ring 16 expands. Dimensions of the outwardly flaring portions 12, 14, such as a longitudinal length of the flarable crowns 20a, can be selected based on a size of the fixation device 10, intended deployment location, and intended manner of use. For example, longer outwardly flaring portions 12 may be useful for fixation devices 10 intended to be implanted in large vessels. Thicker and stronger outwardly flaring portions 12 may be useful for applications of fixation devices 10 that require a more secure attachment. Outwardly flaring portions 12 that flare to different angles can be useful for applications that have different anchoring requirements or device interactions. Also, longer outwardly flaring portions 12, 14 have increased surface area. The increased surface area may be useful for holding or capturing tissue of a vessel wall between the outwardly flaring portions 12, 14 when the fixation device 10 is used to create a fistula or anastomosis. Similarly, an angle of flare, length, and geometry of the flarable crowns 20a can be selected or customized for particular uses. Generally, the flarable crowns 20a can flare from more than 0° up to 180° relative to a longitudinal axis L1 of the device 10. For example, some flarable crowns 20a can be made to flare by 45° or more (up to almost 180°) relative to the longitudinal axis L1. Other flarable crowns 20a may only flare outwardly from other portions of the device 10 by 10° or less so long as they possess a non-zero flare. Alternatively, some flarable crowns 20a may flare while other crowns are not flarable crowns 20a and do not flare.

Figure 2A:
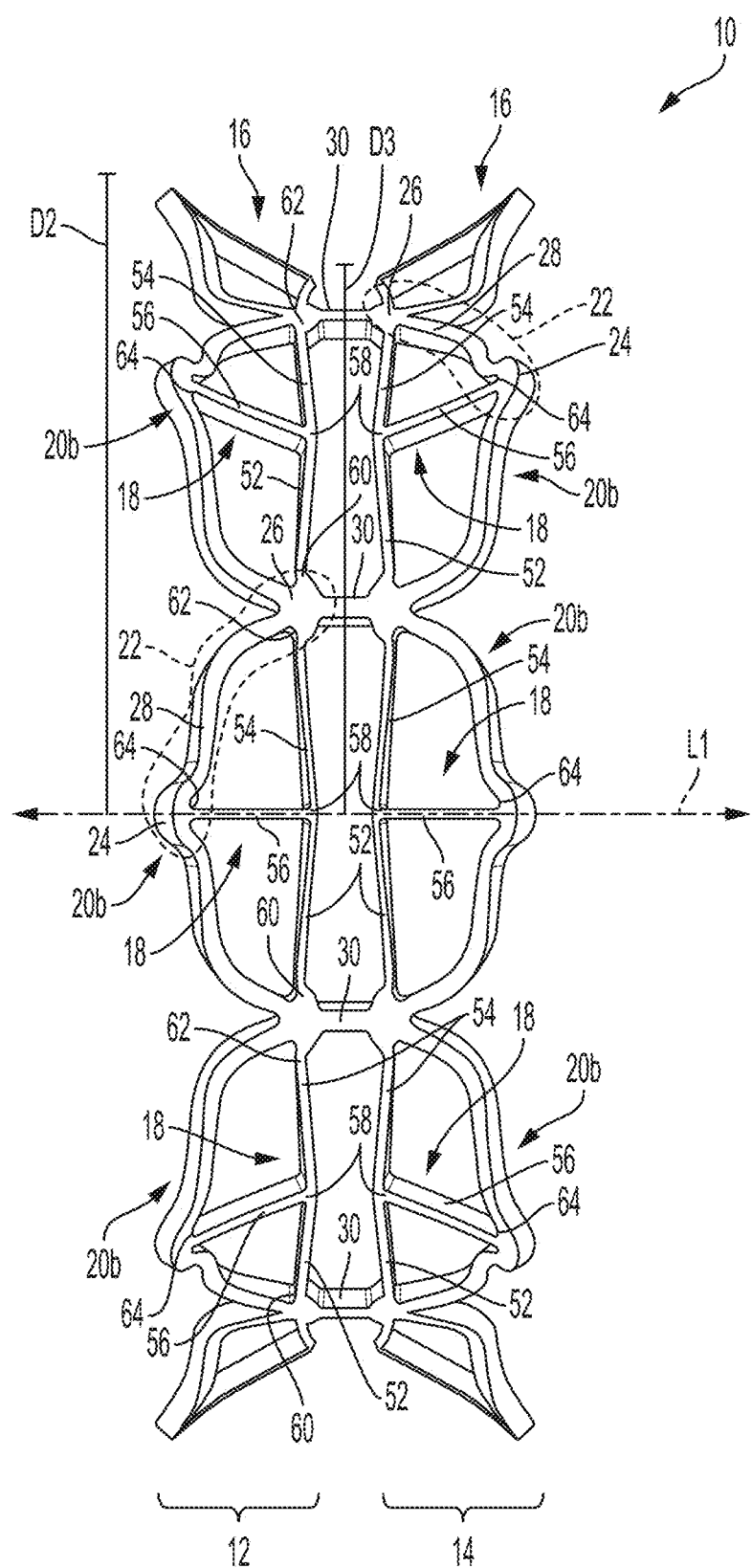
FIG. 2A is a perspective view of the endovascular fixation device of FIG. 1A in an expanded position.
Figure 2B:
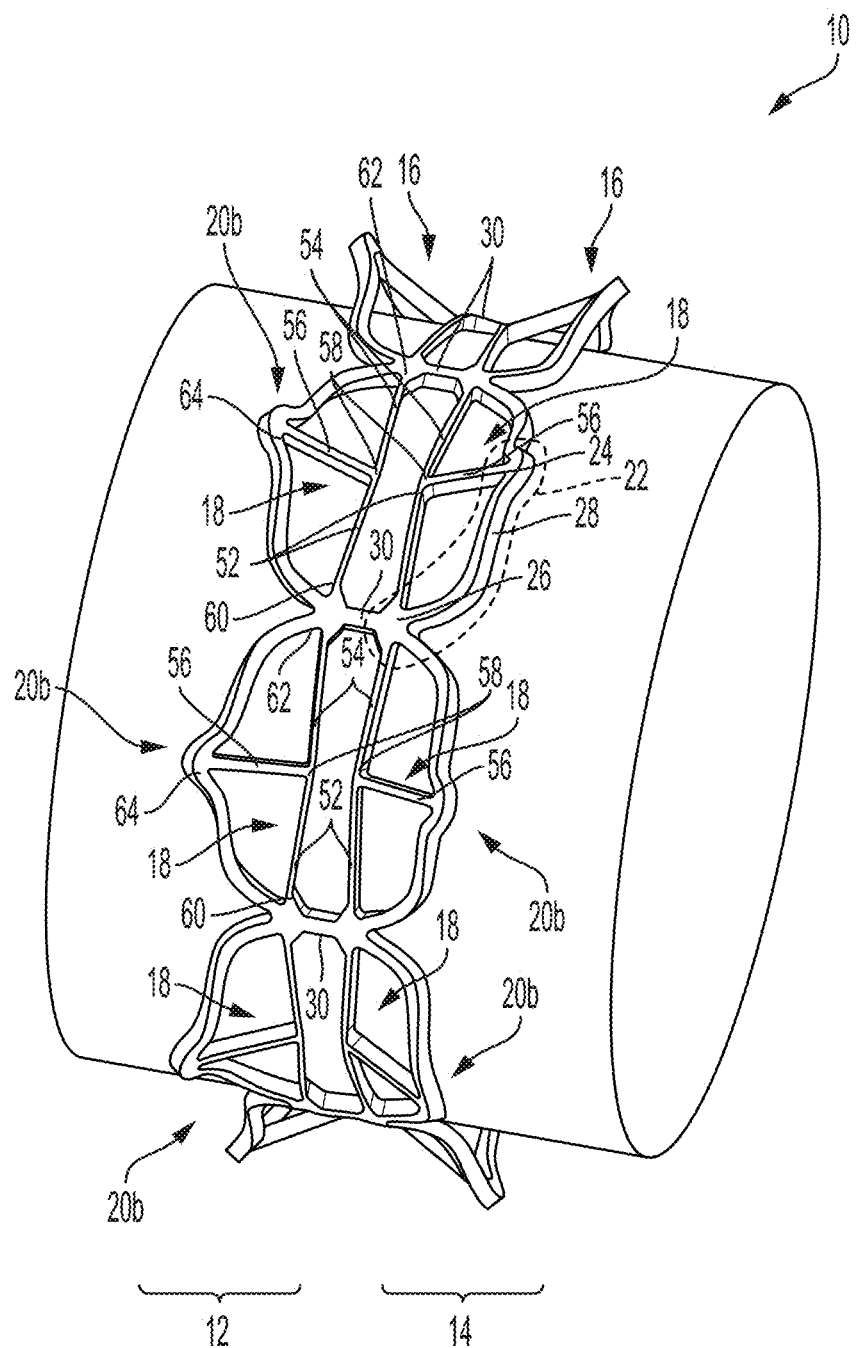
FIG. 2B is another perspective of the endovascular fixation device of FIG. 1A in the expanded position.

In order to cause the flarable crowns 20a to flare radially outwardly, the flaring connector 18 is configured to transition from a retracted position (shown in FIGS. 1A, 1B and 1C) to an expanded position (shown in FIGS. 2A and 2B). In the retracted position (shown in FIGS. 1A, 1B and 1C), the flarable crowns 20a are recessed or substantially aligned with other portions of the ring 16. In this position, the flarable crowns 20a do not protrude beyond an outer circumference of the device 10 defined by the ring 16, giving the device 10 a substantially cylindrical appearance. In the retracted position, the device 10 can be easily advanced through a delivery catheter to a deployment location in the body lumen. In the expanded position (shown in FIGS. 2A and 2B), the flared crowns 20b of the ring 16 flare radially outwardly relative to the other portions of the ring 16 and device 10. As evident from FIGS. 1A, 2A, 1B and 2B, the half-diameter (radius) D2 of the fixation device 10 in the expanded position is greater than the half-diameter (radius) D1 of the device 10 in the retracted position. Thus, the diameter of the fixation device 10 in the expanded position is greater than the diameter of the device 10 in the retracted position.

In some examples, as discussed previously, the device 10 is "self-flaring" meaning that the flaring connector(s) 18 transition from the retracted position to the expanded position automatically in response to radial outward expansion of other portions of the device 10 and, in particular, in response to expansion of the ring(s) 16. For example, the ring(s) 16 can be expanded by expanding a dilating or balloon catheter device positioned in a central lumen of the fixation device 10. Expansion of the ring(s) 16 is transferred to the flaring connector(s) 18. The flaring connector(s) 18 cause the flarable crowns 20a to flare outwardly thereby forming the flared crowns 20b when ring(s) 16 expand.

The flaring connector(s) 18 and other portions of the fixation device 10 disclosed herein do not need to be "self-expanding" or "internally biased" to the expanded position in order to cause the flarable crowns 20a to flare radially outwardly. As used herein, a member or connector is "biased to" or "internally biased to" an orientation or position when internal forces of the member or connector cause the member or connector to adopt a particular orientation or position. For example, devices formed from shape memory materials, such as nickel-titanium alloy, can be biased to a deployed or expanded state. Such devices are configured to automatically move from a retracted state to the deployed or expanded state immediately after the device is pushed from a catheter and without, for example, needing to expand a dilating or balloon catheter device to cause the device 10 to expand. Such devices are often referred to as "self-expanding." Some devices formed from shape memory materials can also adopt a new orientation or position in response to changes in temperature. For example, a device formed from a shape memory material can be configured to expand as temperature increases, as occurs when the device is implanted in the body. Manufacturing fixation devices so as to be self-expanding and/or temperature sensitive increases manufacturing costs and complexity. Accordingly, a fixation device 10 that includes flaring connectors 18 that do not need to be internally biased and which move in response to expansion of other portions of the device 10, as provided by the various fixation devices 10 disclosed herein, offers certain benefits over currently available self-expanding fixation devices.

Although this device 10 does not have to be made out of a super elastic material, such as NITINOL (a nickel-titanium alloy distinguished from other materials by its shape memory and super elastic characteristics), the use of such materials can provide benefits that are useful for different applications. The flaring connector(s) 18 and other portions of the fixation device 10 disclosed herein can be "self-expanding" or "internally biased" to the expanded position. In this application the flared crowns 20b are supported by the flaring connector(s) 18. The flaring connector(s) 18 function as support struts when made from NITINOL and heat set in the expanded position. Thus, configurations of fixation devices 10 disclosed herein may be made to be self-expanding or internally biased by making the device 10 out of NITINOL and heat setting the device 10 in an expanded condition to impart self-expanding, internally biased characteristics to the device 10. When configured in this manner, the flared crowns 20b are held in position by the flaring connector(s) 18 as long as the diameter of the device 10 remains in the expanded position, which produces the supported flares. Additionally, the transition region 28 between the peak 24 and the valley 26 can be reinforced to further support the flared crown 20a from collapsing. This transition region can be supported by the design or by using external supports to the transition region 28.

As used herein, a member or connector is "biased to" or "internally biased to" an orientation or position when internal forces of the member or connector cause the member or connector to adopt a particular orientation or position. For example, devices formed from shape memory materials can be biased to a deployed or expanded state as described above by heat setting. Such devices are configured to automatically move from a retracted state to the deployed or expanded state immediately after the device is pushed from a catheter and without, for example, needing to inflate a dilating or balloon catheter device to cause the device 10 to expand. Such devices are thus referred to as "self-expanding." Some devices formed from shape memory materials can also adopt a new orientation or position in response to changes in temperature. For example, a device formed from a shape memory material can be configured to expand as temperature increases, as occurs when the device is implanted in the body. Accordingly, a fixation device 10 that includes flared crowns 20a that are internally biased and supported from collapse with flaring connectors 18, as provided by the various fixation devices 10 disclosed herein, offers certain benefits over currently available self-expanding fixation devices.

With continued reference to FIGS. 1A-2B, in some examples, the rings 16 of the outwardly flaring portions 12, 14 are circular or cylindrical structures, at least in the retracted position. When the flaring connectors 18 are in the retracted position, the flarable crowns 20a and other portions of the ring 16 are all a distance D1 (shown in FIG. 1A) from the longitudinal axis L1 of the device 10. When the flaring connectors 18 are in the expanded position (shown in FIG. 2A), flared crowns 20b of the rings 16 are a distance D2 from the central longitudinal axis L1. Other portions of the rings 16 are a distance D3 (shown in FIG. 2A) from the central longitudinal axis L1. Distances D2, D3 are each longer than distance D1, since the entire ring 16 expands radially outwardly. The distance D2 is greater than the distance D3, since the flared crowns 20b flare radially outwardly relative to other portions of the expanded rings 16 that are located at distance D3.

The expandable ring 16 can be formed with multiple flexible, folded, or bent segments or regions connected together about the circumference of the ring 16 and configured to unfold as the ring 16 expands radially outwardly. For example, the expandable ring 16 can include repeating or substantially repeating bent segments 22, as shown in FIGS. 1A, 1B, 1C, 2A and 2B. The bent segments 22 can be connected together (e.g., connected together end to end) to form the ring 16. As used herein, "substantially repeating" bent segments can refer to units that are repeating, but could accommodate minor interruptions in the repeating pattern. Minor interruptions in the repeating pattern can be, for example, changes or substitutions to the repeating bent segments 22 of the ring(s) 16 that do not affect expansion of the ring(s) 16 or flaring of the flarable crowns 20a. For example, some bent segments 22 could be formed from curved portions (e.g., rather than connected straight segments). Also, some bent segments 22 could be longer or shorter than other bent segments 22 of the ring(s) 16. Thus, the arrangement of bent segments 22 of the ring 16 shown in FIGS. 1A-2A is not intended to be limited to a strict and exact repeating pattern of bent segments 22. For example, a ring 16 that includes repeating bent segments 22, but with one or several minor interruptions to the repeating pattern, is considered to be within the scope of the present disclosure. In some examples, as described in detail in connection with the fixation devices shown in FIGS. 19A-20B, the device 10 can include flarable crowns 20a of different lengths so as to have different length flared crowns 20b or to create an angle by the flare of the device 10.

In some examples, each bent segment 22 includes a peak 24, a valley 26, and a transition region 28 between the peak 24 and the valley 26. The segments 22 are arranged such that a peak 24 of a segment 22 is connected to the peak 24 of an adjacent neighbor segment 22 and a valley 26 of the segment 22 is connected to the valley 26 of its other adjacent neighbor segment 22. The longitudinally extending struts 30 can connect some or all of the bent segments 22 of the first outwardly flaring portion 12 to corresponding points on the second outwardly flaring portion 14. For example, a strut 30 can extend between a valley 26 on the ring 16 of the first outwardly flaring portion 12 and a corresponding valley 26 of the ring 16 of the second outwardly flaring portion 14. As discussed herein in connection with FIGS. 7A and 7B, in some examples, the fixation device 10 includes multiple rings positioned between the outwardly flaring portions 12, 14. For example, the multiple rings can be arranged in series along the longitudinal axis L1 of the device 10. The multiple rings can be connected together by longitudinally extending connectors or struts positioned between the multiple rings.

With continued reference to FIGS. 1A-2B, the structure of the flaring connectors 18 and movement of the flaring connectors 18 between the retracted position and the expanded position will now be described in detail. As discussed previously, with respect to those fixation device configurations that are not internally biased, the flaring connectors 18 are configured to cause the flarable crowns 20a to flare radially outwardly in response to radial expansion of the rings 16 of the first and/or second outwardly flaring portions 12, 14. Thus, in effect, the flaring connectors 18 are designed and arranged to translate the radial expansion of the rings 16 into a pivoting or rotational movement sufficient to cause the flarable crowns 20a of the ring(s) 16 to flare radially outwardly relative to other portions of the ring 16. As discussed previously, flaring connectors 18 can be customized and designed to provide different degrees or angles of flaring (which correspond to different amplitudes of flaring) depending on an intended use or size of the fixation device 10. With respect to internally biased fixation devices, these configurations have the characteristic that the flaring connectors 18 are configured to cause the flarable crowns 20a to flare radially outwardly in response to radial expansion of the rings 16 of the first and/or second outwardly flaring portions 12, 14. Internally biased fixation devices possess the additional characteristic that their flaring connectors 18, having been heat set to an expanded position, provide at least some of the internal biasing forces that cause the self-flaring fixation devices to be self-expanding.

In some examples, the flaring connectors 18 are a framework, trestle, or y-connector including a sloped first portion or leg 52, a sloped second portion or leg 54, and a longitudinally extending third portion or leg 56. The legs 52, 54, 56 are fixedly connected together at a common point 58. In some examples, the first portion or leg 52 includes an end connected to the ring 16 at a first position 60. The second portion or leg 54 includes an end connected to the ring 16 at a second position 62. The third portion or leg 56 includes an end connected to the ring 16 at a third position 64. As shown in FIGS. 1A-2B the first position 60 and the second position 62 are near the valleys 26 of the bent segments 22. In other examples, the first portion or leg 52 and the second portion or leg 54 can be connected to the ring 16 at other positions on the bent segments 22, such as along the transition region 28. In other examples, the first portion or leg 52 and the second portion or leg 54 can be connected to the longitudinal struts 30, as shown, for example, in FIG. 1C.

The portions or legs 52, 54, 56 of the flaring connector 18 are configured such that, upon radially outward expansion of the expandable ring 16, a distance D4 (shown in FIG. 1B) between the first position 60 (e.g., the end of the first leg 52) and the second position 62 (e.g., the end of the second leg 54) increases. Increasing the distance D4 causes the flaring connector 18 to transition from the retracted position to the expanded position by causing the common point 58 to move in a proximal direction (shown by arrow A1 in FIGS. 1A and 1B) and the third portion or leg 56 of the flaring connector 18 to pivot or rotate about the common point 58 in a direction of arrow A2 (shown in FIGS. 1A and 1B) causing the flarable crown 20a of the ring 16 to flare radially outwards so as to form the flared crown 20b. In some examples, the legs 52, 54, 56 can also be positioned to cause the flaring connector 18 to twist as it moves from the retracted position to the extended position to provide a more aggressive gripping force with tissue of the vessel wall. See, for example, FIGS. 20A to 20F. As shown in FIGS. 21A and 21B, there can be multiple common points where the portions or legs can connect. As is shown in FIGS. 20A-21D, any number of legs can be connected to any number of common points, within the scope of the present disclosure.

Figure 3A:
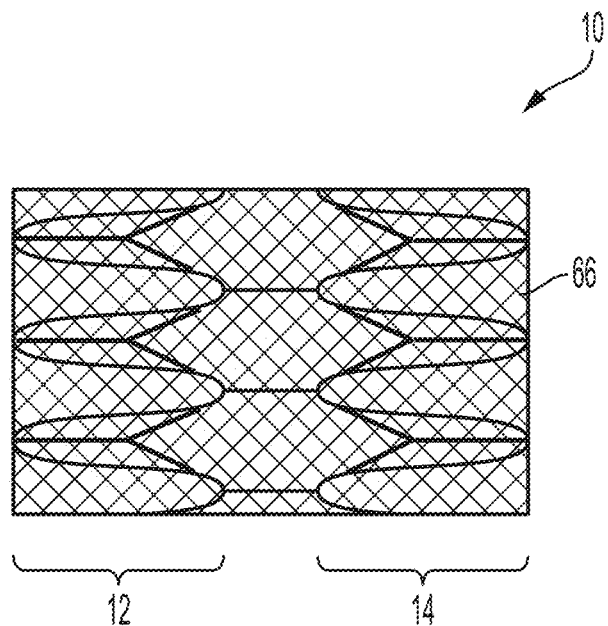
FIG. 3A is a front view of a covered endovascular fixation device in a retracted position, according to an aspect of the disclosure.
Figure 3B:
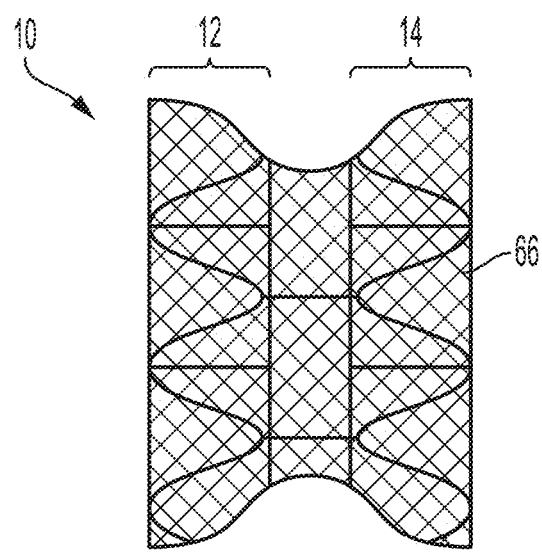
FIG. 3B is a front view of the covered endovascular fixation device of FIG. 3A in an expanded position.

In some examples, the fixation device 10 can be covered or partially covered. An exemplary covered fixation device 10, including features of the present disclosure, is shown in a retracted state in FIG. 3A and in an expanded state in FIG. 3B. As shown in FIGS. 3A and 3B, a cover 66 encloses the entire fixation device 10 including the outwardly flaring portions 12, 14. In other examples, only the outwardly flaring portions 12, 14 of the device 10 are covered and other portions of the device 10 are bare. In other examples, the outwardly flaring portions 12, 14 can protrude through the cover 66. The cover 66 can be formed from, for example, a sheet or film of a biocompatible material. The sheet or film can be configured to protect vessel walls defining the body lumen from edges of the rings 16 and other elongated structures of the device 10. In some examples, the cover 66 can be formed from a low friction material configured to protect the device 10 and to reduce or prevent biological materials from adhering to portions of the device 10. For example, the cover 66 can be formed from a low friction and/or hydroscopic material, such as expandable Polytetrafluoroethylene (ePTFE). The cover 66 may also serve to prevent bleeding at the surgical site where the anastomosis or fistula is created. The cover 66 can be designed so as to perform a secondary function such as to provide hemostasis. The cover 66 can be designed to avoid restricting deployment of the flarable crowns 20*a*.

Figure 4:
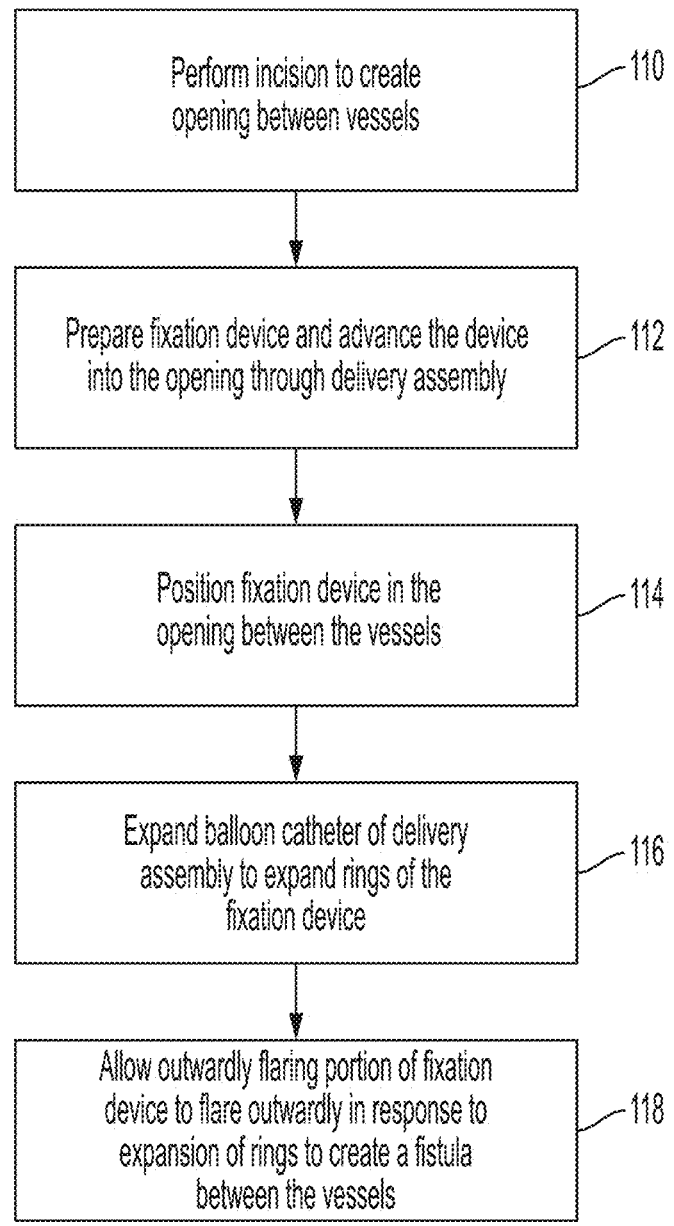
FIG. 4 is a flow chart showing a method for deploying an endovascular fixation device to create a fistula, according to an aspect of the disclosure.
Figure 6:
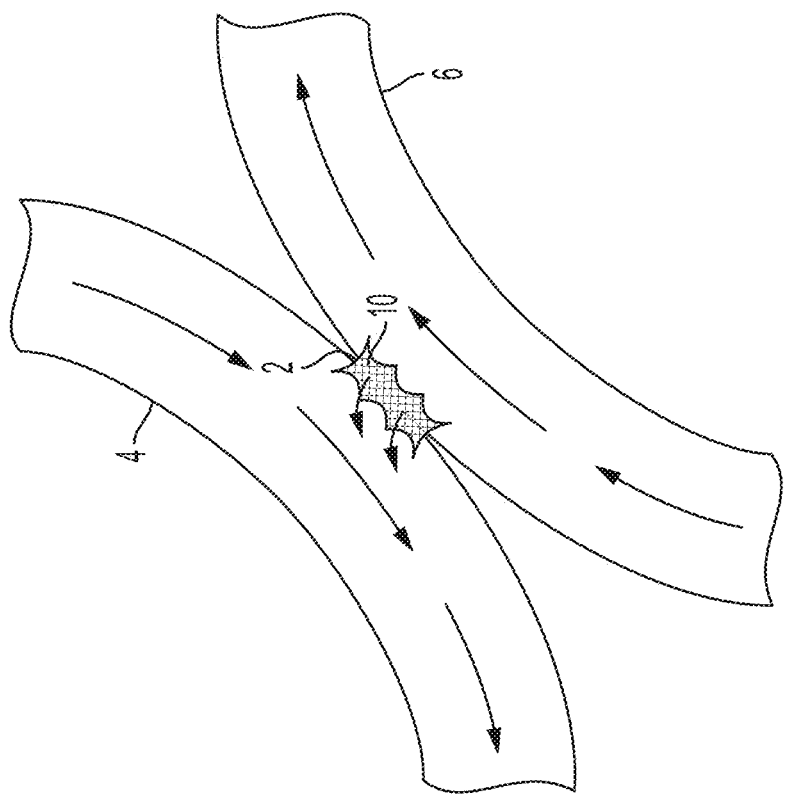
FIG. 6 is a schematic drawing showing the endovascular fixation device of FIG. 5 deployed in a body lumen to create, reinforce, or revise a fistula, according to an aspect of the disclosure.
Figure 5:
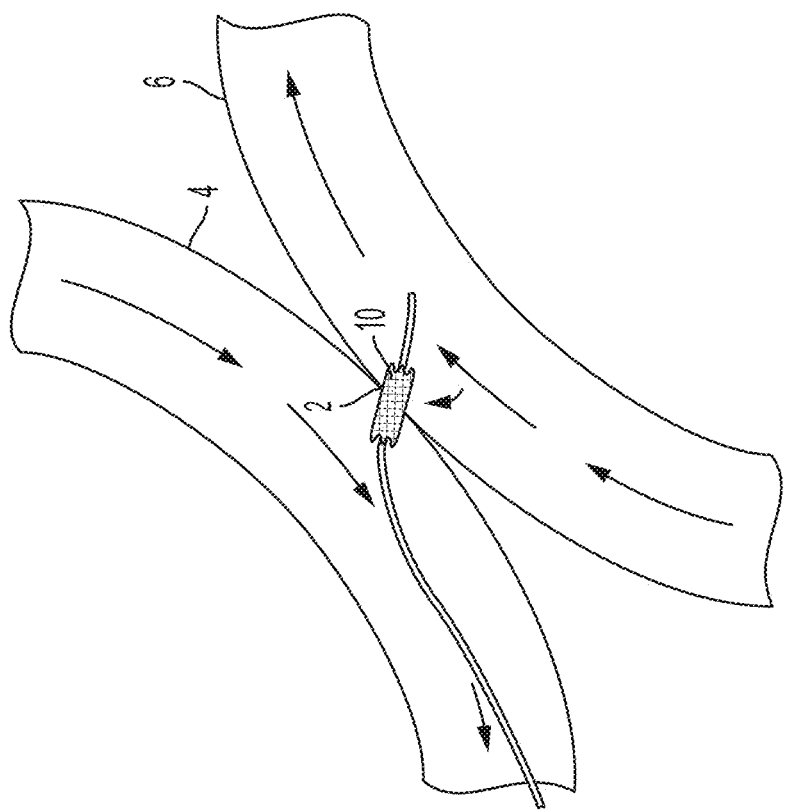
FIG. 5 is a schematic drawing showing an implanted endovascular fixation device prior to deployment, according to an aspect of the disclosure.

In some examples, the fixation device 10 can be configured to be deployed between lumens of two blood vessels, such as a vein and an artery, to form a fistula. Steps of a method for deploying a fixation device, such as the device 10 described previously, to form the fistula will now be described in connection with FIG. 4. As discussed previously, a fistula is often created in arms of dialysis patients to provide hemodialysis access. At step 110, an opening or incision can be surgically created between two vessels, such as between an artery 4 and vein 6 (shown in FIGS. 5 and 6). For example, the opening or incision can be created by a minimally invasive technique using a catheter assembly and guidewire. At step 112, a fixation device 10, including features of the previously described examples, is prepared for the surgical procedure. Preparing the fixation device 10 can include rinsing the fixation device in sterile water or sterile saline and attaching the fixation device 10 to, for example, a dilating or balloon catheter. Then the fixation device 10 can be provided to the surgically created opening or fistula through a delivery catheter of the catheter assembly. At step 114, the fixation device is positioned at a delivery location in the fistula by, for example, pushing the fixation device 10 and balloon catheter through an open distal end of the delivery catheter and into the body lumen or into the created space between lumens of the two vessels to be joined. A schematic drawing showing the fixation device 10 positioned within the fistula 2 between the artery 4 and the vein 6 is shown in FIG. 5 prior to expansion of the fixation device 10. At step 116, once the fixation device 10 is in place, the rings 16 of the device can be expanded by, for example, expanding an expandable member, such as the dilation or balloon catheter, crimped to and positioned within the central lumen of the fixation device 10. At step 118, in response to the radially outward expansion of the rings 16, the flaring connectors 18 of the outwardly flaring portions 12, 14 transition to the expanded position, thereby causing the flarable crowns 20*a* to flare radially outwardly to become flared crowns 20*b*. For example, the flarable crowns 20*a* can be configured to flare outwardly to capture tissues of walls of the artery 4 and vein 6 between the flared crowns 20*b*, thereby securing the fixation device 10 in place in the fistula. Once the fixation device 10 is deployed to create the fistula, blood can flow between the artery 4 and the vein 6 through the central lumen of the expanded fixation device 10. FIG. 6 shows a schematic drawing of the deployed fixation device 10 in an expanded state within the fistula 2.

Fixation Device with Elongated Body Portion

Figure 7A:
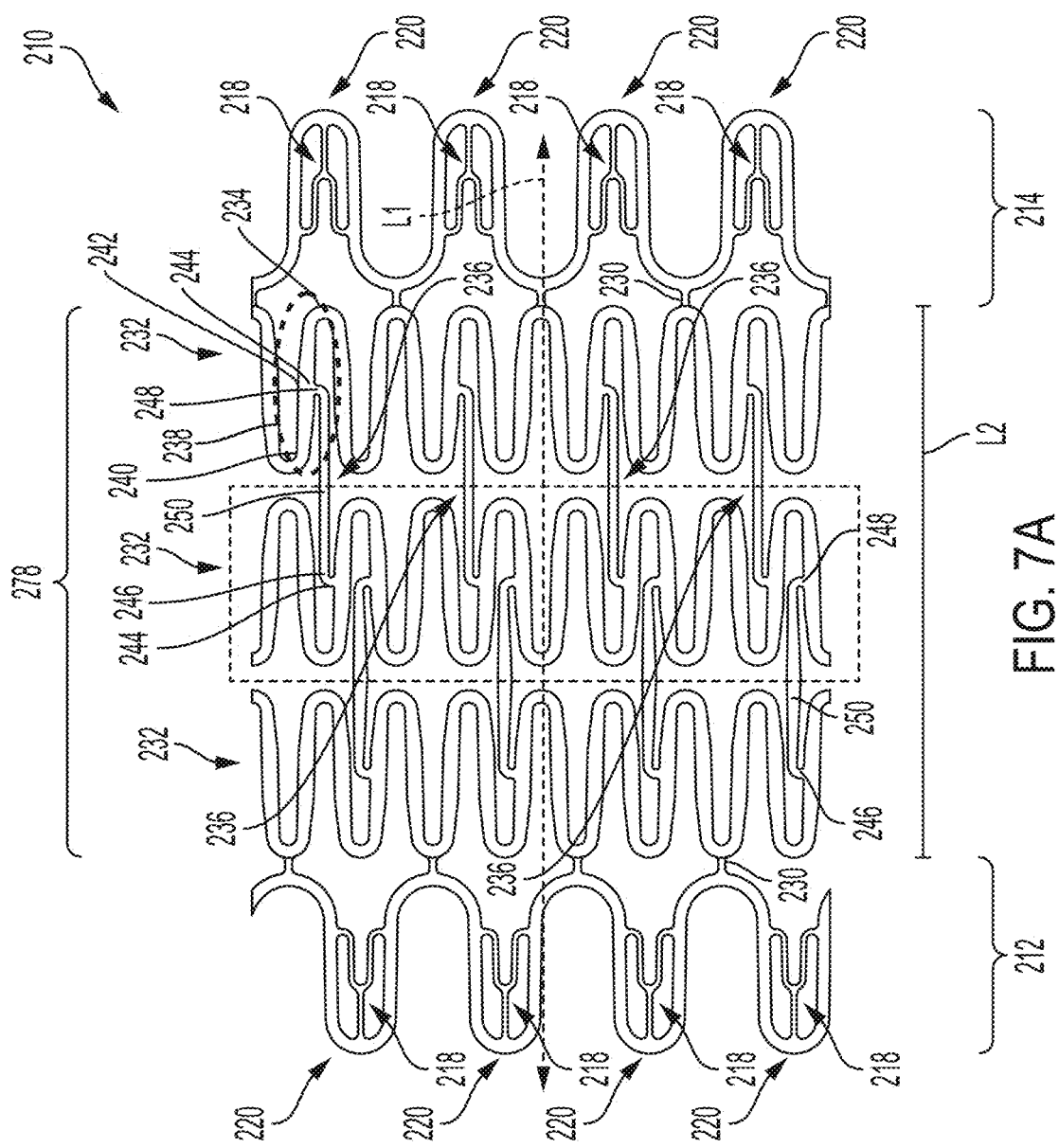
FIGS. 7A and 7B are flattened views of additional embodiments of endovascular fixation devices in a retracted position, according to aspects of the disclosure.

With reference to FIG. 7A, another non-limiting example of a fixation device 210 is shown. The fixation device 210 is an elongated structure including the first outwardly flaring portion 212 and the second outwardly flaring portion 214, as in previously described examples. However, unlike in previous examples, the fixation device 210 also includes an elongated body portion 278 extending between outwardly flaring portions 212, 214. The body portion 278 is generally a cylindrical and radially expandable structure configured to transition from a retracted position, for easy insertion into the body lumen, to an expanded position, to maintain patency of the body lumen. A length L2 of the body portion 278 can be selected based on an intended use of the fixation device 210. For example, a longer body portion 278 may be beneficial when using the fixation device 210 to create an end-to-end or end-to-side anastomosis. In other examples, a longer body portion 278 may be needed when the fixation device 210 is positioned within a body lumen, both for maintaining a position of another device and also for maintaining patency of the body lumen. In that case, the elongated fixation device 210 could function as both a fixation device and a stent. In some examples, the body portion 278 can be used to cover the ends of vessels while creating a fistula or anastomosis, thereby maintaining an open lumen.

The body portion 278 can include a number of different structural elements including continuous tubular members, porous or non-porous films or sheets, woven mesh members, or frameworks of interconnecting members or tines formed in various patterns. A pattern, design, or arrangement of the interconnecting members or tines can vary, and can include, for example, interconnected helical coils, rings, and struts. As shown in FIG. 7A, the body portion 278 includes three expandable rings 232 arranged in a series along the longitudinal axis L1 of the fixation device 210 and at least one interconnecting member 236 extending between and connecting the rings 232. Of course, employing a plurality of interconnecting members 236 that extend between and connect the rings 232 provides greater stability for the elongated fixation device 210. Rings 232 of the elongated body portion 278 are connected to flarable crowns 220 via struts 230. Radial expansion of the body portion 278, including the rings 232, causes flaring connectors 218 of the outwardly expanding portions 212, 214 to transition to the expanded position which, as described previously, causes flarable crowns 220 to flare radially outwardly to form flared crowns. While the device 210 shown in FIG. 7A has three rings 232, this is not meant to limit the scope of the present disclosure. Instead, the number of rings 232 and/or a distance between the rings 232 can be selected based on the size and/or intended use of the fixation device 210. So, in accordance with an embodiment, the device 210 may be constructed with two rings 232, and in accordance with another embodiment, the device 210 may be constructed with four or more rings 232. In accordance with another embodiment, the device 210 is constructed with only one ring 232, in which case the interconnecting members 236 are omitted. As evident from FIG. 7A, the struts 230 connect the outermost rings 232 to the flarable crowns 220.

As was the case with the ring 16 of the outwardly flaring portions 12, 14 described previously, the rings 232 of the body portion 278 can include substantially repeating bent segments 238 connected together end to end about a circumference of the ring 232. Each bent segment 238 can include a peak 234, a valley 240, and a transition region 242 extending between the peak 234 and the valley 240. The peak 234 of one bent segment 238 is connected to the peak 234 of a neighboring bent segment 238 and the valley 240 of one bent segment 238 is connected to the valley 240 of another neighboring bent segment 238, thereby forming the annular ring 232 from a plurality of bent segments 238. The three rings 232 are arranged in a series along the longitudinal axis L1 of the fixation device 210. The rings 232 can be arranged such that one of the rings is a "substantially mirror image" of one of the adjacent rings 232. As used herein, objects are a "substantially mirror image" when they have an identical form, but with their structures reversed about an axis. For example, the rings 232 can be arranged such the valleys 240 of one ring 232 are longitudinally aligned with and closest to peaks 234 of an immediately adjacent ring 232.

In some examples, interconnecting members 236 are longitudinally extending structures, such as struts or tines, connecting a portion of one ring 232 to a corresponding portion of an adjacent ring 232. For example, the interconnecting member 236 can connect a middle point 244 of the transition region 242 of one ring 232 to a middle point 244 on an adjacent ring 232. In some instances, the interconnecting member 236 includes a first coupling end 246 coupled to the ring 232, a second coupling end 248 opposite the first coupling end 246 coupled to the adjacent ring 232, and an elongate portion 250 extending between the coupling ends 246, 248. The interconnecting members 236 are configured to hold the rings 232 together and to accommodate expansion of the rings 232. In some examples, the interconnecting members 236 can be configured to bend, twist, or bow to accommodate expansion of the rings 232.

Figure 7B:
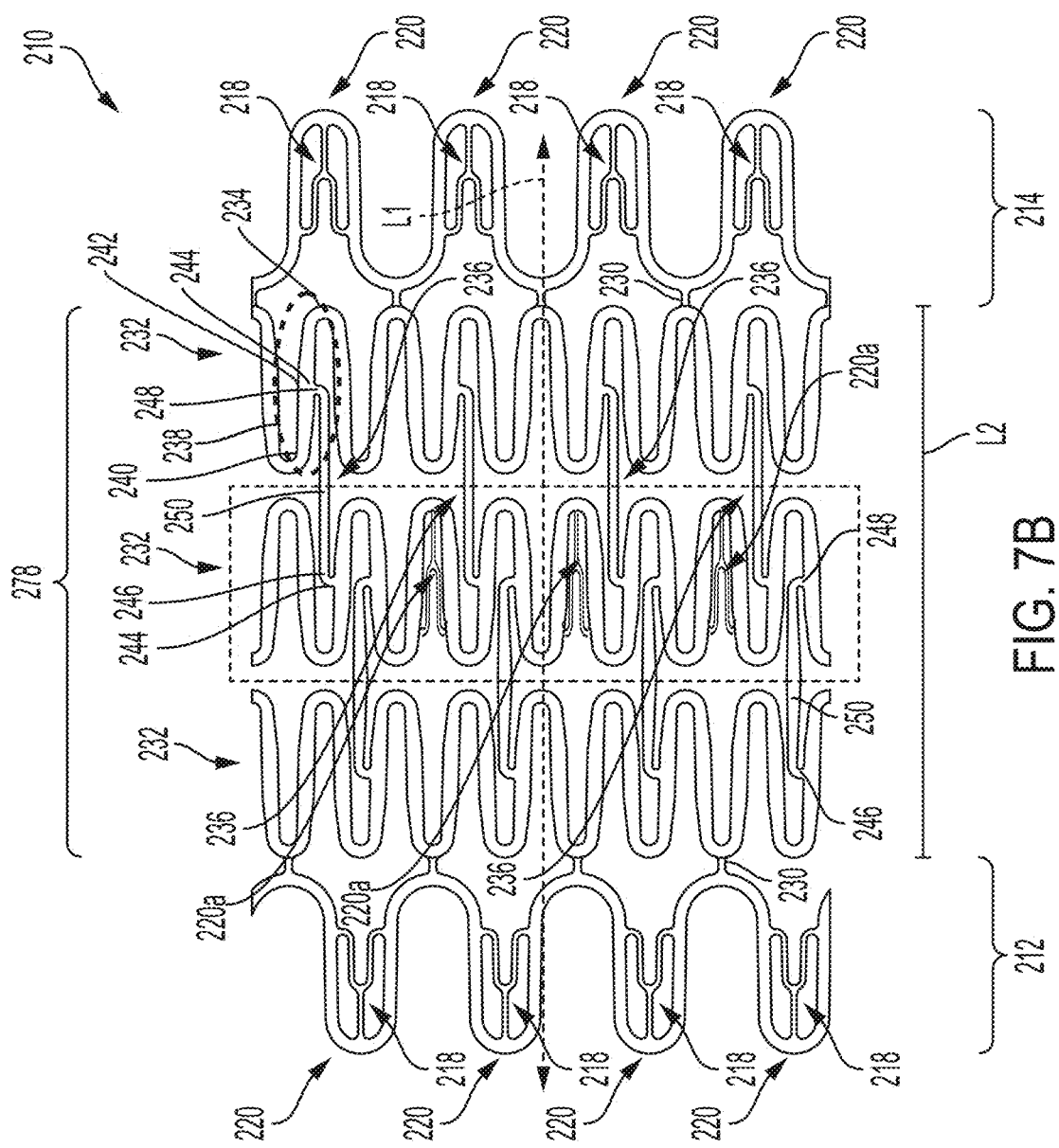

With reference to FIG. 7B, a flarable crown 220a can be incorporated within the body portion of a device 210. The device 210 can include multiple flarable crowns 220a incorporated with one or more of the rings 232 of the body portion of the device 210. These flarable crowns 220a transition to flared crowns in the same way as flarable crowns 220 transition to flared crowns upon expansion of the fixation device 210.

Fixation Device with Penetrating Crowns

Figure 8:
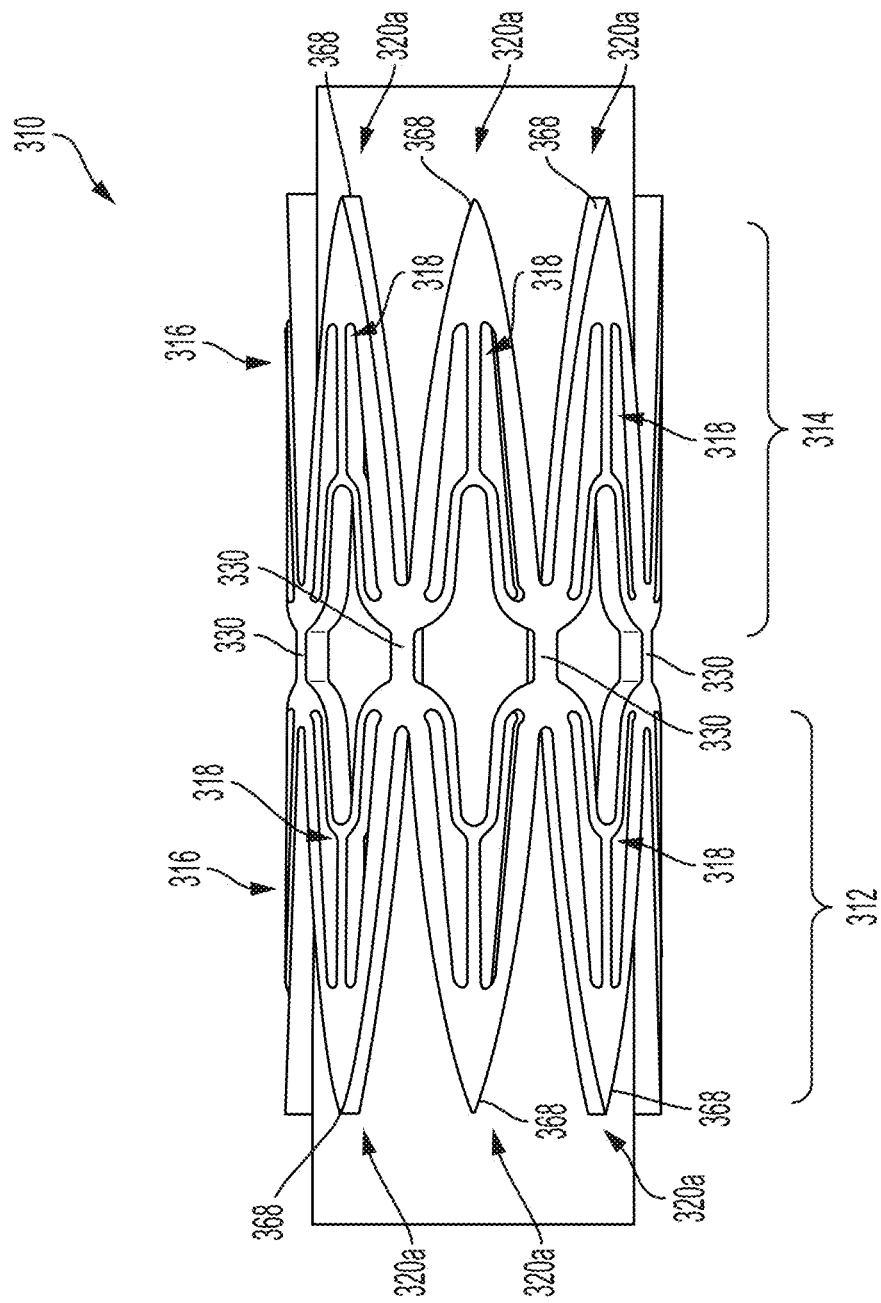
FIG. 8 is perspective view of another example of an endovascular fixation device in a retracted position, according to an aspect of the disclosure.
Figure 9A:
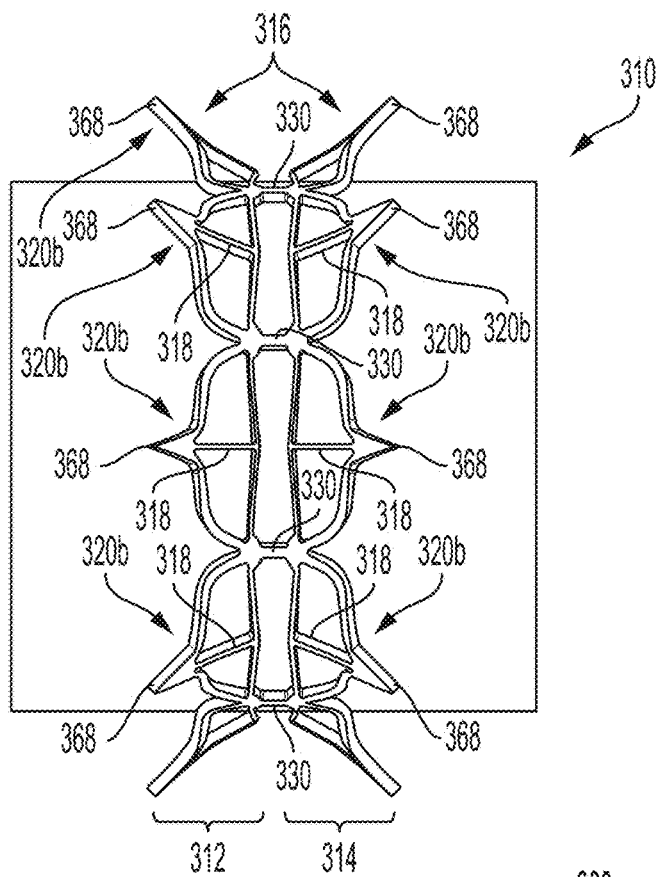
FIGS. 9A and 9B are perspective views of the endovascular fixation device of FIG. 8 in an expanded position.
Figure 9B:
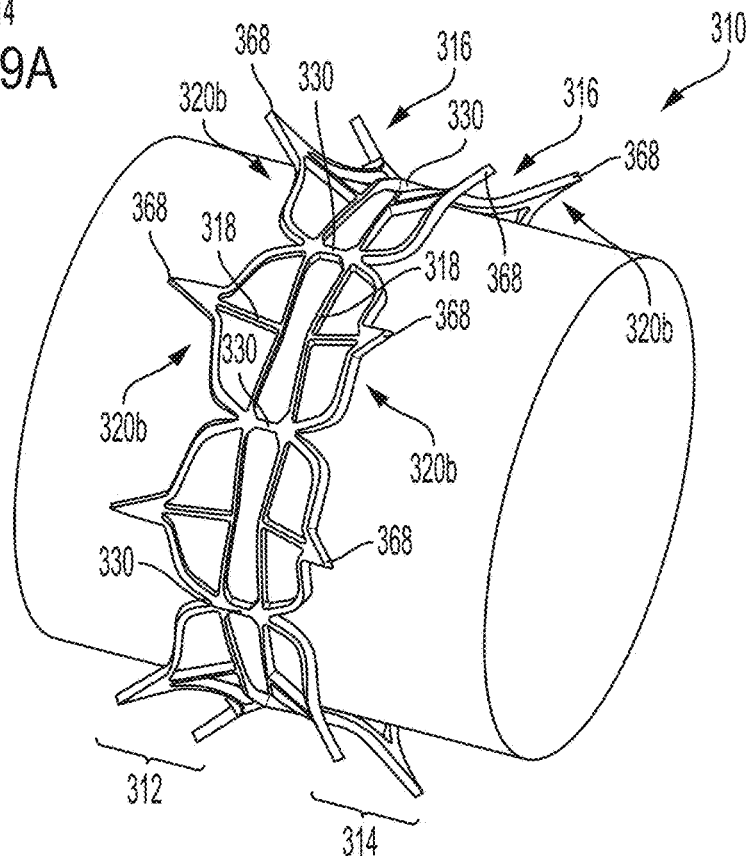

Another example of a fixation device 310 is shown in a retracted position in FIG. 8 and in an expanded position in FIGS. 9A and 9B. As in previously described examples, the fixation device 310 includes the first outwardly flaring portion 312 connected to the second outwardly flaring portion 314 by longitudinally extending struts 330. As discussed previously, the outwardly flaring portions 312, 314 are configured to assist in maintaining the deployed fixation device 310 at a desired position within the body lumen. In some examples, the fixation device 310 can be deployed within a body lumen in contact with or adjacent to another medical device, such as a stent or synthetic graft, to anchor the stent or graft at a desired location within the body lumen. For example, the fixation device 310 could be positioned to anchor the stent or graft at an initial treatment position within the body lumen. Alternatively, the fixation device 310 could be deployed in a body lumen to anchor a stent or graft at a position within the body lumen after the stent or graft has begun to migrate through the body lumen. Alternatively, the fixation device 310 could be used to anchor one device inside of a second device.

In order to enhance the anchoring features of the fixation device 310, unlike in previous examples which included rounded flarable crowns 20a, the flarable crowns 320a (shown in FIG. 8) of the fixation device 310 include pointed or sharpened anchoring structures for fixing the device 310 within the body lumen to prevent migration of the device 310 through the body lumen. The sharpened or pointed anchoring structures can be configured to penetrate and/or engage a wall of a vessel defining the body lumen to anchor the fixation device 310 in place. For example, flarable crowns 320a of the ring 316 can include pointed protrusions, referred to herein as barbs 368, which flare radially outwardly to become flared crowns 320b (shown in FIGS. 9A and 9B) and press into the wall of the vessel as flaring connectors 318 move towards the expanded position. In other examples, the flarable crowns 320a could include hooks, spikes, spurs, pins, or similar anchoring structures along with or instead of the barbs 368. Like the flaring connector 18 and corresponding flarable crowns 20a of previous examples, the barbs 368 are configured to remain in a retracted position while the fixation device 310 is being advanced to the deployment position. Once the fixation device 310 is in place in the body lumen, the barbs 368 are configured to move radially outwardly along with the flaring connectors 318 and flarable crowns 320a to adopt the deployed or outwardly projecting configuration with the flared crowns 320b (shown in FIGS. 9A and 9B). In some examples, the flaring connectors 318 can be configured to cause the flarable crowns 320a and the barbs 368 connected thereto to twist as they move radially outwardly during deployment. For example, legs of the flaring connectors 318 could be configured to exert a greater force on one side of the flarable crowns 320a than the other side of the flarable crowns 320a to produce a twisting motion. Various designs for flaring connectors employable with flarable crowns 320a and configured to produce a twisting motion are shown, for example, in FIGS. 20A, 20B, 20C, 20D, 20E, and 20F. The twisting motion may allow the barbs 368 to penetrate farther into tissue, thereby enhancing fixation of the device 310 within the vessel.

Deployment Method for Forming an Anastomosis

Figure 10A:
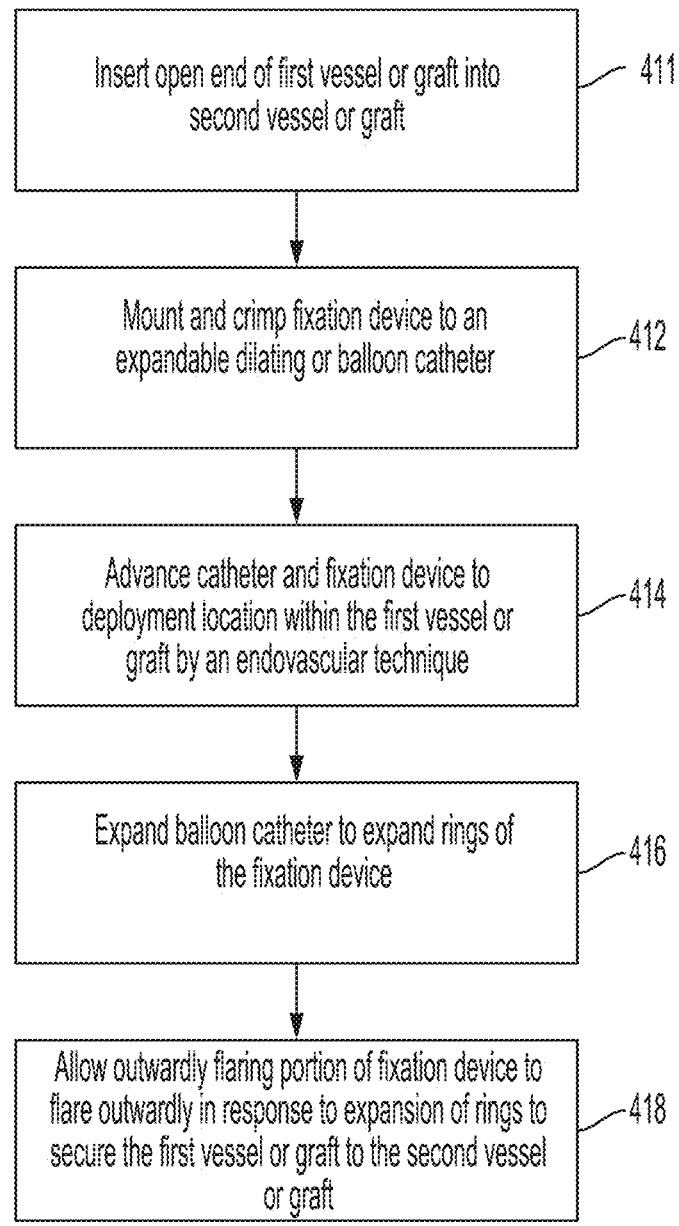
FIG. 10A is a flow chart showing a method for deploying an endovascular fixation device to create an end-to-end anastomosis, according to an aspect of the disclosure.
Figure 10B:
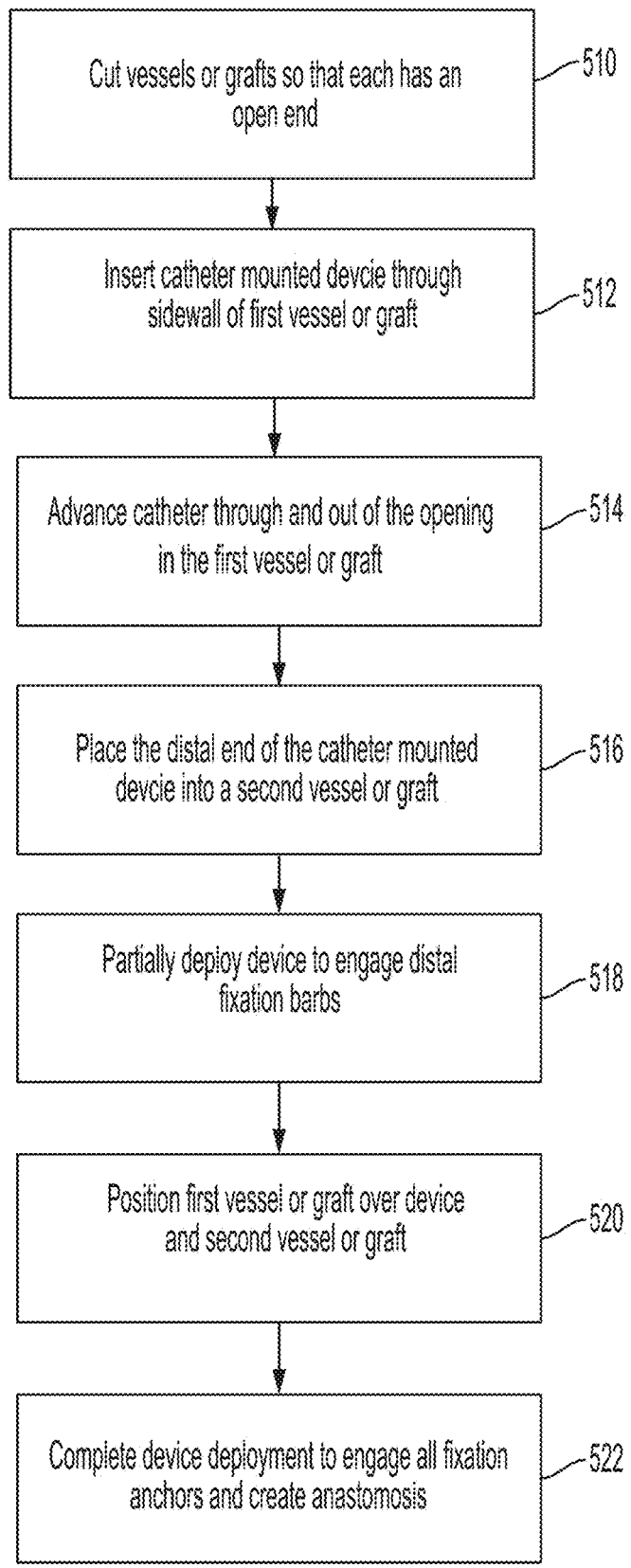
FIG. 10B is a flow chart showing a method for deploying an endovascular fixation device to create an end-to-side anastomosis according to an aspect of the disclosure.
Figure 11A:
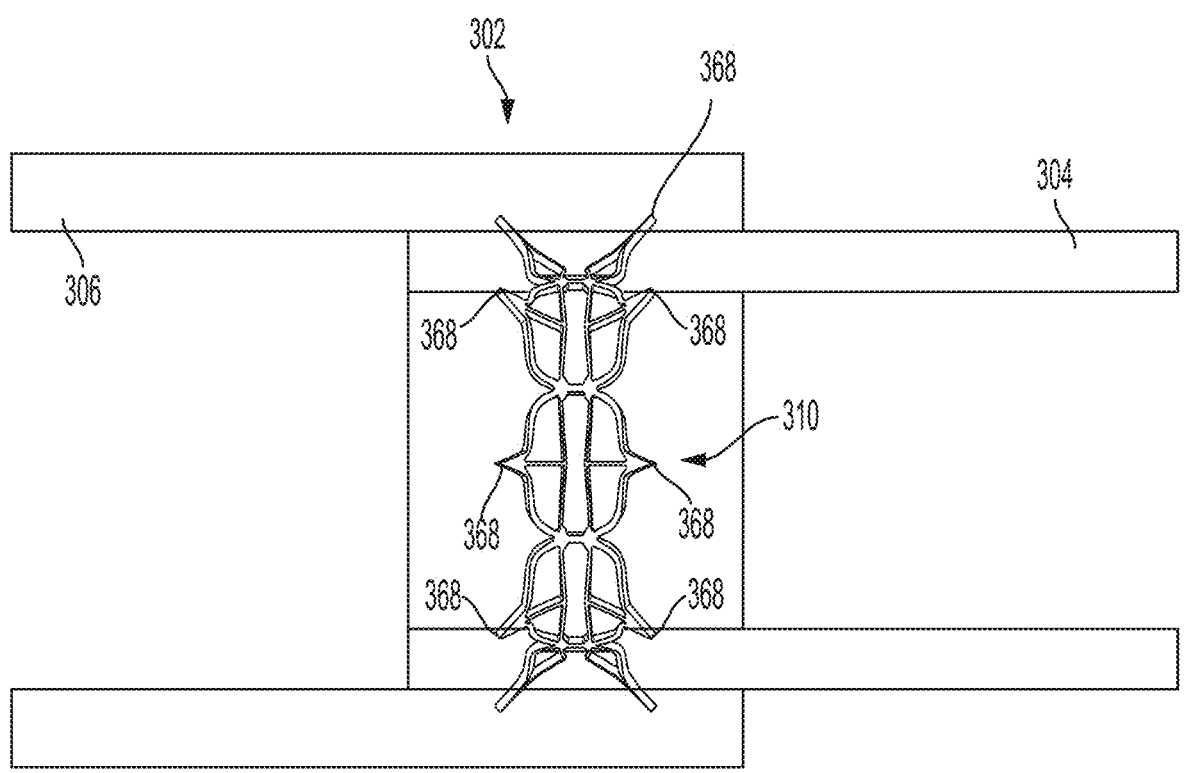
FIGS. 11A and 11B are drawings showing an endovascular fixation device deployed to create an end-to-end anastomosis, according to an aspect of the disclosure.
Figure 11B:
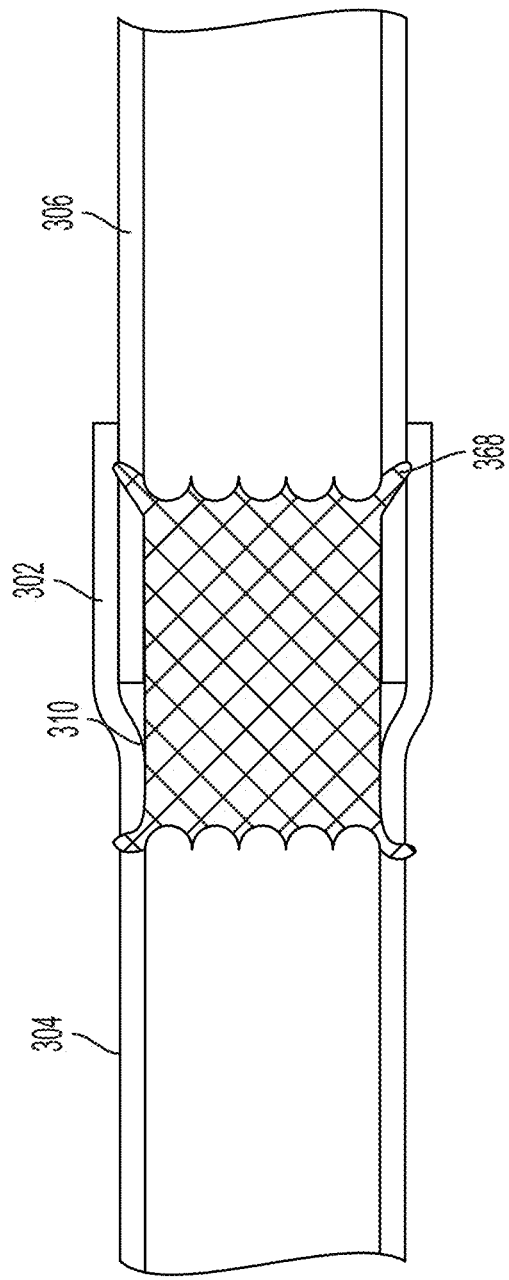
Figure 12A:
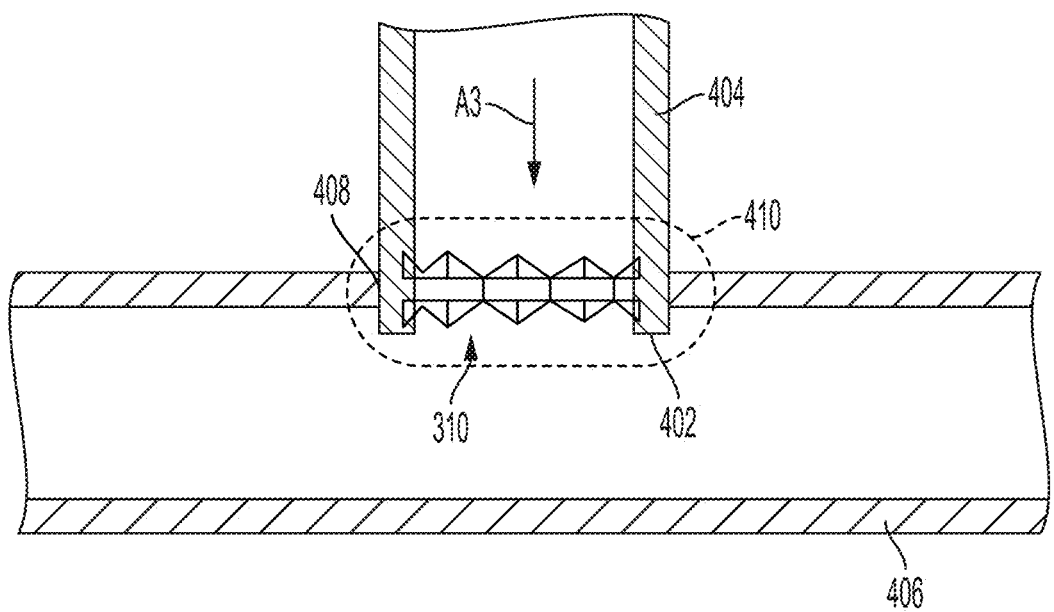
FIG. 12A is a drawing showing an endovascular fixation device deployed to create an end-to-side anastomosis (T-version), according to an aspect of the disclosure.
Figure 12B:
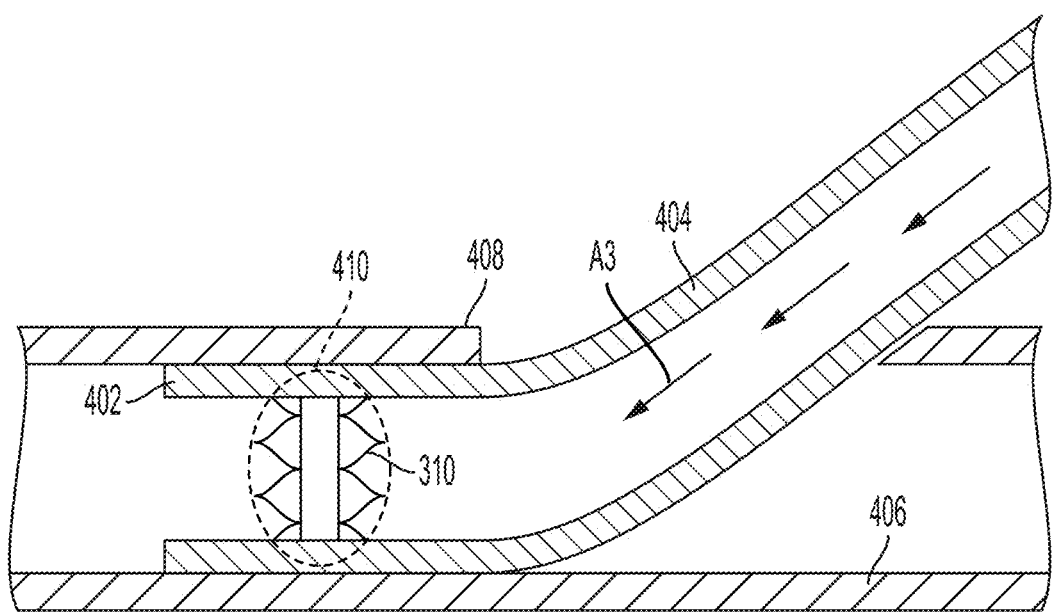
FIG. 12B is a drawing showing an endovascular fixation device deployed to create another configuration of an end-to-side anastomosis (Y-version)

Methods of deploying a fixation device, such as the fixation device 310 including the barbs 368, to form an anastomosis between blood vessels (e.g., between two arteries), between a graft and a blood vessel, or between two grafts, are shown in FIGS. 10A and 10B. The methods can also be used to form a fistula between a vein and an artery or between a synthetic graft and a blood vessel. As discussed previously, a fistula or anastomosis can refer to a cross-connection between adjacent channels or tubes, such as a cross-connection between a first vessel 304 or synthetic graft and a second vessel 306 or synthetic graft. An anastomosis can be characterized as end-to-end, end-to-side, or side-to-side, depending upon its configuration. A schematic drawing of a created end-to-end anastomosis resulting from the method of FIG. 10A is shown in FIG. 11A. A schematic drawing of an end-to-end anastomosis 302 resulting from the method of FIG. 10B is shown in FIG. 11B. A side-to-side anastomosis resulting from the method of FIG. 10A and having a Y-configuration is shown in FIG. 12B As shown in FIG. 11A, in an end-to-end anastomosis 302, an open end of a first vessel 304 is inserted into and secured within an open end of a second vessel 306 to form a substantially continuous lumen through the vessels 304, 306. The fixation device 310 can be fixed within the first vessel 304 and expanded to secure the first vessel 304 to the second vessel 306.

In order to create the end-to-end anastomosis, a method as shown by FIG. 10A may be employed. As shown in FIG. 10A, at method step 411, the open end of the first vessel 304, whether an organic artery or vein or a synthetic vessel, is inserted into the open end of the second vessel 306, which is a corresponding like artery or vein or a synthetic vessel. In this context, the first vessel 304 and second vessel 306 are similar in that they carry the same kind of fluid. For example, both vessels 304, 306 may carry arterial blood or both vessels 304, 306 may carry venous blood. First vessel 304 and second vessel 306 may have different diameters. At method step 412, the fixation device 310 can be mounted and crimped to an expandable dilating or balloon catheter. At method step 414, the catheter and fixation device can be advanced to a deployment location in the body lumen. For example, the deployment location can be defined by the first (e.g., the inner) vessel 304 at a position where the sidewall of the first vessel 304 overlaps with the sidewall of the second vessel 306. The fixation device 310 may be advanced to the deployment location by an endovascular procedure in which the fixation device and balloon catheter are advanced to a deployment location through a first guide catheter over a guidewire. At method step 414, the fixation device is pushed from the guide catheter and into the body lumen at the deployment location. At method step 416, the fixation device 310 is expanded. For example, the fixation device 310 can be expanded by expanding the dilating or balloon catheter. At method step 418, expanding the dilating or balloon catheter causes the rings of the fixation device 310 to expand radially outwardly which, in turn, causes the outwardly flaring portions, flarable crowns, and consequently any barbs optionally attached to the flarable crowns, to flare radially outwardly. In the case of self-expanding fixation devices 310, step 416 may be modified to merely release the fixation device 310 from the delivery system in order to allow the self-expanding fixation device 310 to self-expand to an internally biased configuration that was previously created by heat setting. In some examples, a first vessel 304 can be a graft or stent graft and the second vessel 306 can be a branch portal of an endograft. In another example, a first vessel 304 can be a branch portal of an endograft and the second vessel 306 can be a graft or stent graft.

As shown in FIGS. 11A and 11B, when the fixation device 310 is expanded, the fixation device 310 presses the sidewall of the first vessel 304 or graft into the second vessel 306 or graft, thereby forming the end-to-end anastomosis 302. Also, portions of the barbs 368 can extend through the sidewall of the first vessel 304 or graft and into the sidewall of the second vessel 306 or graft, further securing the first vessel 304 or graft to the second vessel 306 or graft. As discussed previously, the fixation device 310 could also be used to form an end-to-side or side-to-side anastomosis following the steps described herein. The method described herein allows for formation of a fistula or anastomosis by an endovascular procedure. Further, it is believed that this method reduces time required for a surgical procedure compared to conventional open surgery, which would be particularly useful in situations where time is limited, such as for organ transplant procedures and trauma treatment.

The fixation device 310 may also be used to form an end-to-side or side-to-side anastomosis following the steps described herein. See, e.g., FIG. 10A. An end-to-side anastomosis is formed by inserting an end of a first vessel into an opening in a sidewall of a second vessel. The fixation device 310 can be deployed within the first vessel to secure the first vessel within the opening of the second vessel. A schematic drawing of an end-to-side anastomosis 410 having a T-configuration resulting from the method of FIG. 10A is shown in FIG. 12A. A schematic drawing of an end-to-side anastomosis 410 having a Y-configuration resulting from the method of FIG. 10B is shown in FIG. 12B. An end-to-side anastomosis can be fabricated to any angle desired as long as the end of one tubular structure is affixed to the sidewall of a second tubular structure. As shown in FIGS. 12A and 12B, in the end-to-side anastomosis 410, the fixation device 310 secures an end 402 of a first vessel or graft 404 into an opening 408 in a sidewall of a second vessel 406.

In order to form the end-to-side anastomosis 410, the opening 408 in the sidewall of the second vessel 406 is formed in a conventional manner. Once the opening 408 is formed, the end 402 of the first vessel 404 is inserted through the opening 408, such that a portion of the first vessel 404 overlaps with a portion of the sidewall of the second vessel 406. The fixation device 310 is then advanced through the first vessel 404, in a direction of arrow A3, towards the area of overlap between the vessels 404, 406. The area of overlap is usually near to the end 402 of the first vessel 404. When the fixation device 310 is near the area of overlap, the device 310 is deployed causing flarable crowns to extend radially outwardly from other portions of the device. The deployed device 310 contacts the wall of the first vessel 404 causing the end 402 to expand within the opening 408. The expanded fixation device 310 is configured to secure the first vessel 404 to the second vessel 406 in a T-configuration end-to-side anastomosis as shown in FIG. 12A. Alternatively, the expanded fixation device 310 is configured to secure the first vessel 404 to the second vessel 406 in a Y-configuration end-to-side anastomosis as shown in FIG. 12B.

In some examples, in order to create the end-to-end anastomosis, a method including steps shown in FIG. 10B may be employed. At method step 510, the first vessel 304, whether an organic artery or vein or a synthetic vessel, and the second vessel 306, which is a corresponding like artery, vein, or synthetic vessel, are cut so that each vessel 304, 306 has an open end. In this context, the first vessel 304 and second vessel 306 are similar in that they carry the same kind of fluid. For example, both vessels 304, 306 may carry arterial blood or both vessels 304, 306 may carry venous blood. The first vessel 304 and the second vessel 306 may have different diameters. At method step 512, a pre-mounted fixation device 310 can be advanced via a delivery assembly, such as a guide catheter, to a delivery site. At method step 514, the catheter and fixation device 310 can be advanced through and out of the opening in the first vessel 304. At method step 516, the fixation device 310 is placed inside of the second vessel 306. At method step 518, the fixation device 310 is partially expanded to engage fixation barbs to a wall of the vessel 306. For example, the fixation device 310 can be partially expanded by expanding a dilating or balloon catheter. At method step 520, the first vessel 304 is positioned over the fixation device 310 and the second vessel 306 or graft. At method step 522, expanding the dilating or balloon catheter causes rings of the fixation device 310 to expand radially outwardly which, in turn, causes the outwardly flaring portions, flarable crowns, and, optionally, any barbs attached to the flarable crowns, to flare radially outwardly. In the case of self-expanding fixation devices 310, the step 522 may be modified to merely release the fixation device 310 from the delivery system in order to allow the self-expanding fixation device 310 to self-expand to an internally biased configuration created by heat setting.

As shown in FIG. 11A, when the fixation device 310 is expanded, the fixation device 310 presses the sidewall of the first vessel 304 or graft into the second vessel 306 or graft, thereby forming the end-to-end anastomosis 302. In this embodiment, portions of the barbs 368 can extend through the sidewall of the first vessel 304 or graft and into the sidewall of the second vessel 306 or graft, further securing the first vessel 304 or graft to the second vessel 306 or graft as shown in FIG. 11A. As shown in FIG. 11B, when the fixation device 310 is expanded, the fixation device 310 presses the sidewall of the second vessel 306 or graft into the first vessel 304 or graft, thereby forming another end-to-end anastomosis 302. In this embodiment, portions of the barbs 368 can extend through the sidewall of the second vessel 306 or graft and into the sidewall of the first vessel 304 or graft, further securing the first vessel 304 or graft to the second vessel 306 or graft as shown in FIG. 11B. As discussed previously, the fixation device 310 could also be used to form an end-to-side or side-to-side anastomosis following the steps described herein. It is believed that this method reduces time required for a surgical procedure compared to conventional open surgery, which would be particularly useful in situations where time is limited, such as for organ transplant procedures and trauma treatment. In some examples, the fixation device 310 can also be used to form a side-to-side fistula, in which case openings in sidewalls of the vessels or a vessel and a graft are connected together. An exemplary side-to-side connection between vessels is shown in previously described FIG. 6.

As shown in FIG. 11A, when the fixation device 310 is expanded, the fixation device 310 presses the sidewall of the first vessel 304 or graft into the second vessel 306 or graft, thereby forming the end-to-end anastomosis 302. In this embodiment, portions of the barbs 368 can extend through the sidewall of the first vessel 304 or graft and into the sidewall of the second vessel 306 or graft, further securing the first vessel 304 or graft to the second vessel 306 or graft as shown in FIG. 11A. As shown in FIG. 11B, when the fixation device 310 is expanded, the fixation device 310 presses the sidewall of the second vessel 306 or graft into the first vessel 304 or graft, thereby forming another end-to-end anastomosis 302. In this embodiment, portions of the barbs 368 can extend through the sidewall of the second vessel 306 or graft and into the sidewall of the first vessel 304 or graft, further securing the first vessel 304 or graft to the second vessel 306 or graft as shown in FIG. 11B. As discussed previously, the fixation device 310 could also be used to form an end-to-side or side-to-side anastomosis following the steps described herein. It is believed that this method reduces time required for a surgical procedure compared to conventional open surgery, which would be particularly useful in situations where time is limited, such as for organ transplant procedures and trauma treatment. In some examples, the fixation device 310 can also be used to form a side-to-side fistula, in which case openings in sidewalls of the vessels or a vessel and a graft are connected together. An exemplary side-to-side connection between vessels is shown in previously described FIG. 6.

Fixation Devices with Flaring Connectors Having Dual or Multiple Common Points

Additional exemplary fixation devices 610 are shown in FIGS. 13A-14B. As in previous examples, the fixation devices 610 include the first outwardly flarable portion 614 connected to the second outwardly flarable portion 612 by longitudinal struts 630. In other examples, the struts 630 may be replaced by curved connectors, to allow for greater freedom of movement for the first outwardly flarable portion 614 relative to the second outwardly flarable portion 612. As shown in FIGS. 13A-14B, the struts 630 extend between a valley 626 of a ring 616 of the first outwardly flarable portion 614 and a valley 634 of a ring 632 of the second outwardly flarable portion 612. The fixation device 610 can be covered or uncovered. The fixation device 610 can be formed from a shape-memory alloy heat set to an expanded configuration or from any other previously described biocompatible materials, with or without shape-memory characteristics.

Figure 14A:
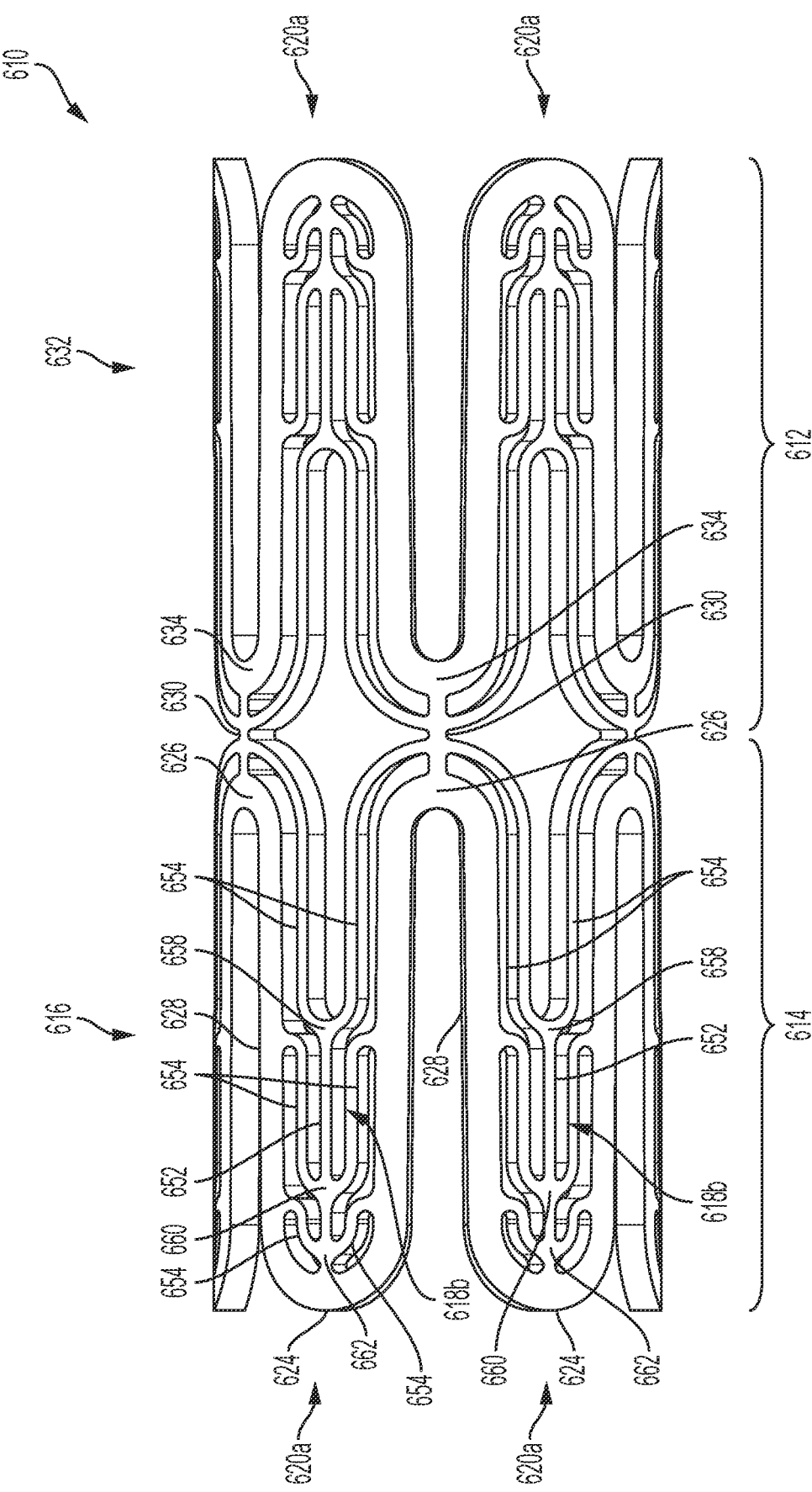
FIG. 14A is a front perspective view of another embodiment of an endovascular fixation device in a retracted position, according to an aspect of the disclosure.
Figure 14B:
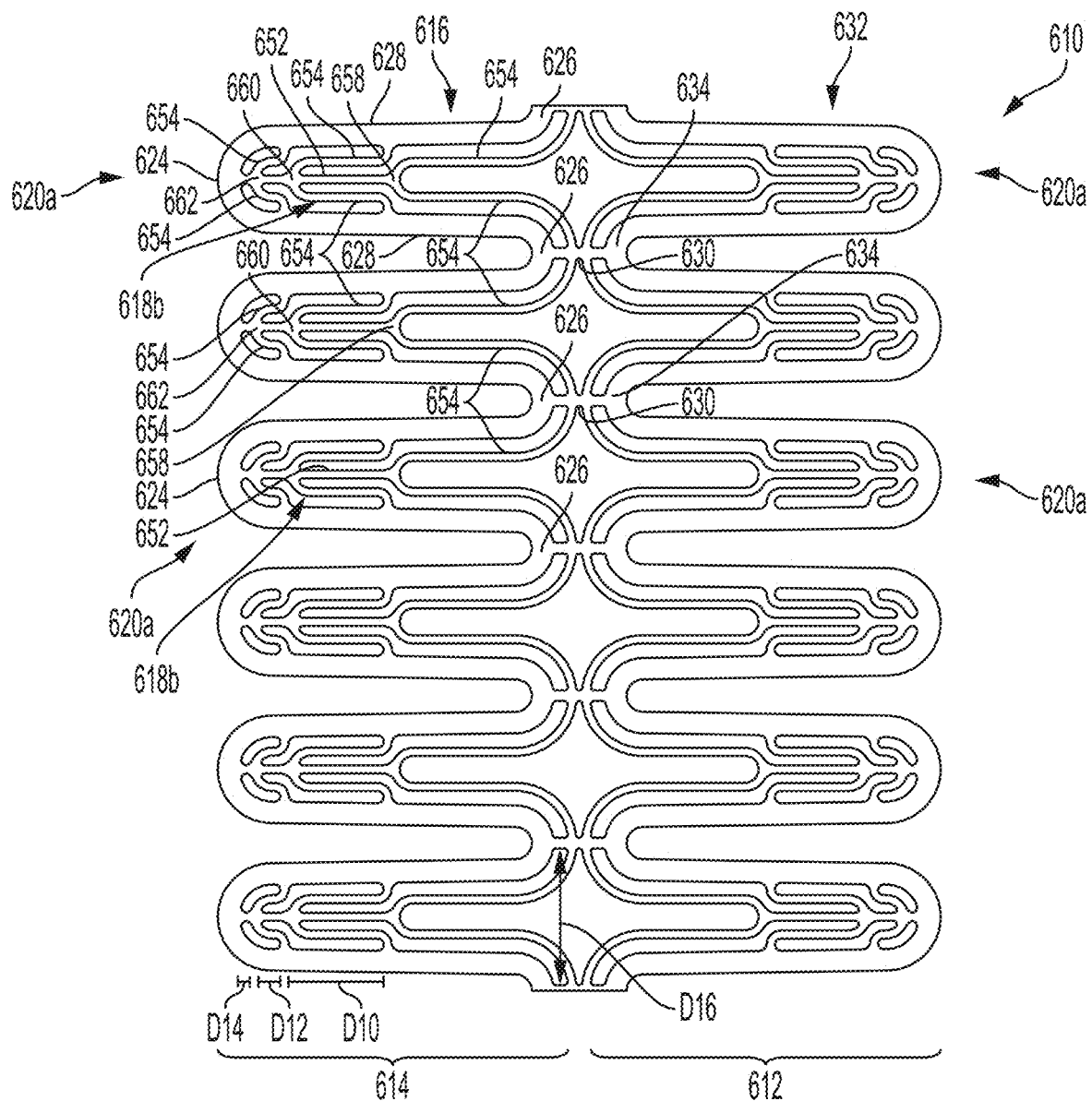
FIG. 14B is a flattened view of the endovascular fixation device of FIG. 14A.
Figure 15C:
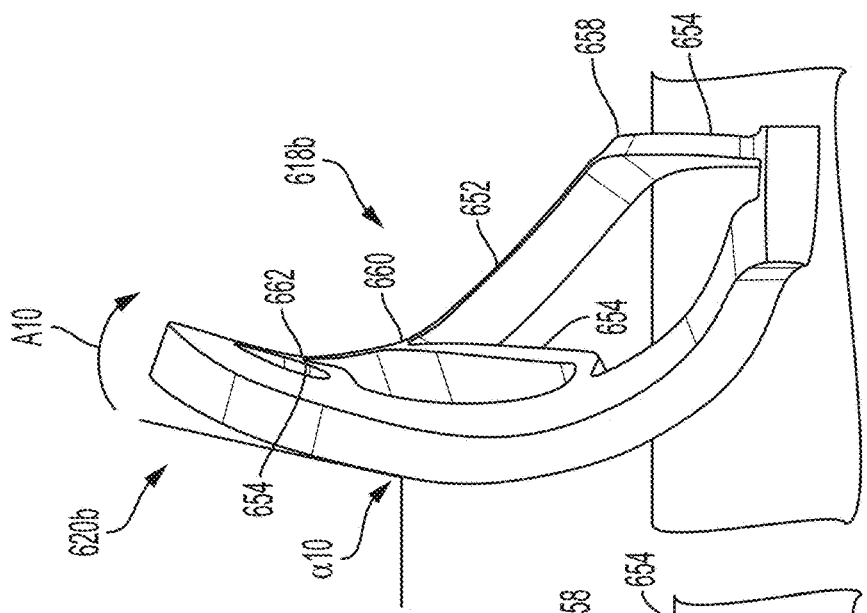
FIG. 15C is a perspective view of a flared crown of an endovascular fixation device including a flaring connector with three pairs of side or second legs connected to a first or primary leg at three different common points.
Figure 15B:
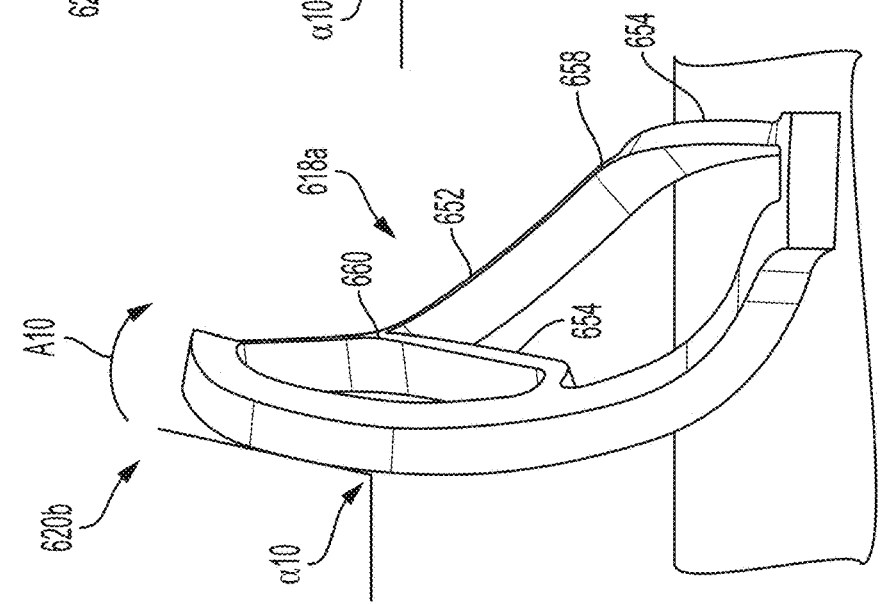
FIG. 15B is a perspective view of a flared crown of an endovascular fixation device including a flaring connector with two pairs of side or second legs connected to a first or primary leg at two different common points.

The first outwardly flarable portion 614 includes the expandable ring 616 and flarable crowns 620a (shown in FIGS. 13A, 13B, 14A, and 14B) which, upon radially outward expansion of the fixation device 610, flare radially outwardly to form flared crowns 620b (shown in FIGS. 15B and 15C). The outwardly flarable portion 614 also includes flaring connectors 618a (shown in FIGS. 13A and 13B) or flaring connectors 618b (shown in FIGS. 14A and 14B) connected to the ring 616 to cause flarable crowns 620a of the ring 616 to flare radially outwardly in response to radial expansion of the device 610. The second outwardly flarable portion 612 includes the expandable ring 632, which also includes flarable crowns 620a, which are a mirror image of the flarable crowns 620a of the first portion 614. For brevity, only features of the flarable crowns 620a of the first portion 614 are described herein. The flarable crowns 620a of the second outwardly flarable portion 612 can include the same features as the flarable crowns 620a of the first portion 614.

The fixation devices 610 differ from previous examples in the configuration of the flaring connectors 618a, 618b. Unlike in previous examples, in which flaring connectors included one central or common point (such as the common point 58 shown in FIGS. 1A-2B), the flaring connectors 618a, 618b in FIGS. 13A-14B include multiple common points. For example, the flaring connectors 618a (in FIGS. 13A and 13B) include two common points. The flaring connectors 618b (in FIGS. 14A and 14B) include three common points. However the numbers of common points shown in FIGS. 13A-14B is not intended to limit the scope of the present disclosure. In some examples, flaring connectors 618a, 618b can include more than three common points.

In some examples, the flaring connectors 618a, 618b include an axially-oriented or first leg 652 connected to the flarable crown 620a of the ring 616. For example, the axially-oriented or first leg 652 may be connected at or adjacent to a peak 624 of the ring 616. The axially oriented or first leg 652 extends axially in a proximal direction from the peak 624 of the ring 616 towards a center or middle of the fixation device 610. The flaring connectors 618a, 618b also include multiple pairs of side or second legs 654 extending from the first leg 652 to other portions of the ring 616. As used herein, a "pair of side or second legs" refers to two side or second legs 654 extending from the first leg 652 at the same common point, such as a first common point 658 (shown in FIGS. 13A-14B), second common point 660 (shown in FIGS. 13A-14B), and/or third common point 662 (shown in FIGS. 14A and 14B), if present. The side or second legs 654 can extend from the first leg 652 to any convenient position on the ring 616. For example, as shown in FIGS. 13A-14B, a pair of side or second legs 654 extends from the first common point 658 to the struts 630. Other pairs of second legs 654 extend from common point(s) 660, 662 to the transition region 628 of the ring 616, which extends between the valley 626 and the peak 624 of the ring 616. In other examples, side or second legs 654 could be connected to the peaks 624, the valleys 626, or to any other convenient location on the ring 616.

Figure 13A:
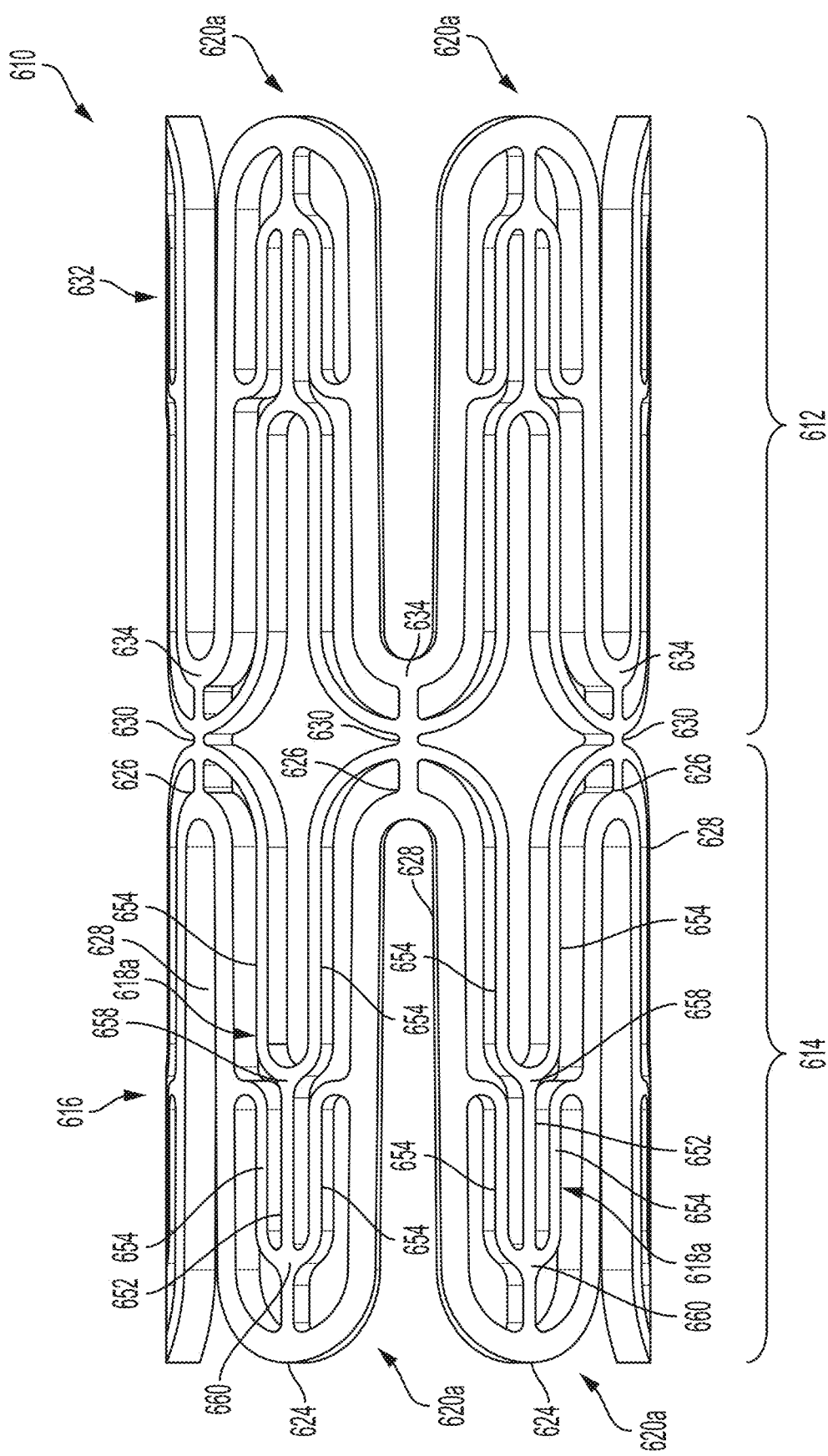
FIG. 13A is a front perspective view of another embodiment of an endovascular fixation device in a retracted position, according to an aspect of the disclosure.
Figure 13B:
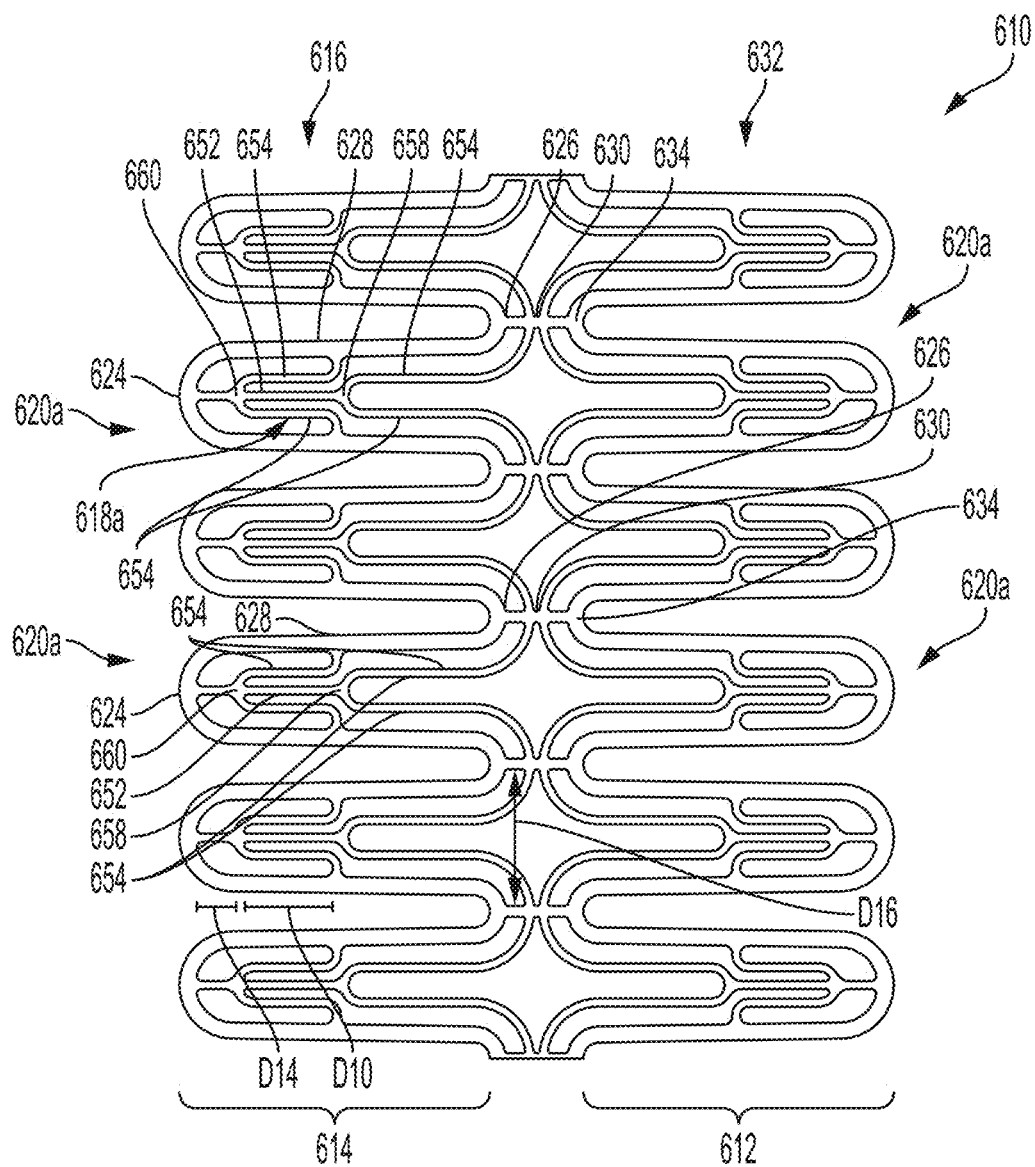
FIG. 13B is a flattened view of the endovascular fixation device of FIG. 13A.

As shown in FIGS. 13A and 13B, the flaring connector 618a includes two pairs of side or second legs 654 extending from the axially-oriented or first leg 652 at two unique common points, namely the first common point 658 and the second common point 660. As shown in FIGS. 14A and 14B, the flaring connector 618b includes three pairs of side or second legs 654 extending from the axially-oriented or first leg 652 at three unique common points, namely the first common point 658, the second common point 660, and the third common point 662. As used herein, a "unique common point" refers to a position on the axially oriented or first leg 652 from which each side or second leg 654 of a pair of the side or second legs 654 extends. Other pairs of second legs extend from other common points positioned elsewhere along the first leg 652. Common point 658, 660, 662 are spaced apart from each other by a selected distance (e.g., by a distance D10 (shown in FIGS. 13B and 14B) and/or by a distance D12 (shown in FIG. 14B)). The distal-most common point is spaced apart from the peak 624 of the ring 616 by a distance D14 (shown in FIGS. 13B and 14B). As discussed in further detail herein, the distances D10, D12, D14 between respective common points 658, 660, 662 and between the common points 660, 662 and the peak 624 and lengths of the second legs 654 can be selected to obtain a flared crown 620b (shown in FIGS. 15B and 15C) having a particular curvature and/or which bends backwards by a particular length. As shown in FIGS. 13B and 14B, the distance D10 (shown in both FIGS. 13B and 14B) and distance D12 (shown only in FIG. 14B) between common points 658, 660 are substantially larger than the distance D14 (shown in both FIGS. 13B and 14B) between the distal-most common point 660, 662 and the peak 624 of the ring 616. However, this configuration is not meant to be limiting and, in other examples, D10-D14 may be equal in length or D14 may be greater in length than D10 and D12. In general, when the distance D14 is small compared to distances D10 and/or D12, the radially outermost tip or portion of the flared crown 620b bends only slightly having a limited effect on the overall flare of the flared crown 620b. In contrast, when the distances D10, D12, and D14 are similar in length, the flared crown 620b has a more uniform curvature along its entire length, including at the radially outermost tip or portion of the flared crown 620b.

As in previous examples, the flaring connectors 618a, 618b are configured to cause the flarable crowns 620a to flare radially outwardly relative to other portions of the ring 616 upon radial expansion of the second outwardly flarable portion 612 to form the flared crowns 620b (shown in FIGS. 15B and 15C). More specifically, upon radial expansion of the second outwardly flarable portion 612, a distance D16 (shown in FIGS. 13B and 14B), between the ends of the side or second legs 654 connected to the ring 616 of each pair of second legs 654 increases, which causes portions of the first leg 652 distal to the common point 658, 660, 662 to rotate about the respective common point 658, 660, 662, thereby causing the flarable crowns 620a to automatically flare radially outwardly to form flared crowns 620b. Including multiple pairs of side or second legs 654 and multiple common points 658, 660, 662 in the flaring connector 618a, 618b causes the radially outermost tip or portion of the flared crown 620b to bend backwards (i.e., radially inwardly and towards the second outwardly flarable portion 612 in a direction of arrow A10, as shown in in FIGS. 15B and 15C). For example, the radially outermost tip or portion may be bent at an angle α10 of greater than 90° (i.e., by an angle ranging from greater than 90° to less than 180°) relative to a longitudinal axis L1 (shown in FIGS. 13A and 14A) of the fixation device 610.

As will be appreciated by those skilled in the art, the number of pairs of side or second legs 654 and common points 658, 660, 662 and distances D10, D12, D14 between the common points in the flaring connectors 618a, 618b, along with lengths of the side or second legs 654, affects the curvature and angle α10 of the flared connector 620b. Generally, including multiple pairs of second legs 654 and common points 658, 660, 662 allows for additional control over the curvature of the flared crown 620b. Additionally, the degree to which each pair of second legs 654 and common point 658, 660, 662 contributes to the overall flaring of the flared crown 620b is influenced by the distances D10, D12, D14 between the common points 658, 660, 662 and peak 624 as well as the length of second legs 654.

Figure 15A:
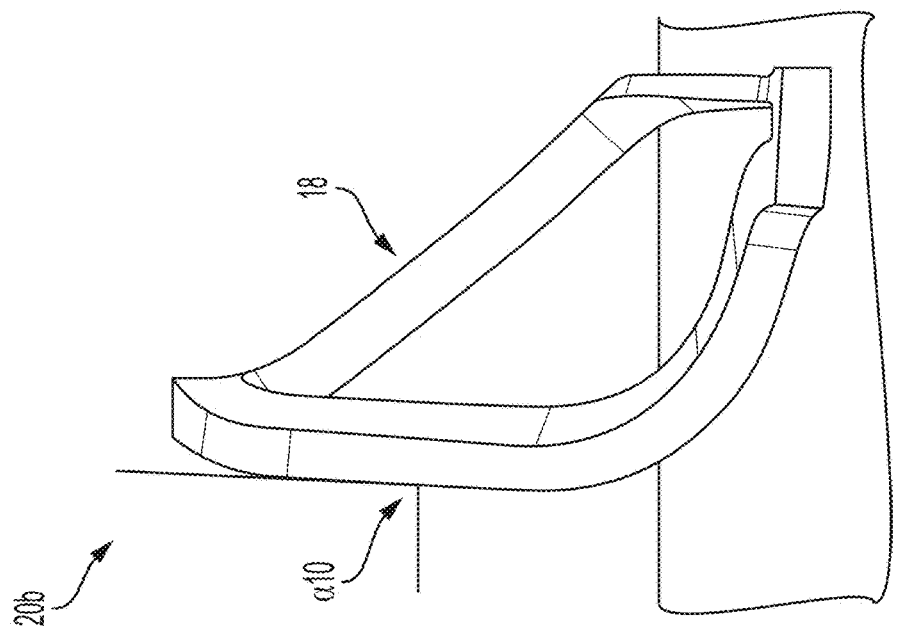
FIG. 15A is a perspective view of a flared crown of an endovascular fixation device including a flaring connector with one pair of side or second legs connected to a first or primary leg at a common point.

Flared crowns 20b, 620b including flaring connectors 18, 618a, 618b with different numbers of common points are shown in FIGS. 15A-15C. As shown in FIG. 15A, a flaring connector 18 with only one common point (similar to the flaring connectors 18 shown in FIGS. 2A and 2B) has an angle α10 of about 90°, meaning that the flared connector 20b does not bend backwards. A flared crown 620b with a flaring connector 618a with two common points 658, 660 (shown in FIG. 15B) bends backwards slightly, at an angle α10 slightly greater than 90°. A flared crown 620b with a flaring connector 618b (shown in FIG. 15C) with three common points 658, 660, 662 has a more pronounced backwards flare, with an angle α10 of substantially greater than 90°.

Figure 16C:
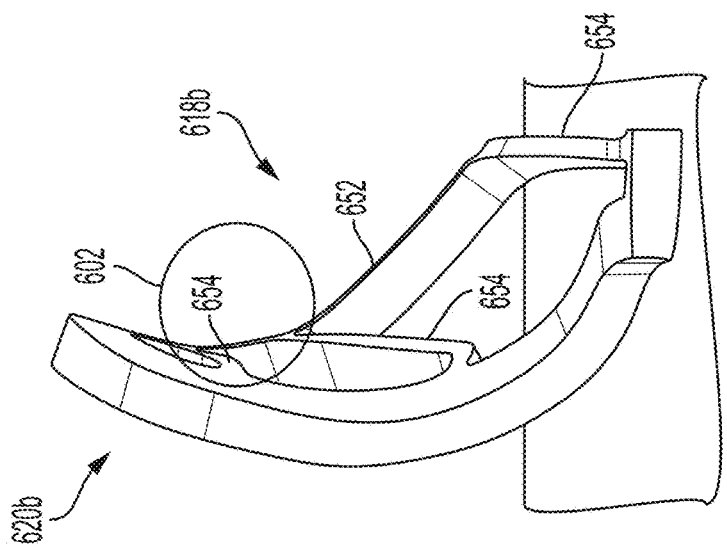
FIGS. 16A, 16B, and 16C are schematic drawings showing representations of a partially-transparent circular region in proximity to the flared crowns of FIGS. 15A, 15B, and 15C, respectively.
Figure 16B:
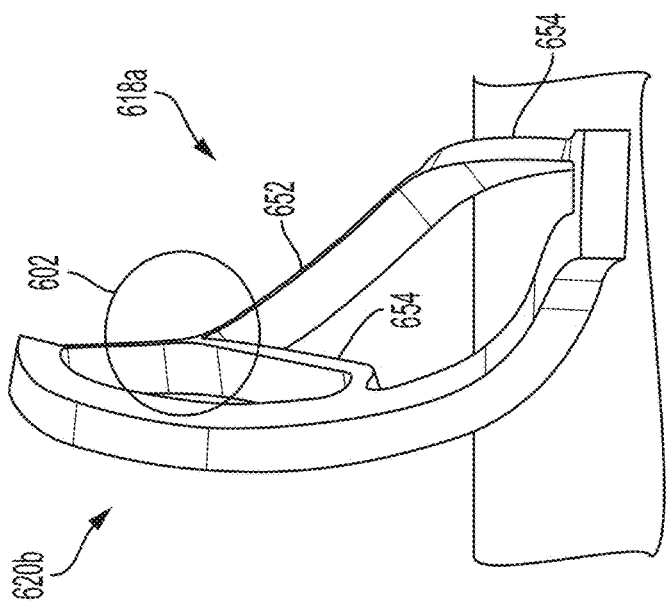
Figure 16A:
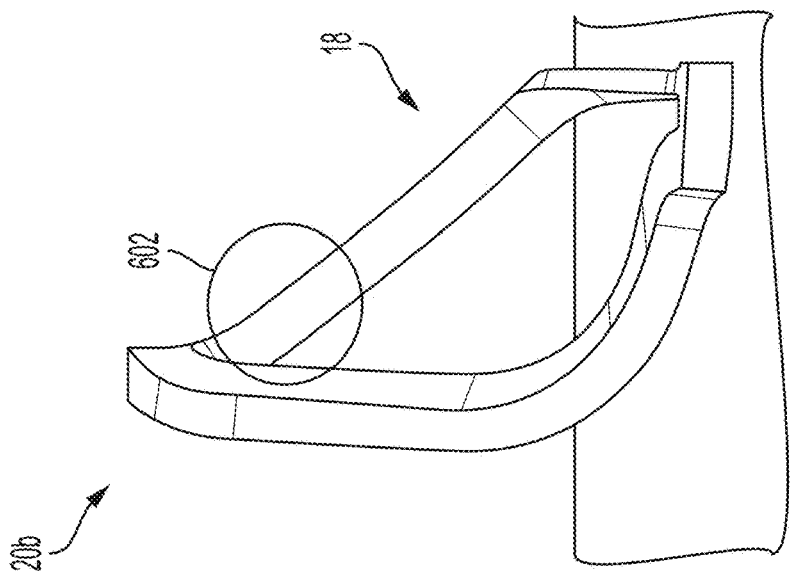

In some examples, curvature of the flared crown 620b is selected and controlled for use in a specific surgical procedure. Some procedures may call for a fixation device 610 with a flaring connector 618b that does not interfere with a gripping area of the flared crown 620b (e.g., a portion of the flared crown 620b that contacts an annular structure when the device 610 is deployed). For example, FIGS. 16A-16C show partially transparent circular regions 602, which are identical in size and shape, and are placed relative to flared crowns 20b, 620b. The circular regions 602 in FIGS. 16A-16C illustrate how the curvature of the flared crowns 20b, 620b affects how the flared crowns 20b, 620b interact with annular structures, such as other endovascular components or aspects of the target vasculature. Particularly, FIGS. 16A-16C show that increasing curvature of the flared crown 20b (FIG. 16A), 620b (FIGS. 16B and 16C) allows for improved interaction between the circular region 602 and the flared crown 20b, 620b. As the number of pairs of second legs and common points increases from one (FIG. 16A) to three (FIG. 16C), the curvature of the flared crown 620b better conforms to the shape of the circular region 602.

Fixation Devices with Flaring Connectors Adapted for Post-Dilation

Another exemplary fixation device 710 is shown in FIGS. 17A-17D. As in previous examples, the fixation device 710 having a longitudinal axis L1 (shown in FIG. 17A) includes the first outwardly flarable portion 714 connected to the second outwardly flarable portion 712 by longitudinal struts 730. The struts 730 extend between a valley 726 of a ring 716 of the outwardly flarable portion 714 and a valley 734 of a ring 732 of the second outwardly flarable portion 712. The second outwardly flarable portion 712 and first outwardly flarable portion 714 can be formed from any of the previously described materials including, for example, shape memory materials that are biased or heat-set to an expanded position or from biocompatible materials without shape-memory characteristics. The first outwardly flarable portion 714 includes the expandable ring 716 and flaring connectors 718 connected to the ring 716. Upon radially outward expansion of the fixation device 710, the flaring connectors 718 are configured to cause flarable crowns 720a (shown in FIGS. 17A and 17B) of the ring 716 to flare radially outwardly relative to other portions of the ring 716 to form flared crowns 720b (shown in FIGS. 17C and 17D). The second outwardly flarable portion 712 includes the expandable ring 732, which also includes flarable crowns 720a. The flarable crowns 720a of the second portion 712 can be mirror images of the flarable crowns 720a of the first portion 714. For brevity, only structures of the flarable crowns 720a of the first portion 714 are described herein. The flarable crowns 720a of the second portion 712 can have a same or similar structure.

Figure 17A:
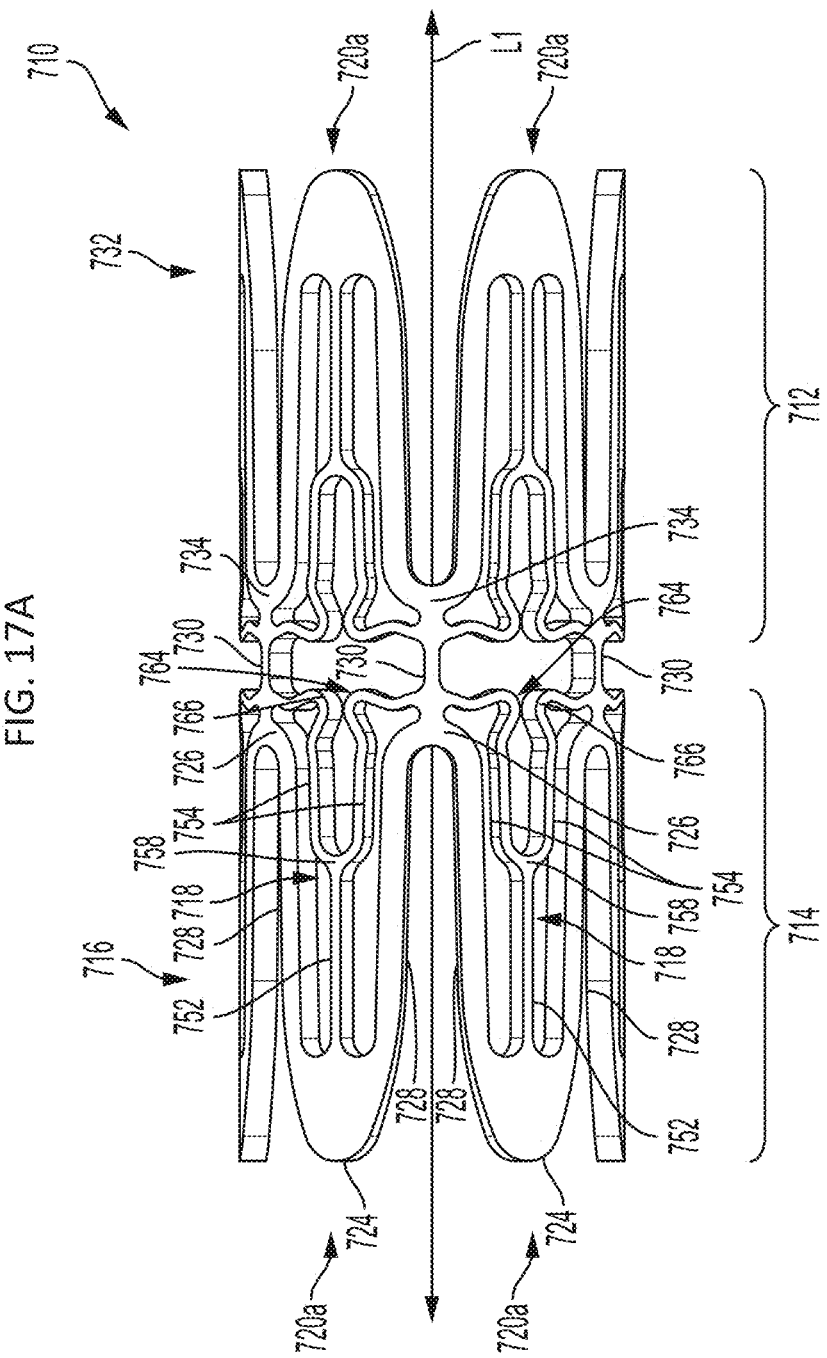
FIG. 17A is a front perspective view of another embodiment of an endovascular fixation device in a retracted position, according to an aspect of the disclosure.
Figure 17B:
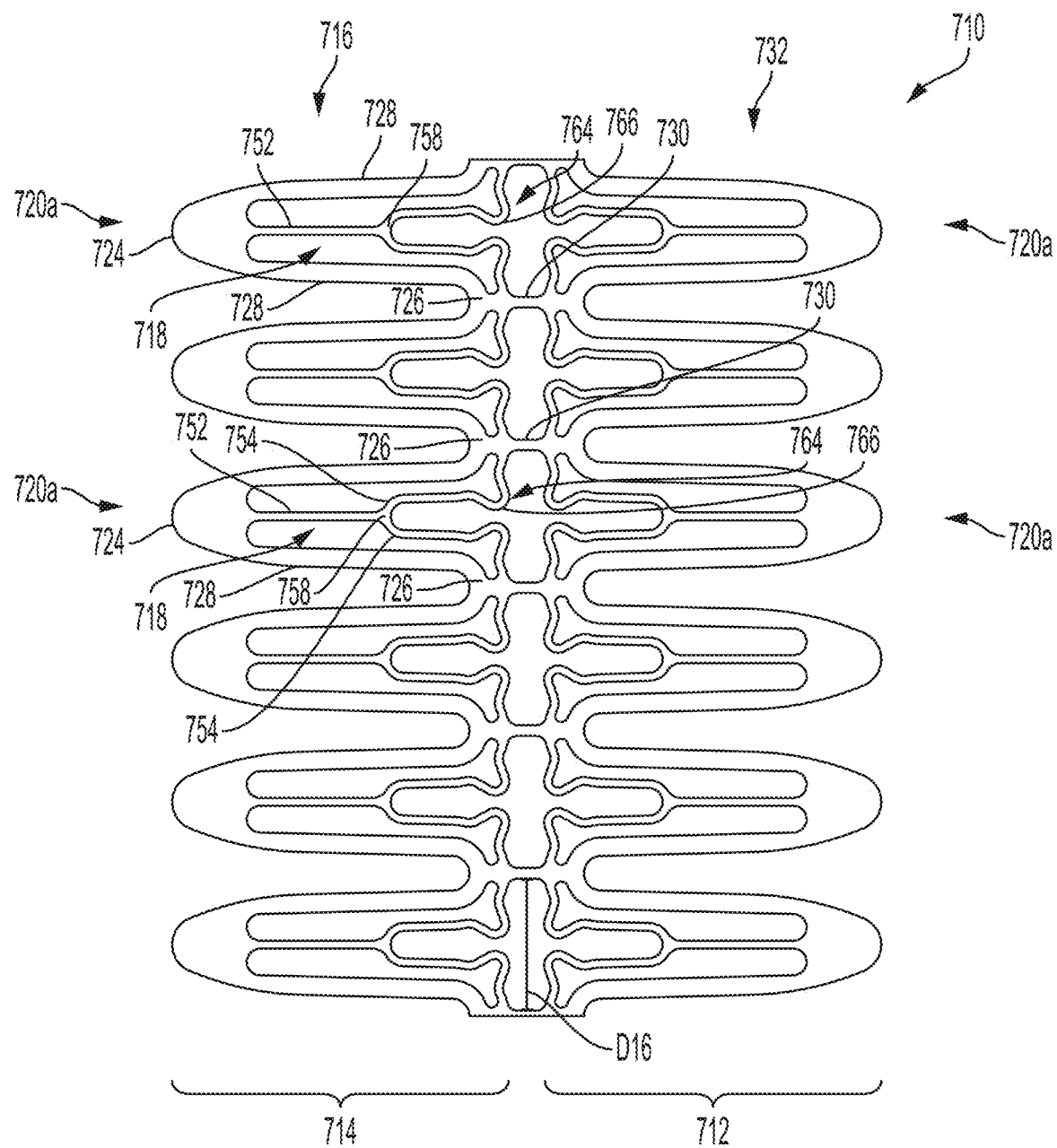
FIG. 17B is a flattened view of the endovascular fixation device of FIG. 17A.

With reference to FIGS. 17A and 17B, the flarable crowns 720a can include flaring connectors 718 having an axially-oriented or first leg 752 connected to the flarable crown 720a of the ring 716. For example, the first leg 752 can be connected at one end to the ring 716 near the peak 724 of the ring 716, and can extend axially in a proximal direction from the peak 724 of the ring 716 towards the body portion 712 of the fixation device 710. The flaring connectors 718 also include one or more pairs of the side or second legs 754, which extend from the first leg 752 to portions of the ring 716. For example, as shown in FIGS. 17A-17D, the flaring connectors 718 include one pair of side or second legs 754 that extend from a common point 758 on the axially oriented or first leg 752 to the struts 730 of the ring 716; however, this configuration is not meant to limit the scope of the present disclosure. In other examples, the flaring connectors 718 may include multiple pairs of side or second legs 754 and multiple common points, as shown in the exemplary stent devices 610 in FIGS. 13A-14B. Also, the side or second legs 754 can be connected to the ring 716 at any position on the ring 716. For example, the side or second legs 754 can be connected to the valleys 726, peaks 724, or transition portions 728 (e.g., between the peak 724 and the valley 726) of the ring 716. The side or second legs 754 can also be connected to the struts 730 extending between the rings 716, 732.

The flaring connectors 718 shown in FIGS. 17A-17D differ from previous examples because the second leg(s) 754 include expandable portions 764 that are capable of increasing in length following initial deployment of the fixation device 710 to a nominally deployed configuration. As used herein, the "nominally deployed configuration" (shown in FIG. 17C) refers to a position where flared crowns 720b extend radially outwardly relative to other portions of the fixation device 710 by, for example, a sufficient amplitude to maintain positioning of the stent device 710 within a body vessel. However, for certain procedures, it may be desirable to post-dilate the fixation device 710 after the initial deployment.

In the "nominally deployed configuration", the flaring connectors 718 may be arranged such that an angle α12 (shown in FIG. 17C) between the axially directed or first leg 752 and either of the side or second legs 754 decreases to approach 90°. For example, in the nominally deployed configuration, the angle α12 can be less than 120°, less than 105°, or about 90°. Significantly, in the nominally deployed configuration (shown in FIG. 17C), the expandable portions 764 of the side or second legs 754 remain capable of extension, meaning that a distance D16 between ends of a pair of side or second legs 754 connected to the ring 716 can be increased. The ability to increase the distance D16 (shown in FIGS. 17B, 17C, and 17D) between ends of the second legs 754 allows for post-dilation adjustment of the fixation device 710 after initial deployment. As used herein, "post-dilation adjustment" can refer to increasing the expanded diameter of the rings 716, 732 of the fixation device 710, as well as adjustment or repositioning of the flared crowns 720b after the flarable fixation device 710 is nominally deployed. In order to post-dilate the fixation device 710, after nominal deployment, the user may use a second deployment device, such as a second expandable balloon catheter, to post-dilate the fixation device 710. In some examples, post-dilation is performed to aid in gaining apposition to the wall of a vessel or device. In some examples, during post-dilation, a diameter of rings 716, 732 of the fixation device 710 may be increased by about 0.5 mm, 1 mm, 2 mm, 3 mm, 4 mm, or 5 mm compared to the diameter of the rings 716, 732 when nominally deployed. In one specific example, a diameter of the rings 716, 732 may increase by 4 mm, from 6 mm (in the nominally deployed configuration) to 10 mm in a post-dilated or fully deployed configuration.

In order to permit such post-dilation adjustment and repositioning, the expandable portion(s) 764 are desirably sufficiently rigid and/or are an appropriate geometry to resist extending and/or straightening during the initial deployment of the fixation device 710 from the restrained position (shown in FIGS. 17A and 17B) to the nominally deployed configuration (shown in FIG. 17C). During post-dilation adjustment or repositioning from the nominally deployed configuration (FIG. 17C) to the post-dilated configuration (FIG. 17D), the expandable portions 764 are stretched or straightened to increase the distance D16 between the ends of the side or second legs 754.

The expandable portion 764 can refer to any portions or segments of the second leg(s) 754 that are capable of further extension when the outwardly flarable portion 714 is in the nominally deployed configuration (FIG. 17C). The expandable portion 764 can include sections and portions of the second legs 754 with specific material properties, geometries, thicknesses, widths, curvatures and/or amplitudes, to substantially or partially resist movement (e.g., stretching or unfolding) during the nominal deployment of the fixation device 710, and which remain capable of further extension when the flaring connectors 718 are in the nominally flared configuration. In this way, the expandable portion 764 allows the flaring connector 718 to transition from the nominally deployed configuration (FIG. 17C) to the post-dilated or fully deployed configuration (FIG. 17D).

In some examples, the expandable portion 764 can be a portion or segment of the side or second leg 754 including a stretchable or elastomeric material that permits substantial extension of the second leg 754. In other examples, the expandable portion 764 can include mechanical structures, such as springs, telescoping arrangements, and other mechanisms for extending a length of a member. With continued reference to FIGS. 17A-17D, in some examples, the expandable portion 764 comprises one or more bends, ridges, or curves 766 configured to allow for the post-dilation extension of the second leg 754. The curves 766 of the expandable portion 764 are configured to remain folded during the initial deployment of the fixation device 710. The curves 766 of the expandable portion 764 unfold as the flaring connector 718 moves from the nominally flared configuration to the post-dilated configuration, during post-dilation repositioning or adjustment of the fixation device 710. In the post-dilated configuration (FIG. 17D), the curves 766 of the expandable portion 764 are fully or partially unfolded, such that the second leg 754 is substantially straight. In some examples, the expandable portion 764 can include bends and curves 766 in various configurations selected to allow for different degrees of post-dilation adjustment or repositioning. For example, the expandable portion 764 can include a bend or curve 766 having a curvature of greater than 90° and less than or equal to 180°. In some examples, the expandable portion includes a u-bend (FIG. 18A), a j-bend (FIG. 18B), or an s-bend (FIG. 18C). The length of the expandable portion 764, number of curves, curvature, and/or shape of the curves 766 are selected based on the amount of post-dilation extension that may be required for different uses and operative procedures and techniques.

Fixation Device with Flaring Connectors of Different Axial Lengths

Another example of a fixation device 810 is shown in FIGS. 19A-19E. The fixation device 810 includes the first outwardly flarable portion 814 connected to the second outwardly flaring portion 812 by elongated longitudinal struts 830. As shown, for example, in FIG. 19B, the ring 816 of the first outwardly flarable portion 814 includes valleys 826 and peaks 824. The elongated members 830 extend between the valleys 826 of the ring 816 and portions of a ring 832 of a second outwardly flaring portion 812. For example, the elongated struts 830 can be connected to the valley 834 of the ring 832. The second outwardly flarable portion 812 and first outwardly flarable portion 814 can be formed from any of the previously described materials including biocompatible shape memory materials and biocompatible materials without shape memory properties. Portions of the fixation device 810 including the second outwardly flarable portion 812 and/or the first outwardly flarable portion 814 can be covered. The cover can be formed from PTFE, ePTFE, or other biocompatible hydrophobic materials.

The first outwardly flarable portion 814 includes flarable crowns 820a, configured to flare radially outwardly relative to other portions of the device 810. The second outwardly flarable portion 812 is a circumferentially shifted mirror image of the first outwardly flarable portion 814 and also includes the flarable crowns 820a. For brevity, only structures of the flarable crowns 820a of the first portion 814 are described herein. The flarable crowns 820a of the second portion 812 can have the same structures.

Figure 19A:
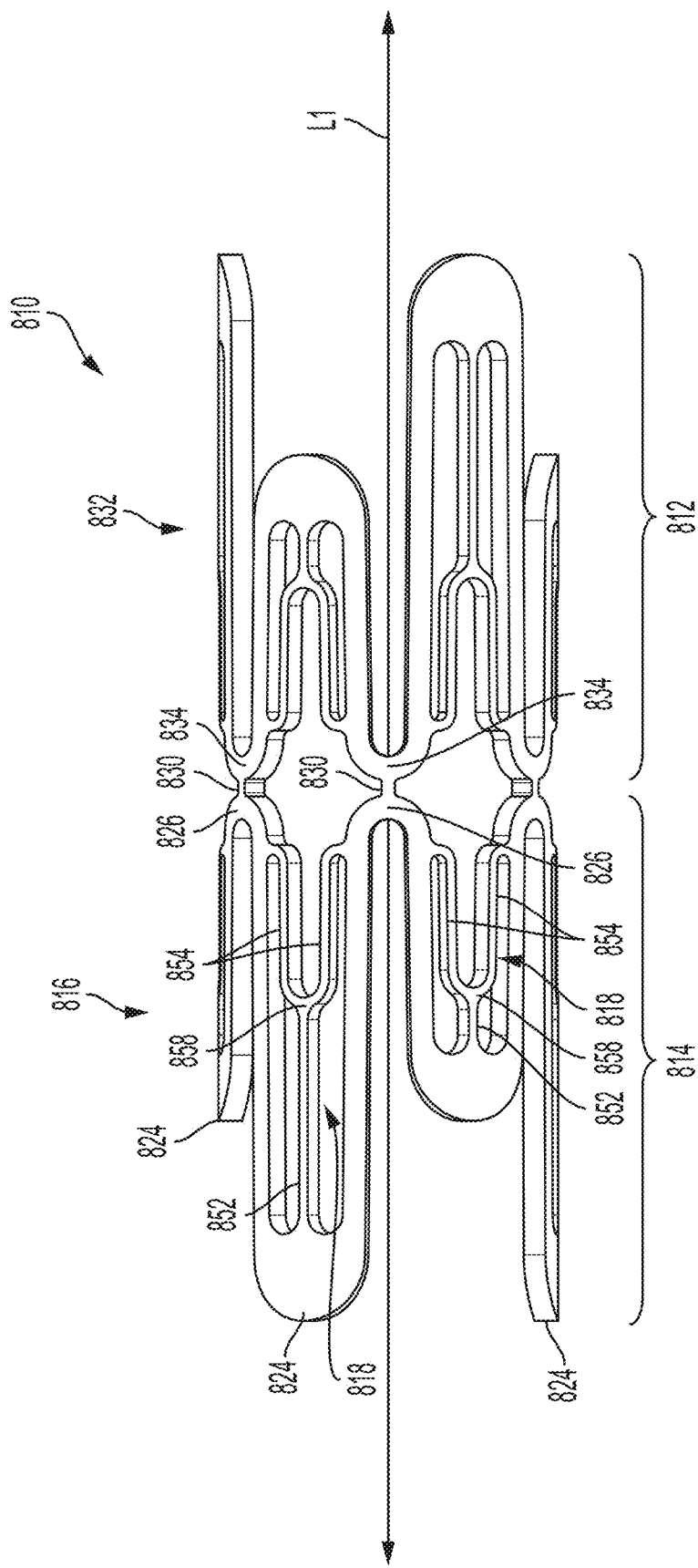
FIG. 19A is a front perspective view of another embodiment of an endovascular fixation device in a retracted position, according to an aspect of the disclosure.
Figure 19B:
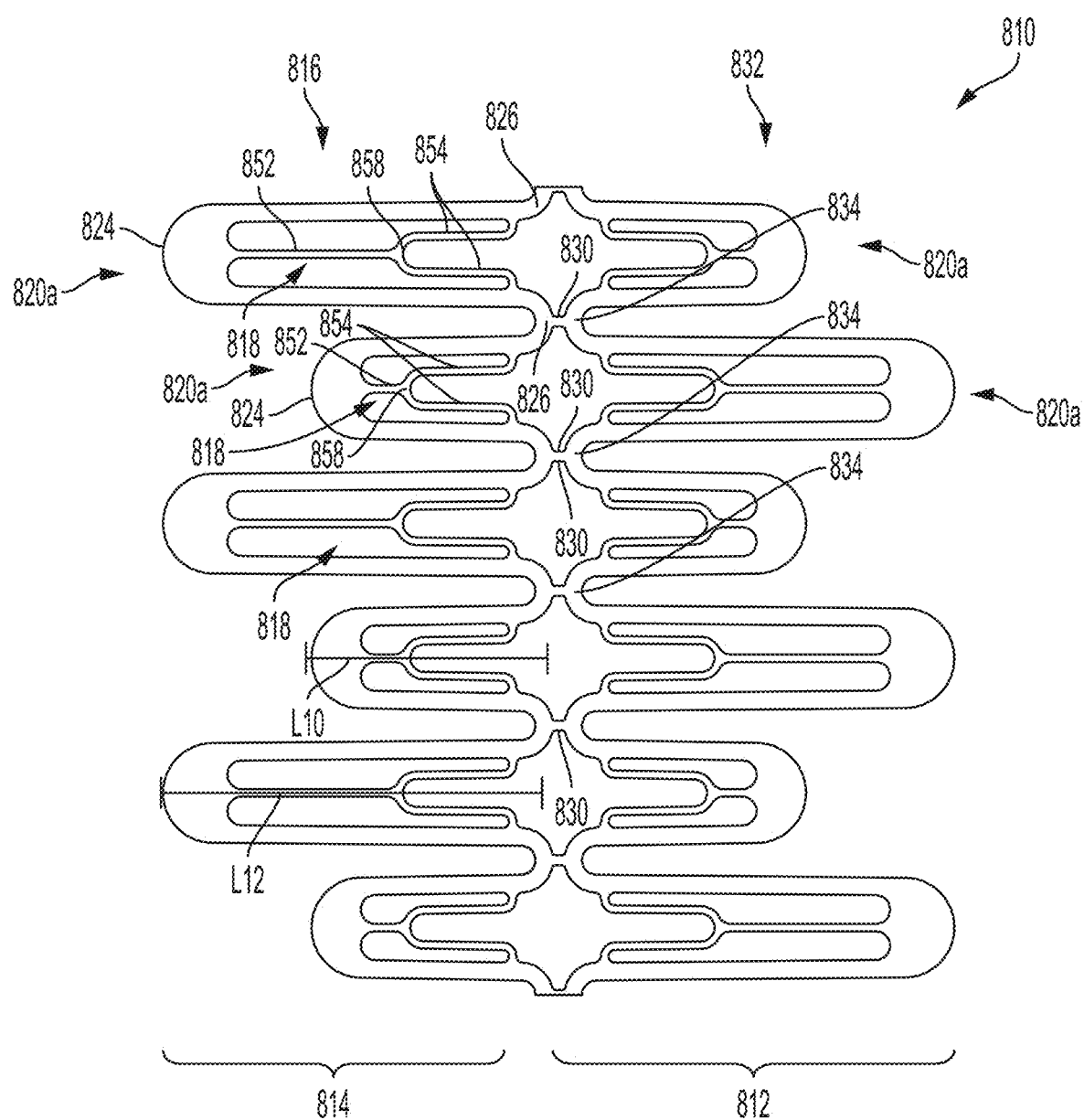
FIG. 19B is a flattened view of the endovascular fixation device of FIG. 19A.
Figure 19C:
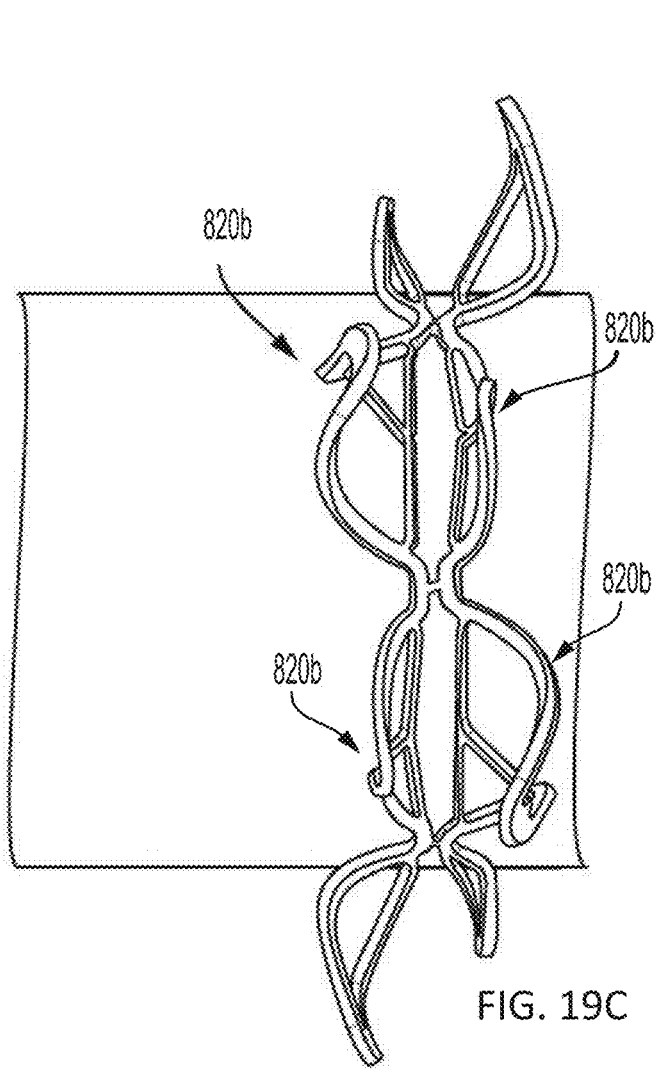
FIG. 19C is a front perspective view of an outwardly flarable portion of the endovascular fixation device of FIG. 19A in a fully expanded position.

As shown in FIGS. 19A and 19B, the flarable crowns 820a include the flaring connectors 818. As in previous examples, the flaring connectors 818 comprise a first leg 852 and side or second legs 854 connected together and to the first leg 852 at a common point 858. The flaring connectors 818 are configured to cause the flarable crowns 820a to flare radially outwardly in response to radial expansion of the fixation device 810, which causes the flarable crowns 820a (shown in FIGS. 19A and 19B) to become flared crowns 820b (shown in FIG. 19C).

As previously described, a fenestration ring 802 (shown in FIGS. 19D and 19E) is often included in an endograft to allow for access to side branches. Since vessels leading into fenestrations may not be square (e.g. form 90° angles relative to each other) it is useful to have an auto-alignment feature on a fixation device. Accordingly, the fixation device 810 includes the outwardly flarable portions 812, 814, which captures the fenestration ring 802 and function as an auto-alignment structure. In particular, the outwardly flarable portions 812, 814 of the fixation device 810 including the rings 816, 832 can be configured to capture and align with the fenestration ring 802 during deployment of the flarable crowns 820a to ensure that the fixation device 810 is properly aligned relative to the graft. By capturing and properly aligning with the fenestration ring 802, the flared crowns 820b can ensure sufficient securement with the fenestration ring 802, which desirably creates a seal sufficient to prevent leaks (e.g., type Ma endoleaks). In other examples, this auto alignment feature can be useful when connecting two vessels in a side to side anastomosis configuration as mentioned above.

In some examples, the first and second outwardly flarable portions 812, 814 may include any number of flarable crowns 820a and flaring connectors 818 selected, for example, based on the size and shape of the vessel, endograft, and fenestration ring 802. For example, the rings 816, 832 in FIGS. 19A-19E each include six flaring connectors 818 and flarable crowns 820a or flared crowns 820b. However, the number of flarable connectors and crowns is variable and can be more or less than six, within the scope of the present disclosure. In some instances and while not shown in the figures, the rings 816, 832 may include non-flaring crowns interspersed between the flarable crowns 820a around the circumference of the ring(s) 816, 832. Also, amplitudes of the flarable crowns 820a (and non-flaring crowns, if present) can be adjusted to any desired length and/or can be configured to flare to any desired amplitude, depending on the intended use of the fixation device 810. As shown in FIGS. 19A-19E, in some examples, the flarable crowns 820a of the ring 816 can be axially aligned with corresponding flarable crowns 820a of the ring 832. In other examples, some or all of the flarable crowns 820a of the ring 816 may be skewed or offset from the flarable crowns 820a of the ring 832, such that flared crowns 820b of the ring 832 twist, pivot, or rotate relative to the flared crowns 820b of the ring 816.

The flarable crowns 820a of the first portion 814 and/or the second portion 812 differ from previous examples because the flarable crowns 820a include flaring connectors 818 of different lengths. For example, as shown in FIG. 19B, the flaring connectors 818 can include short flaring connectors having an axial length L10 and long flaring connectors with a longer axial length L12. For the exemplary fixation device 810 shown in FIGS. 19A-19E, a ratio (L12/L10) between the length L12 of the longer flaring connector 818 and L10 of the shorter flaring connector 818 is 1.6 (4:2.5). However, this exemplary ratio between lengths L12 and L10 is not intended to be limiting. In other examples, a ratio for lengths L12 and L10 may be selected based on a size (e.g., diameter or thickness) of the ring or annular structure intended to be grasped by the flared crowns 820b. For example, the length L10 of the shorter flaring connectors 818 may be from about 99% to about 1% of the length L12 of the longer flaring connectors 818. In other examples, the length L10 may be about 90%, about 80%, about 75%, about 50%, or about 25% of the length L12 of the longer flaring connectors 818.

In some examples, the short flaring connectors (shown by length L10) and the long flaring connectors (shown by length L12) can alternate around the circumference of each ring 816, 832, as shown in FIGS. 19A-19E. However, this configuration of long and short flaring connectors 818 and flarable crowns 820a is not intended to be limiting and, in other examples, long crowns 820a may be separated from other long crowns by two or more short crowns around the circumference of the rings 816. Alternatively, short crowns 820a may be separated from other short crowns by two or more long crowns, around the circumference of the rings 816, 832. In some examples, short flaring connectors and flarable crowns 820a of one ring 816 can be axially aligned with long flaring connectors 818 and corresponding flarable crowns 820a of the other ring 816.

Figure 19D:
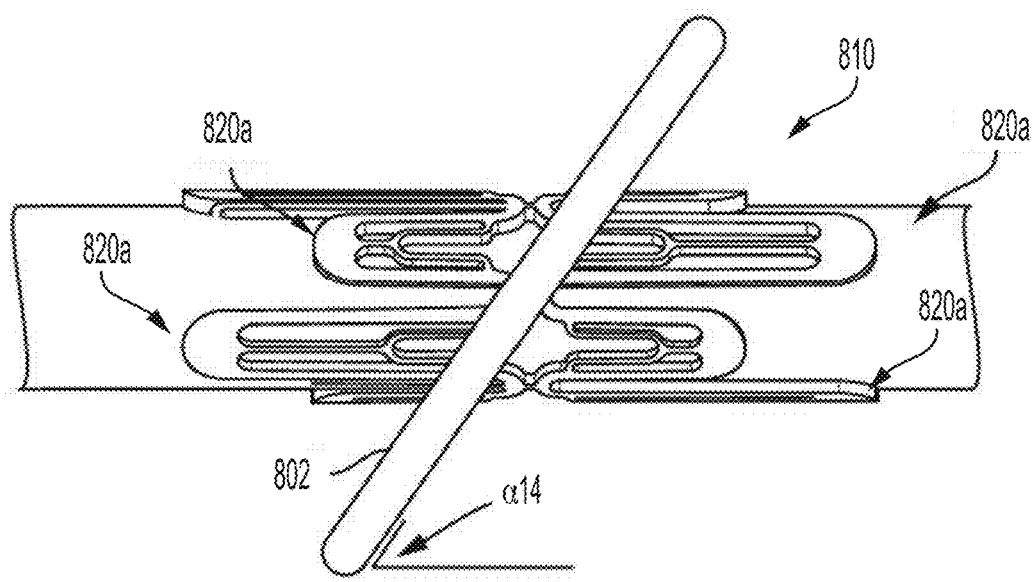
FIG. 19D is a schematic drawing showing the endovascular fixation device of FIG. 19A and a representation of a fenestration ring, according to an aspect of the disclosure.
Figure 19E:
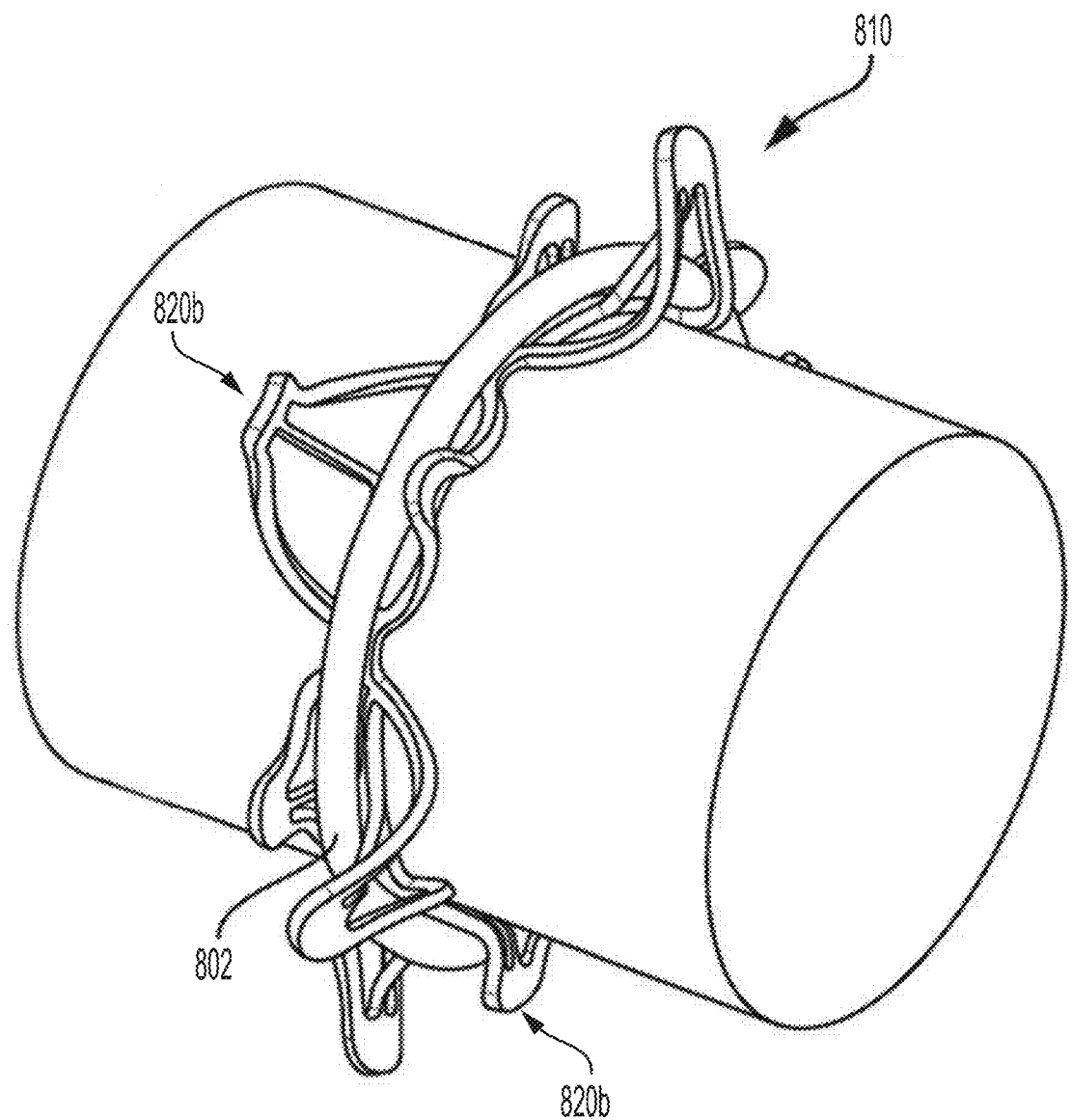
FIG. 19E is a schematic drawing showing the stent device of FIG. 19A in a flared configuration and engaging the representation of the fenestration ring, according to an aspect of the disclosure.

The short and long flaring connectors 818 may be provided to facilitate deployment of the fixation device 810 at a desired location relative to an endograft. Particularly, when implanting the fixation device 810 under fluoroscopy, it can be difficult to precisely align the fixation device 810 and fenestration ring 802 (shown in FIGS. 19D and 19E) of the endograft. Including the short and long flaring connectors 818 and flarable crowns 820a of varying lengths L10, L12 can facilitate such alignment by increasing a size of a target landing zone (i.e., a portion of the outwardly flarable portions 812, 814 which must contact the fenestration ring 802 to successfully receive or capture the ring 802) without substantially increasing a total length of the fixation device 810 or outwardly flarable portions 812, 814. Schematic drawings showing the fixation device 810 and fenestration ring 802 are provided in FIGS. 19D and 19E. As shown in FIG. 19D, the fenestration ring 802 overlaying the fixation device 810 is skewed at an angle α14 relative to the longitudinal axis L1 (shown in FIGS. 19A and 19B) of the fixation device 810. However, since the fenestration ring 802 is within an area of a "target landing zone" defined by the longer flaring connectors 818, 832 and flarable crowns 820a of length L12, the fenestration ring 802 can be captured by or received within the groove defined by flared crowns 820b. In particular, as the flarable crowns 820a flare radially outwardly, the longer flarable crowns 820a can contact and align the fenestration ring 802 and fixation device 810, such that upon full deployment, the fenestration ring 802 is captured by and correctly aligned with the flared crowns 820b, as shown in FIG. 19E.

Fixation Device with Fixation Portions Connected by an Elongated Body Portion

With reference to FIGS. 20A-20E, a fixation device 910 can comprise two fixation portions, such as a first fixation portion 912 and a second fixation portion 914, connected by a middle or elongated body portion 930 extending between the two fixation portions 912, 914 of the device 910. The fixation portions 912, 914 can include features of any of the previously described fixation devices, such as fixation devices 10, 210, 310, 610, 710, 810. For example, the fixation portions 912, 914 can comprise outer flarable crowns 920a forming an outer first radially expandable ring 916 and inner flarable crowns 922a forming an inner radially expandable ring 932. The outer flarable crowns 920a can be configured to flare radially outwardly relative to the elongated portion 930 bending towards the body portion 930 when the fixation device 910 is expanded from a retracted position to an expanded position. In a similar manner, the inner flarable crowns 922a form an inner radially expandable ring 932 positioned between the outer radially expandable ring 916 and the elongated body portion 930 of the device 910. The flarable crowns 922a are configured to flare radially outwardly relative to the elongated body portion 930 bending away from the elongated body portion 930 when the fixation device 910 is expanded from the retracted position to the expanded position.

Figure 20A:
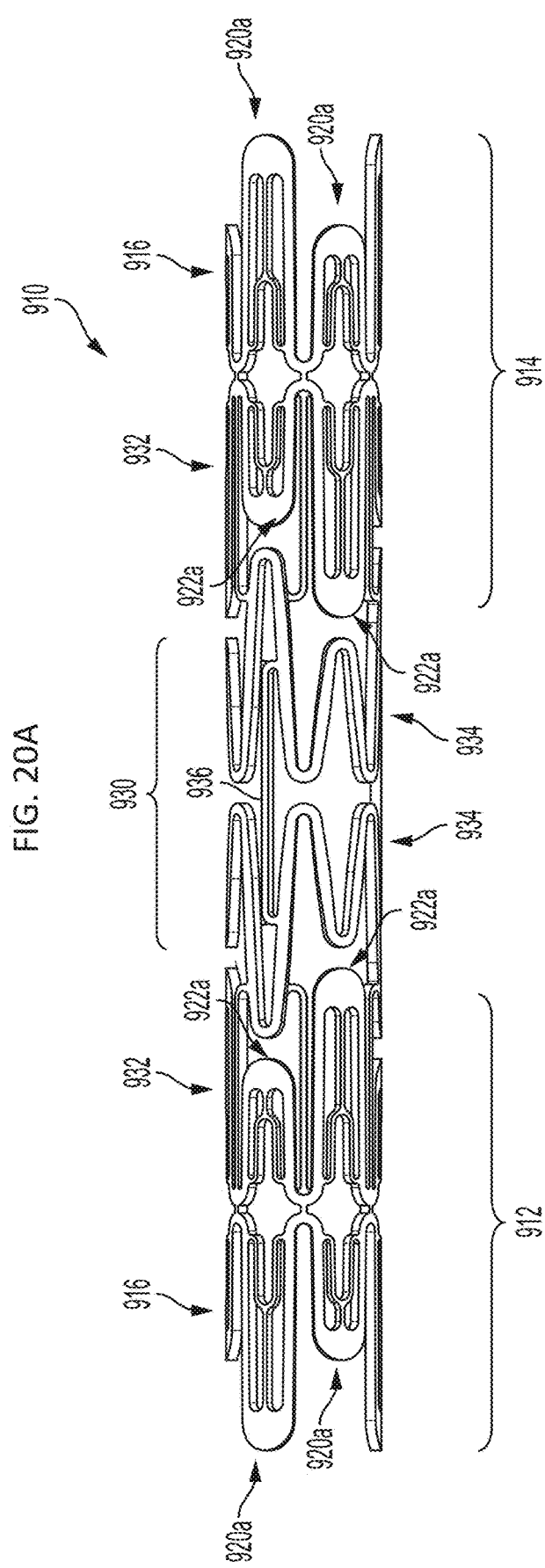
FIG. 20A is a front perspective view of another embodiment of an endovascular fixation device in a retracted position, according to an aspect of the disclosure.
Figure 20B:
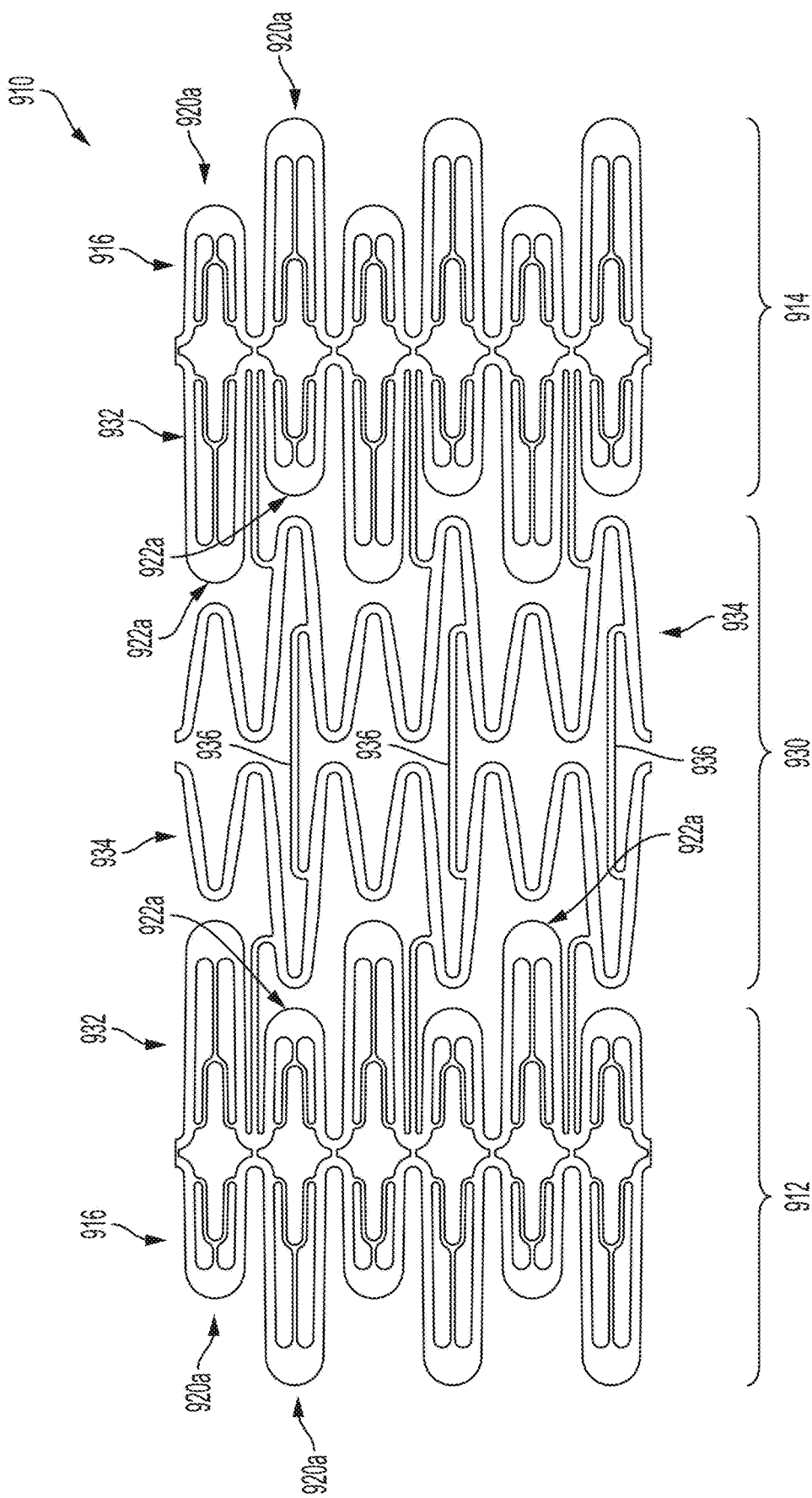
FIG. 20B is a flattened view of the endovascular fixation device of FIG. 20A.

As shown in FIGS. 20A-20E, the rings 916, 932 can be alternating amplitude rings (similar to the rings shown in FIGS. 19A and 19B). In other examples, the rings 916, 932 can comprise flarable crowns 920a, 922a of the same amplitude (as shown, for example, in FIGS. 1A and 2A). Further, while FIGS. 20A and 20B depict fixation portions 912, 914 comprising two rings 916, 932, this is not meant to limit the scope of the present disclosure. Instead, the number of rings and/or a distance between the rings 916, 932 can be selected based on the size and/or intended use of the device 910. The device 910 further comprises the middle or elongated body portion 932 extending between the fixation portions 912, 914. The middle or elongated body portion 930 can comprise expandable ring(s) 934 connected by longitudinally extending struts or interconnecting members 936.

Figure 20C:
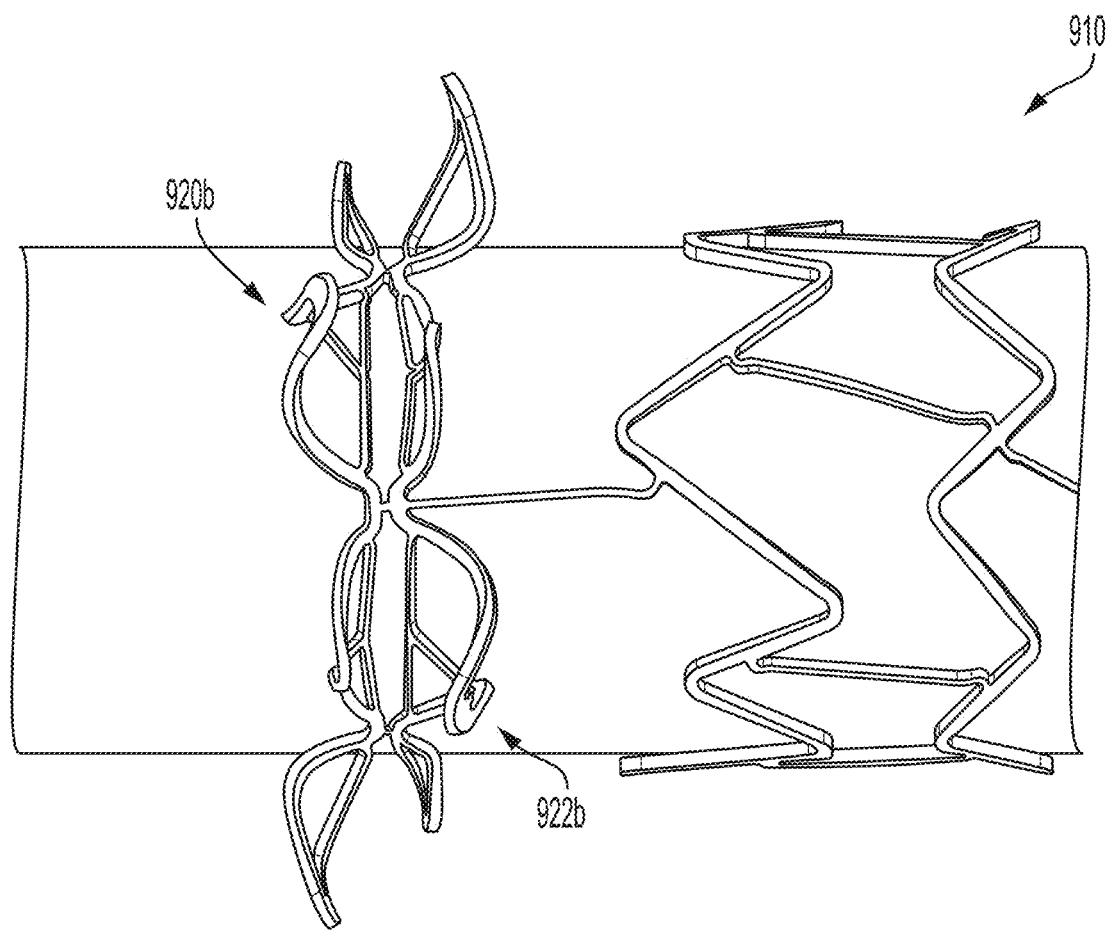
FIG. 20C is a front perspective view of an outwardly flarable portion of the endovascular fixation device of FIG. 20A in a fully expanded position.
Figure 20D:
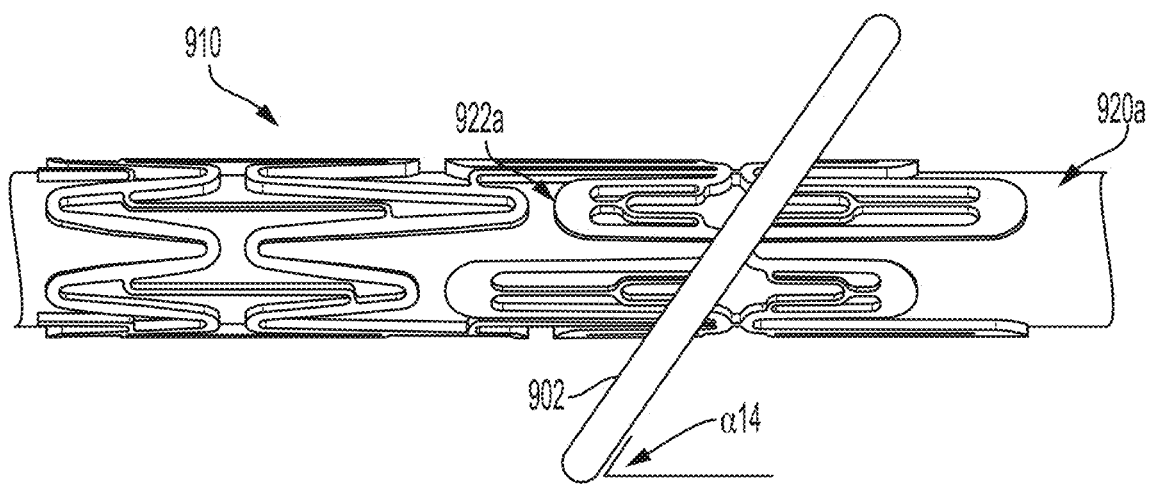
FIG. 20D is a schematic drawing showing the stent device of FIG. 20A and a representation of a fenestration ring, according to an aspect of the disclosure.
Figure 20E:
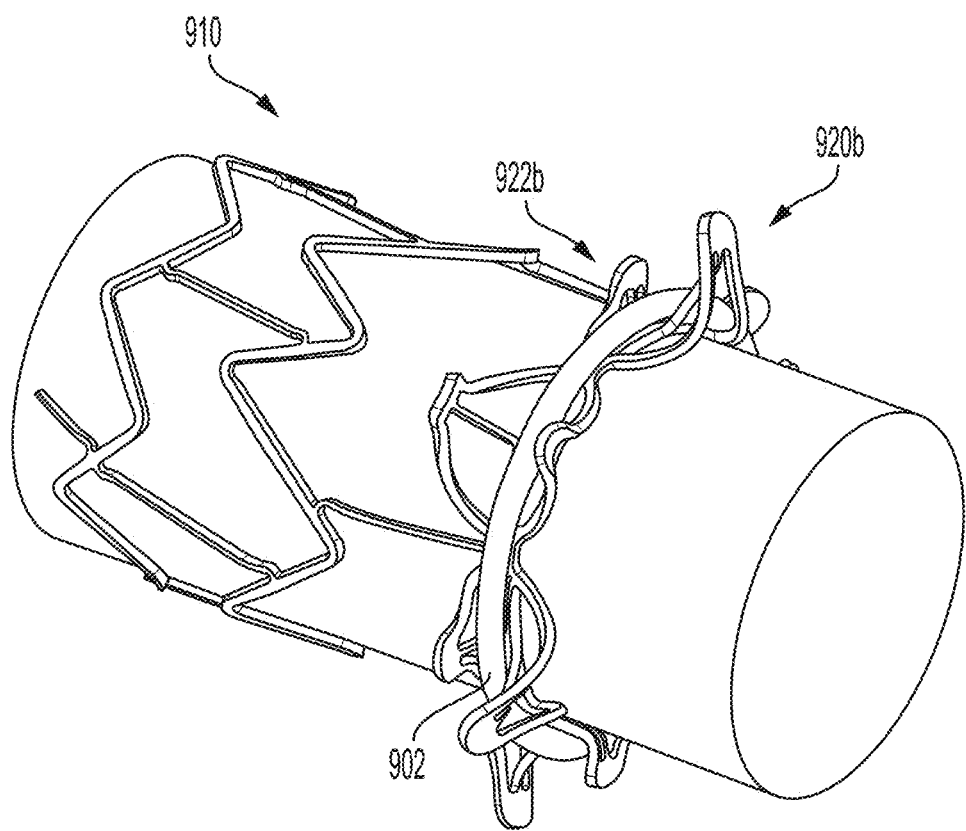
FIG. 20E is a schematic drawing showing the stent device of FIG. 18A in a flared configuration and engaging the representation of the fenestration ring, according to an aspect of the disclosure.

The fixation device 910 can be deployed in a manner similar to any of the previously described fixation devices. As in the previous examples, expansion of one of the rings 916, 932, 934 causes the flarable crowns 920a, 922a to flare radially outwardly to form the flared crowns 920b, 922b. FIG. 20C depicts one end of the fixation device 910 in a deployed or expanded position including the flared crowns 920b, 922b. Schematic drawings showing the device 910 in the deployed or expanded position and a fenestration ring 902 are provided in FIGS. 20D and 20E.

Endovascular Fixation Assembly Including a Covered Fixation Device and Stent

An endovascular fixation assembly 1002 is shown in a retracted position in FIG. 21A and in an expanded position in FIG. 21B. The assembly 1002 comprises an endovascular fixation device 1010 comprising first flarable crowns 1020a forming a first ring 1016 and second flarable crowns 1022a forming a second ring 1032, a radially expandable stent 1030 spaced apart from the fixation device 1010, and a cover 1050 covering or enclosing at least a portion of the fixation device 1010 and at least a portion of the stent 1030 and connecting the fixation device 1010 to the stent 1030. As in previous examples, upon expansion of the fixation device 1010, the flarable crowns 1020a, 1022a flare radially outwardly forming the flared crowns 1020b, 1022b (shown in FIG. 21B). The endovascular fixation device 1010 can be any of the fixation devices 210, 310, 610, 710, 810 disclosed herein. The stent 1030 can be any radially expandable stent known in the art configured to expand from a retracted position to an expanded position. In some examples, the stent 1030 can comprise multiple radially expandable rings 1034 arranged in series along a longitudinal axis L1 of the stent 1030 and interconnecting member(s) 1036 extending between and connecting the radially expandable rings 1034.

The cover 1050 can be connected to the fixation device 1010 and/or stent 1030 be any convenient fastener mechanism or technique as is known in the art. For example, the cover 1050 can be connected to the fixation device 1010 and/or stent 1030 by sutures, welding, biocompatible adhesives, and combinations thereof, as are known in the art. In some examples, the fixation device 1010 and/or stent 1030 are enclosed within the cover 1050. In other examples, the cover 1050 can be positioned inside of the lumen or central cavity defined by the fixation device 1010 and/or stent 1030. In some examples, the cover 1050 is formed from a low-friction biocompatible material, such as ePTFE.

Beneficially, the entire assembly 1010 including the fixation device 1010 and stent 1030 can be mounted on a delivery system and deployed as a unit. When deployed, the fixation device 1010 of the assembly 1030 can be used to lock on a fenestration ring, such as the fenestration ring 802 (shown in FIGS. 19D and 19E) while the stent 1030 directs blood flow to a desired location.

ADDITIONAL EXAMPLES

The following examples are presented to demonstrate general principles of embodiments in accordance with this disclosure. This disclosure, and any claimed embodiments, should not be considered as limited to the specific examples presented.

Figure 22A:
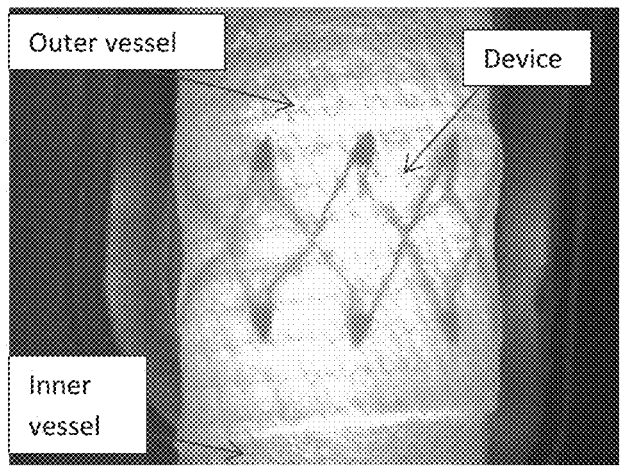
FIGS. 22A and 22B are photographs of an endovascular fixation device deployed to create an end-to-end anastomosis between an inner synthetic vessel and an outer synthetic vessel.

Example 1: An endovascular fixation device possessing an outwardly flaring portion and flarable crowns, in accordance with a non-limiting embodiment, was mounted and crimped on a balloon catheter. An end-to-end anastomosis was then created by placing one end of an 8 mm diameter synthetic vessel inside of a second 8 mm diameter synthetic vessel with a 1 cm overlap, which is possible because synthetic vessels, like organic vessels, have some degree of stretchability. The balloon mounted endovascular fixation device was then inserted into the lumen of the inner synthetic vessel and deployed in the area of the overlap to create an internal attachment of the two synthetic vessels. The balloon catheter was then deflated and removed. The deployed fixation device securely fastened the two synthetic vessels together. Samples were examined using a digital microscope at 20× magnification. FIG. 22A depicts a top view of the end-to-end anastomosis made using the endovascular fixation device with the outwardly flaring portion and the flarable crowns. The fixation device has been deployed so the outwardly flaring portion is in the expanded state and the flarable crowns have formed flared crowns. Specifically, FIG. 22A is an external top view of this trans-illuminated end-to-end anastomosis, which shows the deployed state of the endovascular fixation device.

Figure 22B:
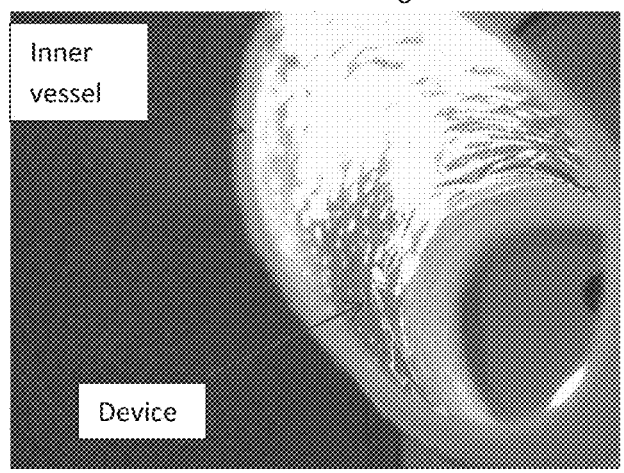

FIG. 22B is a luminal view of the end-to-end anastomosis made with the endovascular fixation device, wherein the outwardly flaring portion is in the expanded state and the flarable crowns have formed flared crowns. As shown in FIG. 22B, the deployed fixation device provides or creates a large, open lumen achieved when the endovascular fixation device is in its deployed state.

Figures 23A, 23B:
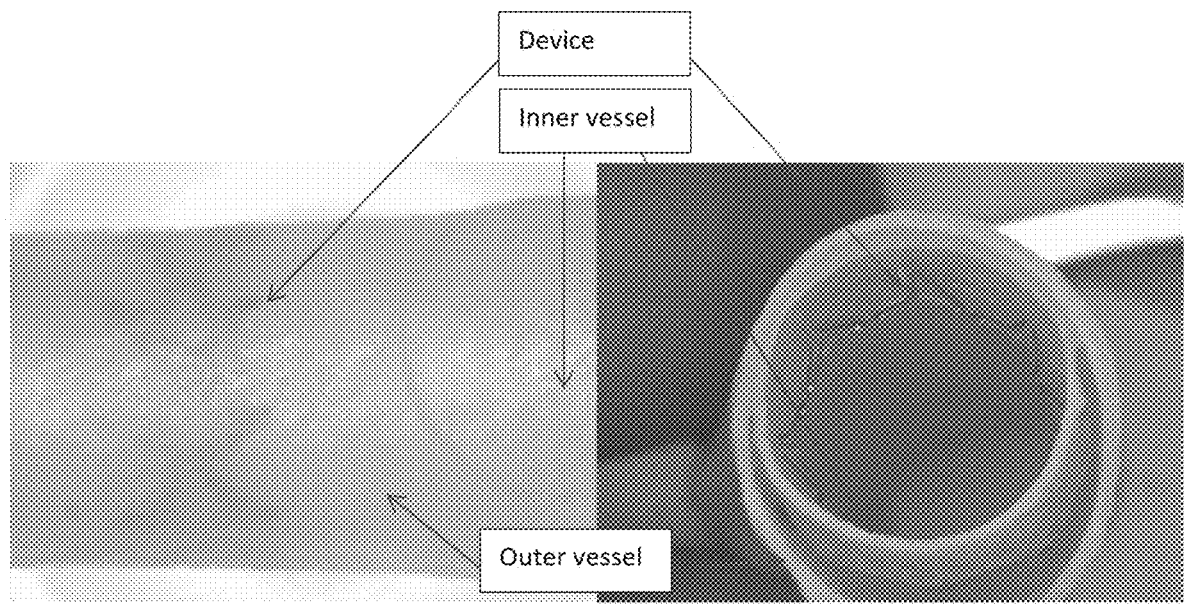
FIGS. 23A and 23B are photographs of an endovascular fixation device deployed to create an end-to-side anastomosis between two synthetic vessels.

Example 2: An endovascular fixation device having an outwardly flaring portion and flarable crowns, in accordance with a non-limiting embodiment, was mounted and crimped on a balloon catheter. An end-to-side anastomosis was then created by creating a diamond shaped incision in a 10 mm diameter synthetic vessel and inserting a second 8 mm diameter synthetic vessel into the diamond shaped incision. The balloon mounted endovascular fixation device was then inserted into the lumen of the 8 mm device and deployed to create an internal attachment of the two synthetic vessels. The balloon catheter was then deflated and removed. The deployed fixation device securely fastened the two synthetic vessels together. Samples were examined using a digital microscope at 20× magnification. FIGS. 23A and 23B demonstrate the end-to-side anastomosis from different positions. FIG. 23A is an external view of the anastomosis. FIG. 23B is an internal view of the anastomosis.

Figures 24A, 24B:
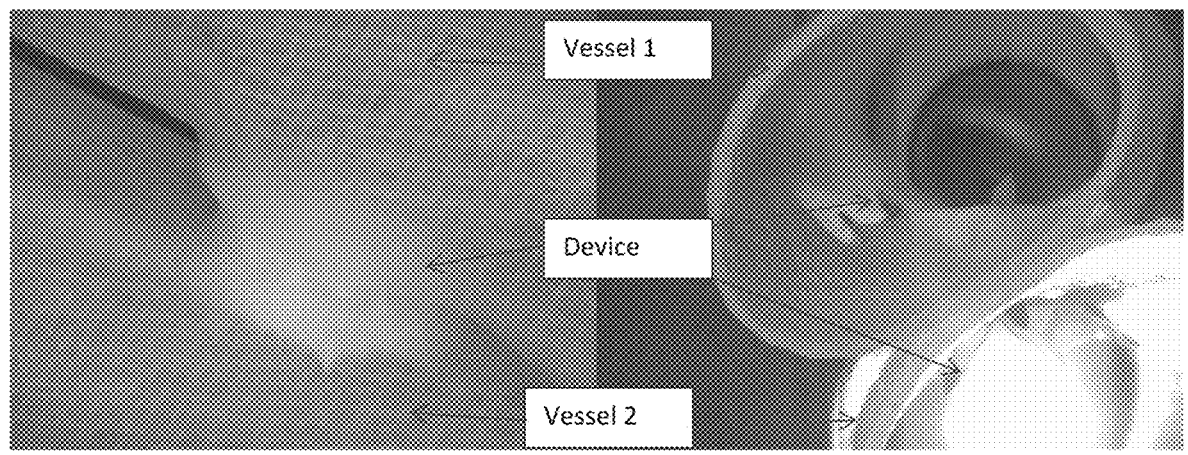
FIGS. 24A and 24B are photographs of an endovascular fixation device deployed to create a side-to-side anastomosis between two synthetic vessels.
Figures 24C, 24D:
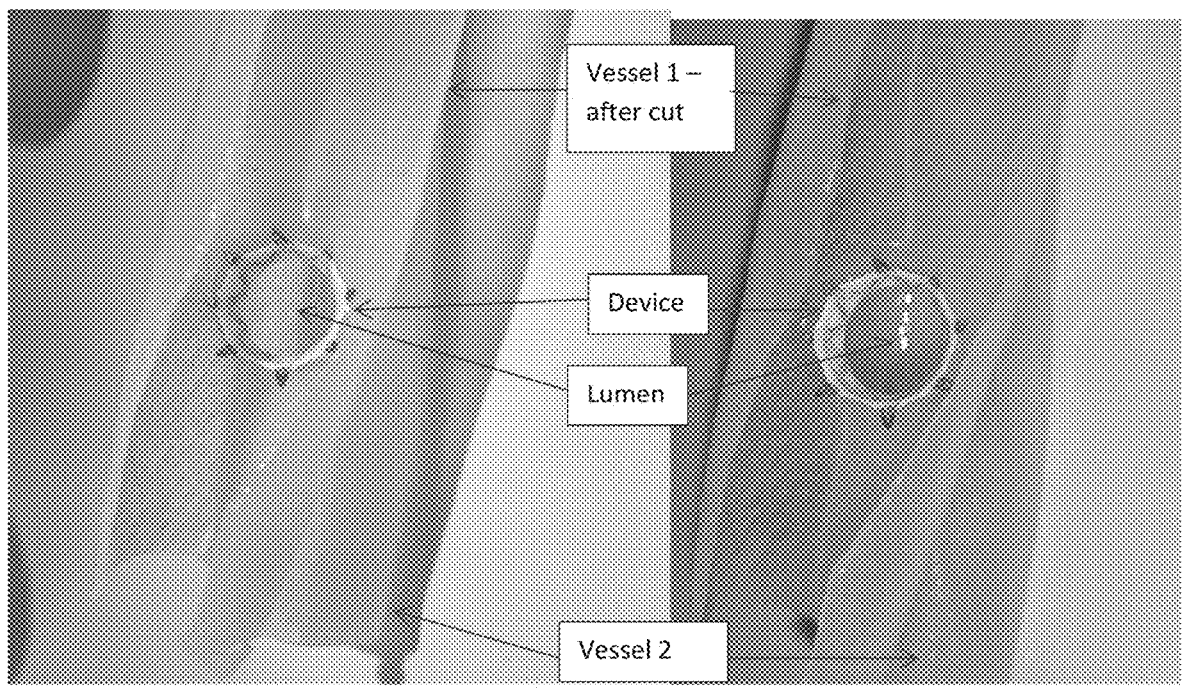
FIGS. 24C and 24D are photographs showing the endovascular fixation device after the two synthetic vessels have been cut lengthwise so as to expose the endovascular fixation device in its deployed state, thereby forming a side-to-side anastomosis between two synthetic vessels.

Example 3: An endovascular fixation device possessing an outwardly flaring portion and flarable crowns provided with barbs, in accordance with a non-limiting embodiment, was covered in ePTFE using conventional stent covering techniques. The fixation device was then mounted and crimped on a balloon catheter. A side-to-side anastomosis was then created by aligning two 10 mm diameter synthetic vessels and creating a stab incision through adjacent vessel walls. The balloon mounted covered endovascular fixation device was then inserted into the lumen of one of the synthetic vessels and lined up within the stab incision between the two vessels. The endovascular fixation device was then deployed to create an internal attachment of the two synthetic vessels by expanding the outwardly flaring portion, thereby causing the flarable crowns to form flared crowns and causing the barbs to engage the sidewalls of the synthetic vessels. The balloon catheter was then deflated and removed. The deployed fixation device securely fastened the two synthetic vessels together and left a clear circular conduit for blood to flow between the two synthetic vessels. Samples were examined using a digital microscope at 20× magnification. FIGS. 24A and 24B are photographs showing how the fixation device can be used to create the side-to-side anastomosis between two vessels. Specifically, FIG. 24A shows an external view of the anastomosis. FIG. 24B shows an internal view of the anastomosis. FIG. 24C and FIG. 15D show the lumen created between the two synthetic vessels after cutting the vessels longitudinally for imaging purposes so that characteristics of the lumen provided by the deployed endovascular fixation device at the anastomosis site are readily appreciated.

Figures 25A, 25B:
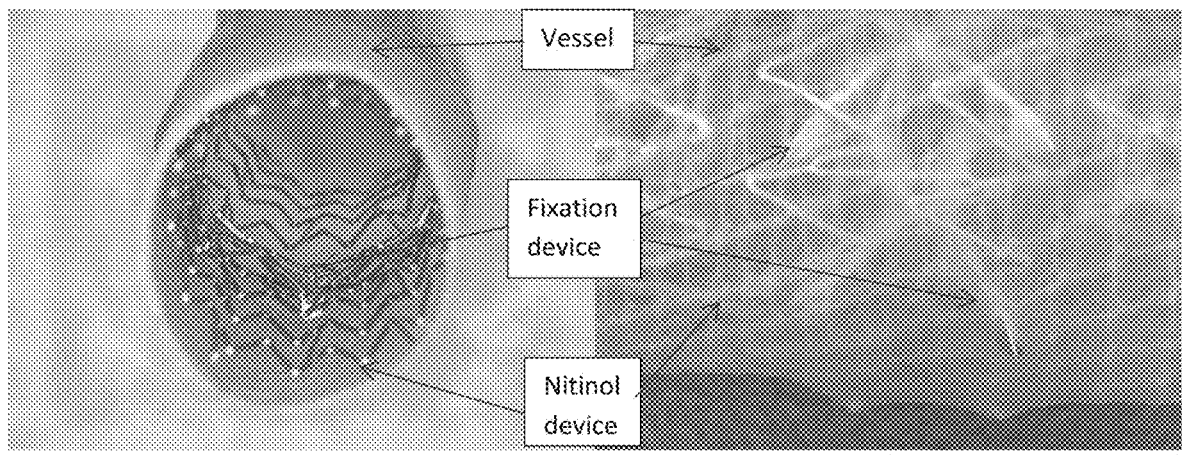
FIGS. 25A and 25B are photographs of another embodiment of an endovascular fixation device deployed within a synthetic vessel in order to secure a nickel-titanium alloy stent.

Example 4: An endovascular fixation device possessing an outwardly flaring portion and flarable crowns, in accordance with a non-limiting embodiment, was mounted and crimped on a balloon catheter. A 6 mm nickel-titanium alloy (e.g., NITINOL) stent was then loosely inserted into an 8 mm diameter synthetic vessel. The nickel-titanium alloy stent did not have full apposition to the vessel wall and could freely migrate axially and radially. The balloon mounted endovascular fixation device was then inserted into the lumen of the nickel-titanium alloy stent that was positioned inside of the vessel and the endovascular fixation device was deployed so that the outwardly flaring portion was expanded and the flarable crowns flared to form flared crowns in order to secure the nickel-titanium alloy stent to the internal diameter of the vessel. The balloon catheter was then deflated and removed. The deployed fixation device securely attached the nickel-titanium alloy stent to the inner diameter of the vessel so the stent could no longer migrate. Samples were examined using a digital microscope at 20× magnification. FIGS. 25A and 25B are luminal and external top views, respectively, showing the deployed endovascular fixation device securing the nickel-titanium alloy stent to the vessel.

Figures 26A, 26B:
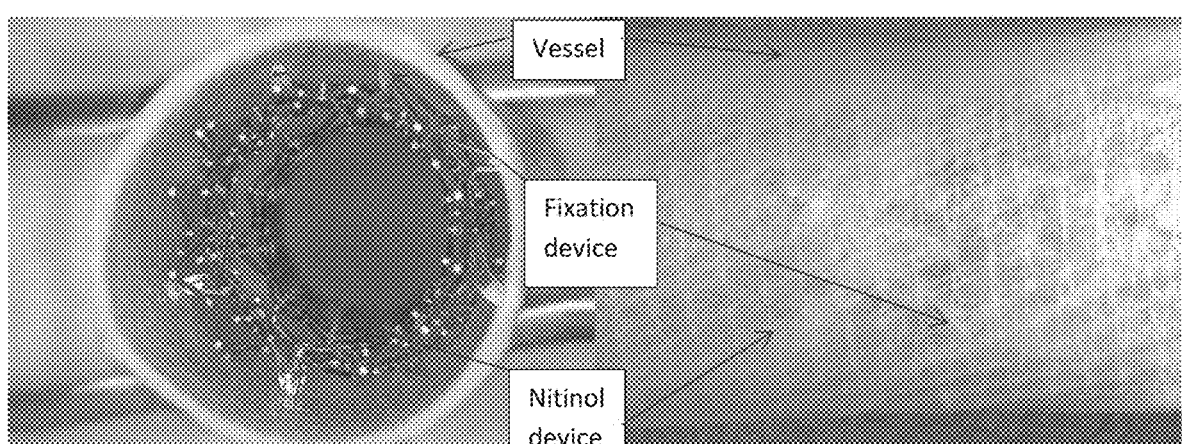
FIGS. 26A and 26B are photographs of another embodiment of an endovascular fixation device deployed within a synthetic vessel in order to secure a nickel-titanium alloy stent.

Example 5: An endovascular fixation device possessing an outwardly flaring portion and flarable crowns provided with barbs, in accordance with a non-limiting embodiment, was mounted and crimped on a balloon catheter. A 6 mm nickel-titanium alloy (e.g., NITINOL) stent was then loosely inserted into a 10 mm diameter synthetic vessel. The nickel-titanium alloy stent did not have secure apposition to the vessel wall and could freely migrate axially and radially. The balloon mounted endovascular fixation device was then inserted into the lumen of the nickel-titanium alloy stent positioned inside of the vessel and the endovascular fixation device was deployed so as to expand the outwardly flaring portion and so that the flarable crowns formed flared crowns. When the flarable crowns flared radially outwards, the barbs engaged the inner wall of the vessel in order to secure the nickel-titanium alloy stent to the inner wall of the vessel. The balloon catheter was then deflated and removed. The deployed fixation device securely attached the nickel-titanium alloy stent to the inner wall of the vessel so the stent could no longer migrate. Samples were examined using a digital microscope at 20× magnification. FIGS. 26A and 26B are luminal and external top views, respectively, showing the deployed endovascular fixation device securing the nickel-titanium alloy stent to the vessel.

Figures 27A, 27B:
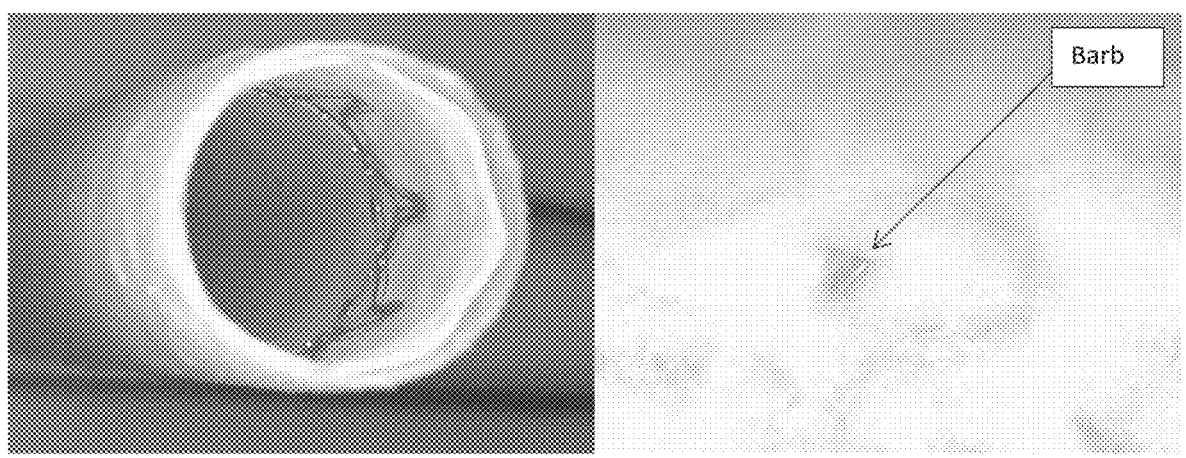
FIGS. 27A and 27B are photographs of another embodiment of an endovascular fixation device deployed within a synthetic vessel in order to show how barbs may be deployed to secure a stainless steel covered stent.

Example 6: An endovascular fixation device possessing an outwardly flaring portion and flarable crowns provided with barbs, in accordance with a non-limiting embodiment, was mounted and crimped on a balloon catheter. An 8 mm covered stent was then inserted into an 8 mm diameter synthetic artery and deployed, which is possible because the covered stent and the synthetic artery have sufficient flexibility. The covered stent had full apposition to the vessel wall and could not freely migrate. The balloon mounted endovascular fixation device was then inserted into the lumen of the covered stent that was positioned inside of the vessel and the endovascular fixation device was deployed inside the covered stent so that the outwardly flaring portion was expanded. Upon expansion of the outwardly flaring portion, the flarable crowns flared to form flared crowns and the barbs were positioned so as to poke into the inner walls of the covered stent and the synthetic artery. The balloon catheter was then deflated and removed. The deployed fixation device securely attached the covered stent to the inner wall of the vessel so that the stent could not migrate. Samples were examined using a digital microscope at 20× magnification. FIG. 27A shows the deployed fixation device contained within the lumen of the covered stent. FIG. 27B shows a fixation barb penetrating through the cover of the stent.

Figures 28A, 28B:
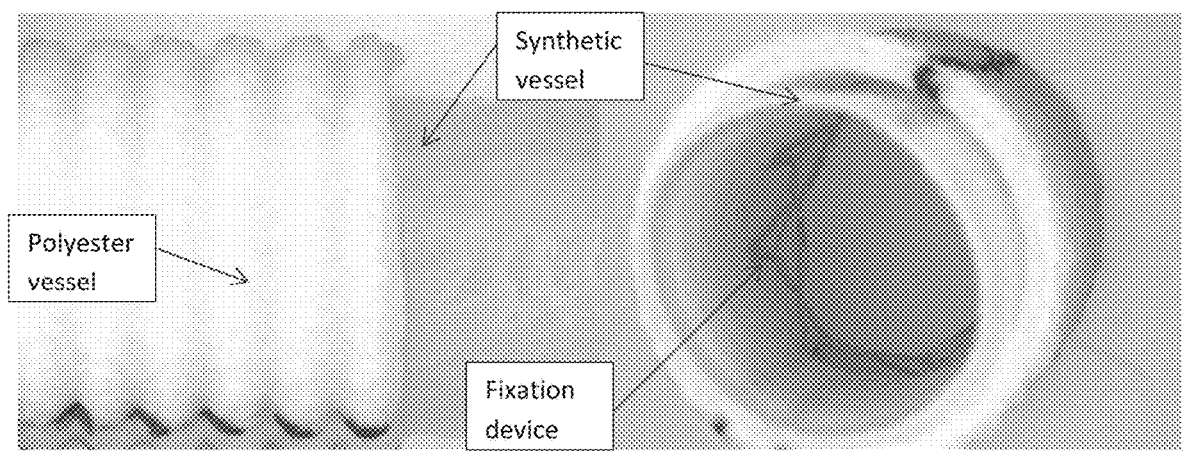
FIGS. 28A and 28B are photographs of another embodiment of an endovascular fixation device in which the endovascular fixation device is deployed within synthetic vessels of different sizes and thicknesses to create an end-to-end anastomosis.
Figures 30A, 30B:
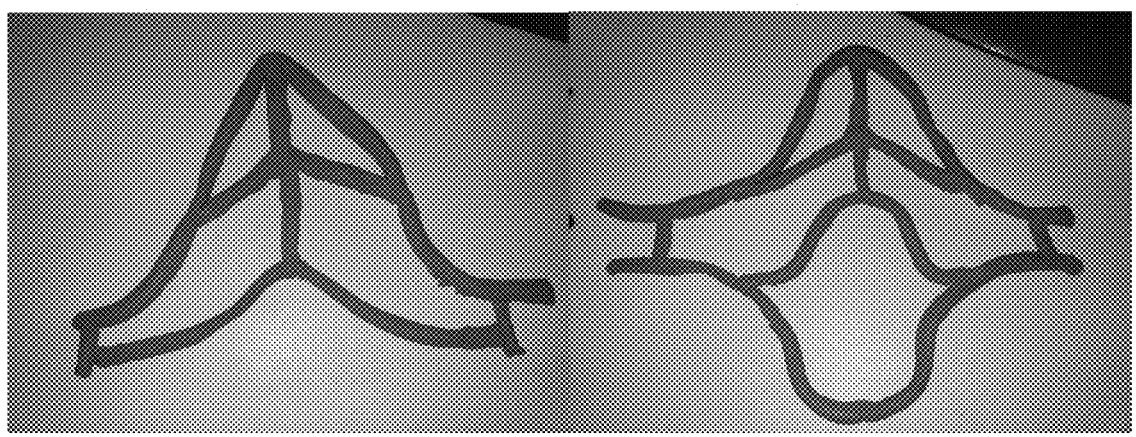
FIGS. 30A and 30B are views of flaring connectors comprising multiple common points, according to an aspect of the disclosure.
Figures 30C, 30D:
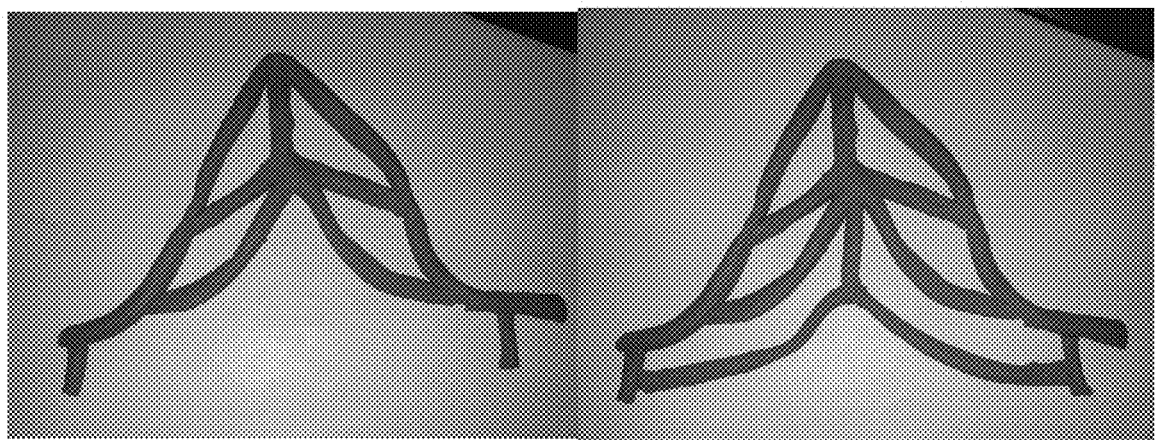
FIG. 30C illustrates a flaring connector with more than three legs connected to a common point, according to an aspect of the disclosure.
FIG. 30D shows a flaring connector with multiple common points and more than three connectors leading to a common point, according to an aspect of the disclosure.

Example 7: An endovascular fixation device having an outwardly flaring portion and flarable crowns provided with barbs, in accordance with a non-limiting embodiment, was mounted and crimped on a balloon catheter. An end-to-end anastomosis was created by placing one end of an 8 mm diameter synthetic vessel inside of a 10 mm polyester vessel with a 1 cm overlap. The balloon mounted endovascular fixation device was then inserted into the lumen of the inner synthetic vessel and deployed in the area of the overlap so that the outwardly flaring portion was in an expanded state and the flarable crowns were flared to form flared crowns. When deployed, barbs on the flared crowns poked into the inner walls of the synthetic vessels in order to create an internal attachment of the two synthetic vessels. The balloon catheter was then deflated and removed. The deployed fixation device securely fastened the two synthetic vessels together. Samples were examined using a digital microscope at 20× magnification. FIG. 28A is a photograph depicting an external top view of the end-to-end anastomosis made using an endovascular fixation device, as disclosed herein. FIG. 28B is a luminal view of the end-to-end anastomosis made with the endovascular fixation device, demonstrating a large open lumen achieved at the site of anastomosis.

Although various non-limiting embodiments of the invention have been described in detail for the purpose of illustration based on what is currently considered to be the most practical and preferred aspects, it is to be understood that such detail is solely for that purpose and that the invention is not limited to the disclosed aspects, but, on the contrary, is intended to cover modifications and equivalent arrangements that are within the spirit and scope of the appended claims. For example, it is to be understood that the present disclosure contemplates that, to the extent possible, one or more features of any aspect can be combined with one or more features of any other aspect.

The invention claimed is:

1. An endovascular fixation device comprising:
   a plurality of first flarable crowns forming a first radially expandable ring, wherein the first flarable crowns are configured to flare radially outwardly so that a first end of each of the first flarable crowns bends further radially outward than a second end of each of the first flarable crowns when the fixation device is expanded from a retracted position to an expanded position; and
   a plurality of second flarable crowns forming a second radially expandable ring, wherein the second flarable crowns are configured to flare radially outwardly so that a first end of each of the second flarable crowns bends further radially outward than a second end of each of the second flarable crowns when the fixation device is expanded from the retracted position to the expanded position, the second ends of each of the first flarable crowns facing the second ends of each of the second flarable crowns to define therebetween a ring having, when the fixation device is in the expanded position, a diameter less than a diameter defined by the first ends of the first and second flarable crowns,
   wherein each first flarable crown comprises a first connector that includes a first leg, a second leg and a third leg connected together at a first common point,
   wherein the first leg comprises a first end opposite the first common point, the second leg comprises a second end opposite the first common point, and the third leg comprises a third end opposite the first common point, and
   wherein, upon radially outward expansion of the first ring, a distance between the first end of the first leg and the second end of the second leg increases causing the first common point to move toward the second radially expandable ring causing the third leg to pivot about the first common point causing a first one of the first flarable crowns to flare radially.

2. The endovascular fixation device of claim 1, wherein the fixation device is configured to form a fistula between a first blood vessel and a second blood vessel when deployed.

3. The endovascular fixation device of claim 1, wherein the fixation device is configured to form an anastomosis between a first blood vessel and a second blood vessel that is within or adjacent to the first blood vessel.

4. The endovascular fixation device of claim 1, wherein the fixation device is configured to secure a previously deployed device within a blood vessel.

5. The endovascular fixation device of claim 1, wherein the fixation device is not biased to the expanded position.

6. The endovascular fixation device of claim 1, wherein the fixation device is biased to the expanded position so the device is self-expanding.

7. The endovascular fixation device of claim 1, further comprising a middle portion directly connecting the first radially expandable ring to the second radially expandable ring.

8. The endovascular fixation device of claim 1, wherein the middle portion further comprises one or more third radially expandable rings connected by a plurality of struts to the first radially expandable ring and the second radially expandable ring.

9. The endovascular fixation device of claim 8, wherein the middle portion comprises at least two third radially expandable rings and one or more interconnecting members attached to the at least two third radially expandable rings so that, when the at least two third radially expandable rings are expanded from a retracted position to an expanded position, the first expandable ring and the second expandable ring also expand from the retracted position to the expanded position, thereby causing the first flarable crowns to flare radially outwardly to form the plurality of first flared crowns and the second flarable crowns to flare radially outwardly to form the plurality of second flared crowns.

10. The endovascular fixation device of claim 1, further comprising a cover formed from a low-friction material covering at least a portion of the fixation device.

11. The endovascular fixation device of claim 1, further comprising a cover formed from a low-friction material entirely covering the fixation device.

12. The endovascular fixation device of claim 1, wherein each second flarable crown comprises a second connector that includes a fourth leg, a fifth leg, and a sixth leg fixedly connected together at a second common point.

13. The endovascular fixation device of claim 12, wherein the third leg is rotated radially outwardly about the first common point causing the first flarable crown of the first ring to automatically flare radially outwardly so as to form a first one of the first flarable crowns.

14. The endovascular fixation device of claim 12, wherein the first leg, the second leg and the third leg are configured together so the first connector twists when the fixation device moves from the retracted position to the expanded position.

15. The endovascular fixation device of claim 14, wherein the fourth leg, the fifth leg and the sixth leg are configured together so the second connector twists when the fixation device moves from the retracted position to the expanded position.

16. The endovascular fixation device of claim 1, wherein each first flarable crown further comprises a further first connector including a further first leg, a further second leg, and a further third leg, wherein the further first leg, the further second leg, and the further third leg are connected together at a further first common point, and wherein an end of the further third leg opposite the further first common point is connected to the first common point.

17. The endovascular fixation device of claim 1, wherein at least some of, or all of, the first flarable crowns and the second flarable crowns comprise at least one barb configured to anchor the endovascular fixation device at a deployed position.

18. The endovascular fixation device of claim 1, wherein the fixation device comprises one or more materials selected from the group consisting of stainless steel, cobalt chromium, nickel-titanium alloy, or biocompatible plastics.

19. The endovascular fixation device of claim 1, wherein the endovascular fixation device comprises a shape-memory alloy that has been heat set so the first connector is biased to the expanded position so the fixation device is self-expanding.

20. The endovascular fixation device of claim 1, wherein each of the first flarable crowns is aligned circumferentially with a corresponding one of the second flarable crowns.

21. The endovascular fixation device of claim 1, wherein the second end of each first flarable crown is coupled to the second end of a corresponding second flarable crown via a corresponding one of a plurality of struts.

22. The endovascular fixation device of claim 1, wherein, when in the expanded position, the first and second flarable crowns are separated from one another along a longitudinal axis of the fixation device by a distance selected to hold a target anatomical structure between the first and second flarable crowns.

* * * * *